(12) United States Patent  (10) Patent No.: US 8,517,766 B2
Golko et al.  (45) Date of Patent: *Aug. 27, 2013

(54) PLUG CONNECTOR WITH EXTERNAL CONTACTS

(71) Applicant: Apple Inc., Cupertino, CA (US)

(72) Inventors: Albert J. Golko, Saratoga, CA (US); Eric S. Jol, San Jose, CA (US); Mathias W. Schmidt, Mountain View, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,992

(22) Filed: Nov. 16, 2012

(65) Prior Publication Data

US 2013/0122754 A1   May 16, 2013

Related U.S. Application Data

(63) Continuation of application No. 13/607,366, filed on Sep. 7, 2012.

(60) Provisional application No. 61/556,692, filed on Nov. 7, 2011, provisional application No. 61/565,372, filed on Nov. 30, 2011, provisional application No. 61/694,423, filed on Aug. 29, 2012.

(51) Int. Cl.
*H01R 13/648* (2006.01)

(52) U.S. Cl.
USPC ...................... 439/607.41; 439/660

(58) Field of Classification Search
USPC ............ 439/607.41, 607.01, 218, 660
See application file for complete search history.

(56) References Cited

U.S. PATENT DOCUMENTS

| 2,792,557 | A | 5/1957 | Dowick |
|---|---|---|---|
| 2,892,990 | A | 6/1959 | Werndl |

(Continued)

FOREIGN PATENT DOCUMENTS

| AL | 196 09 571 A1 | 11/1995 |
|---|---|---|
| DE | 20 2004 021354 U1 | 9/2007 |

(Continued)

OTHER PUBLICATIONS

Flipper Press Release (Jun. 25, 2012) and Data Sheet: http://www.flipperusb.com/images/flipperUSB-brochure.pdf, http://www.flipperusb.com/images/flipperUSB-brochure.pdf.

(Continued)

*Primary Examiner* — Gary F. Paumen
(74) *Attorney, Agent, or Firm* — Kilpatrick Townsend & Stockton LLP

(57) ABSTRACT

A dual orientation connector having a connector tab with first and second major opposing sides and a plurality of electrical contacts carried by the connector tab. The plurality of contacts includes a first set of external contacts formed at the first major side and a second set of external contacts formed at the second major side. Each individual contact in the first plurality of contacts is electrically connected within the tab or body to a corresponding contact in the second plurality of contacts. In some embodiments contacts in the first and second pluralities of contacts that are directly opposite each other are coupled together. In some other embodiments, contacts in the first and second pluralities of contacts that are in a cater cornered relationship with each other are coupled together. The first plurality of contacts are symmetrically spaced with the second plurality of contacts and the connector tab is shaped to have 180 degree symmetry so that it can be inserted and operatively coupled to a corresponding receptacle connector in either of two insertion orientations.

20 Claims, 31 Drawing Sheets

(56) References Cited

U.S. PATENT DOCUMENTS

| | | |
|---|---|---|
| 3,760,335 A | 9/1973 | Roberts |
| 3,793,614 A | 2/1974 | Tachick et al. |
| 3,795,037 A | 3/1974 | Luttmer |
| 4,361,375 A | 11/1982 | Bailey et al. |
| 4,621,882 A | 11/1986 | Krumme |
| 4,711,506 A | 12/1987 | Tanaka |
| 5,040,994 A | 8/1991 | Nakamoto et al. |
| 5,256,074 A | 10/1993 | Tan et al. |
| 5,295,843 A | 3/1994 | Davis et al. |
| 5,380,225 A | 1/1995 | Inaoka |
| 5,387,110 A | 2/1995 | Kantner et al. |
| 5,442,243 A | 8/1995 | Bailey |
| 5,785,557 A | 7/1998 | Davis |
| 5,959,848 A | 9/1999 | Groves et al. |
| 5,967,833 A | 10/1999 | Cachina |
| 6,074,225 A | 6/2000 | Wu et al. |
| 6,179,627 B1 | 1/2001 | Daly et al. |
| 6,364,699 B1 | 4/2002 | Hwang et al. |
| 6,410,857 B1 | 6/2002 | Gonya |
| 6,482,045 B2 | 11/2002 | Arai |
| 6,530,793 B2 | 3/2003 | Eichhorn et al. |
| 6,692,311 B1* | 2/2004 | Kamei et al. ............ 439/716 |
| 6,786,763 B2 | 9/2004 | Wu |
| 6,846,202 B1 | 1/2005 | Schmidt et al. |
| 6,869,320 B2 | 3/2005 | Haas et al. |
| 6,948,965 B2 | 9/2005 | Kumamoto et al. |
| 6,948,984 B2 | 9/2005 | Chen et al. |
| 6,962,510 B1 | 11/2005 | Chen et al. |
| 6,964,582 B2 | 11/2005 | Zhuang et al. |
| 6,981,887 B1 | 1/2006 | Mese et al. |
| 7,094,086 B2 | 8/2006 | Teicher |
| 7,094,089 B2 | 8/2006 | Andre et al. |
| 7,160,125 B1 | 1/2007 | Teicher |
| 7,198,522 B1 | 4/2007 | Ho et al. |
| 7,361,059 B2* | 4/2008 | Harkabi et al. ............ 439/660 |
| 7,363,947 B2 | 4/2008 | Teicher |
| 7,387,539 B2* | 6/2008 | Trenne ................ 439/660 |
| 7,407,416 B1 | 8/2008 | Rogers et al. |
| 7,435,107 B2 | 10/2008 | Masumoto et al. |
| 7,442,091 B2 | 10/2008 | Salomon et al. |
| 7,458,825 B2 | 12/2008 | Atsmon et al. |
| 7,500,861 B2 | 3/2009 | Harkabi et al. |
| 7,537,471 B2 | 5/2009 | Teicher |
| 7,572,153 B2* | 8/2009 | Trenne ................ 439/660 |
| 7,591,657 B2 | 9/2009 | Teicher |
| 7,594,827 B2 | 9/2009 | Takamoto et al. |
| 7,716,400 B2 | 5/2010 | Raines |
| 7,717,717 B1 | 5/2010 | Lai |
| 7,722,409 B2 | 5/2010 | Takamoto et al. |
| 7,727,027 B2* | 6/2010 | Chiang et al. ............ 439/660 |
| 7,740,498 B1* | 6/2010 | Orsley ................ 439/218 |
| 7,892,014 B2 | 2/2011 | Amidon et al. |
| 7,918,685 B1 | 4/2011 | Kruckenberg |
| 8,277,258 B1 | 10/2012 | Huang et al. |
| 2003/0016509 A1 | 1/2003 | Tsukamoto |
| 2004/0229515 A1 | 11/2004 | Kaneda et al. |
| 2005/0042930 A1 | 2/2005 | Harkabi et al. |
| 2005/0079738 A1 | 4/2005 | Ahn |
| 2005/0085136 A1 | 4/2005 | Zhang |
| 2005/0124217 A1 | 6/2005 | Zhuang et al. |
| 2005/0124218 A1 | 6/2005 | Chen et al. |
| 2005/0124219 A1 | 6/2005 | Chen et al. |
| 2005/0202727 A1 | 9/2005 | Andre et al. |
| 2006/0019545 A1 | 1/2006 | Moriyama et al. |
| 2006/0024997 A1 | 2/2006 | Teicher |
| 2006/0289201 A1 | 12/2006 | Kim et al. |
| 2007/0010115 A1 | 1/2007 | Teicher |
| 2007/0010116 A1 | 1/2007 | Teicher |
| 2007/0037452 A1 | 2/2007 | Martin et al. |
| 2007/0072442 A1 | 3/2007 | DiFonzo |
| 2007/0082701 A1 | 4/2007 | Seil et al. |
| 2007/0178771 A1 | 8/2007 | Goetz et al. |
| 2007/0202725 A1 | 8/2007 | Teicher |
| 2007/0243726 A1 | 10/2007 | Trenne |
| 2008/0032562 A1 | 2/2008 | McHugh et al. |
| 2008/0090465 A1 | 4/2008 | Matsumoto et al. |
| 2008/0119076 A1 | 5/2008 | Teicher |
| 2008/0167828 A1 | 7/2008 | Terlizzi et al. |
| 2008/0274633 A1 | 11/2008 | Teicher |
| 2009/0004923 A1 | 1/2009 | Tang et al. |
| 2009/0108848 A1 | 4/2009 | Lundquist |
| 2009/0117768 A1 | 5/2009 | Liao |
| 2009/0156027 A1 | 6/2009 | Chen |
| 2009/0180243 A1 | 7/2009 | Lynch et al. |
| 2010/0009575 A1 | 1/2010 | Crooijmans et al. |
| 2010/0062656 A1 | 3/2010 | Lynch et al. |
| 2010/0104126 A1 | 4/2010 | Greene |
| 2010/0254602 A1 | 10/2010 | Yoshino |
| 2010/0254662 A1* | 10/2010 | He et al. ................ 385/75 |
| 2010/0267261 A1* | 10/2010 | Lin et al. ............ 439/218 |
| 2010/0267262 A1* | 10/2010 | Lin et al. ............ 439/218 |
| 2011/0136381 A1 | 6/2011 | Cho |
| 2011/0250786 A1 | 10/2011 | Reid |
| 2011/0312200 A1* | 12/2011 | Wang et al. ............ 439/218 |
| 2013/0075149 A1 | 3/2013 | Golko et al. |
| 2013/0078869 A1 | 3/2013 | Golko et al. |
| 2013/0089291 A1 | 4/2013 | Jol et al. |
| 2013/0095701 A1 | 4/2013 | Golko et al. |
| 2013/0095702 A1 | 4/2013 | Golko et al. |
| 2013/0115821 A1 | 5/2013 | Golko et al. |

FOREIGN PATENT DOCUMENTS

| | | |
|---|---|---|
| EP | 0081372 A2 | 6/1983 |
| EP | 1717910 A2 | 11/2006 |
| EP | 2169774 A1 | 3/2010 |
| EP | 2 373 131 A1 | 10/2011 |
| FR | 2138961 | 1/1973 |
| JP | 2 078171 | 3/1990 |
| JP | 2003-217728 | 7/2003 |
| JP | 2004 079491 | 3/2004 |
| WO | 2004/097995 A1 | 11/2004 |
| WO | 2005/013436 A1 | 2/2005 |
| WO | 2005124932 A2 | 12/2005 |
| WO | 2006/013553 A2 | 2/2006 |
| WO | 2006/074348 A1 | 12/2006 |
| WO | 2008/065659 A2 | 6/2008 |
| WO | 2009/069969 A2 | 6/2009 |
| WO | 2009/140992 A1 | 11/2009 |
| WO | 2011163256 A1 | 12/2011 |

OTHER PUBLICATIONS

International Search Report for PCT Application No. PCT/US2011/038452, mailed on Oct. 26, 2011, 7 pages.
International Search Report and Written Opinion for PCT Application No. PCT/US2011/041286, mailed on Oct. 20, 2011, 18 pages.
International Search Report and Written Opinion for PCT Application No. PCT/US2011/041127, mailed on Dec. 29, 2011, 17 pages.
International Search Report and Written Opinion for PCT Application No. PCT/US2011/041290, mailed on Nov. 21, 2011, 21 pages.
International Search Report and Written Opinion for International PCT Application No. PCT/US2012/063944, mailed Apr. 18, 2013, 23 pages.
Search and Examination Report for United Kingdom Patent Application No. 1220045.7, mailed on Mar. 15, 2013, 7 pages.
Non-Final Office Action for U.S. Appl. No. 13/679,991, mailed Apr. 5, 2013, 19 pages.
Notice of Allowance for U.S. Appl. No. 13/679,996, mailed Apr. 12, 2013, 30 pages.
Notice of Allowance for U.S. Appl. No. 13/720,822, mailed Apr. 8, 2013, 30 pages.

* cited by examiner

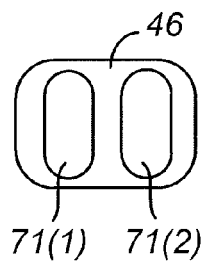 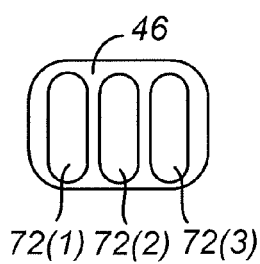 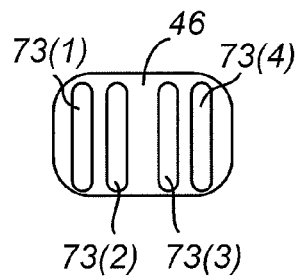
Fig. 7A    Fig. 7B    Fig. 7C
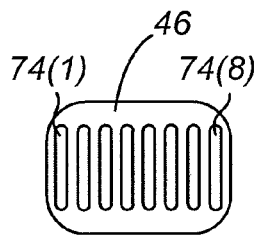 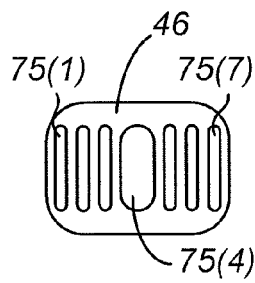
Fig. 7D    Fig. 7E
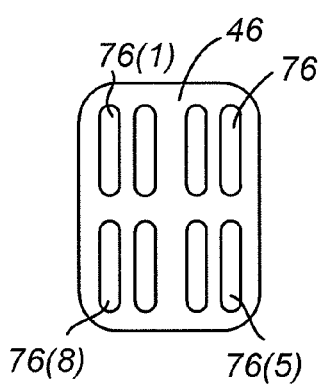 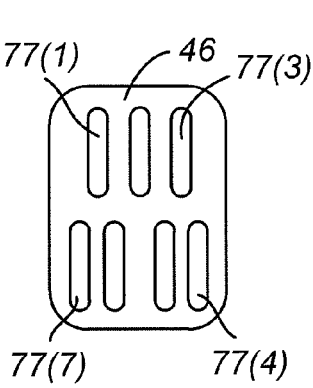 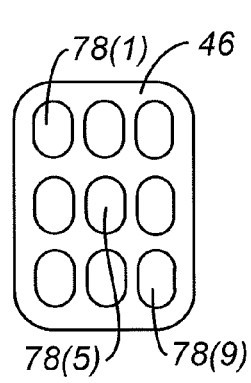
Fig. 7F    Fig. 7G    Fig. 7H

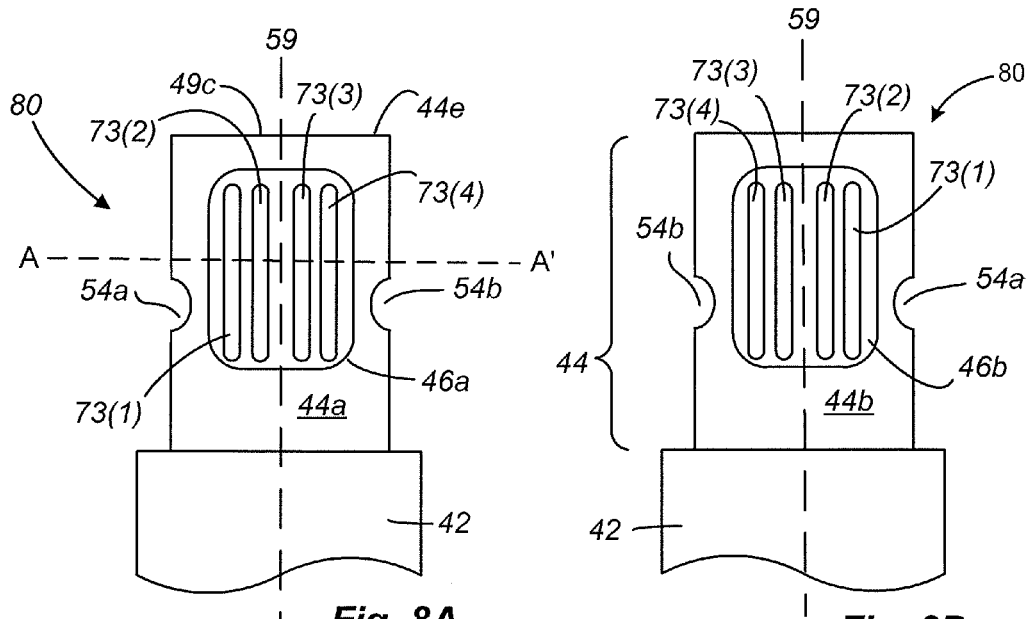
*Fig. 8A*  *Fig. 8B*
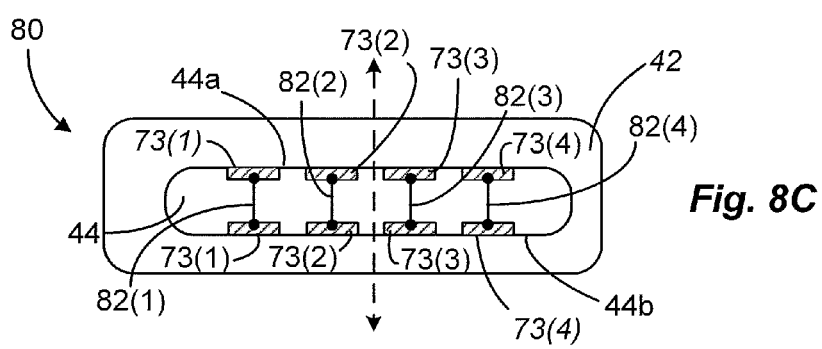
*Fig. 8C*
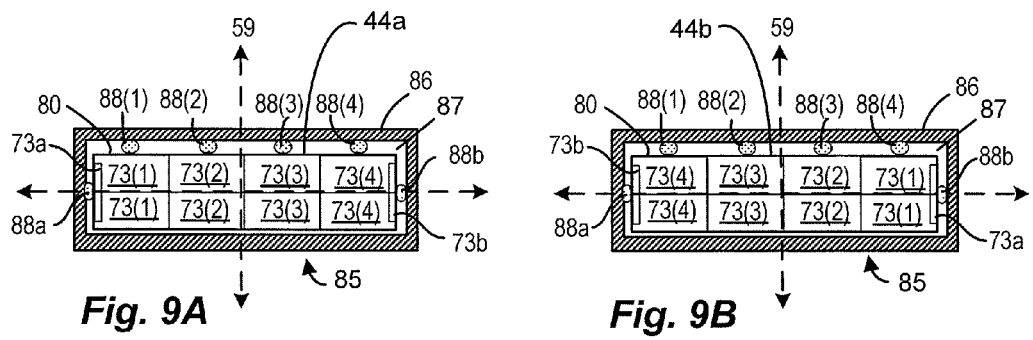
*Fig. 9A*  *Fig. 9B*

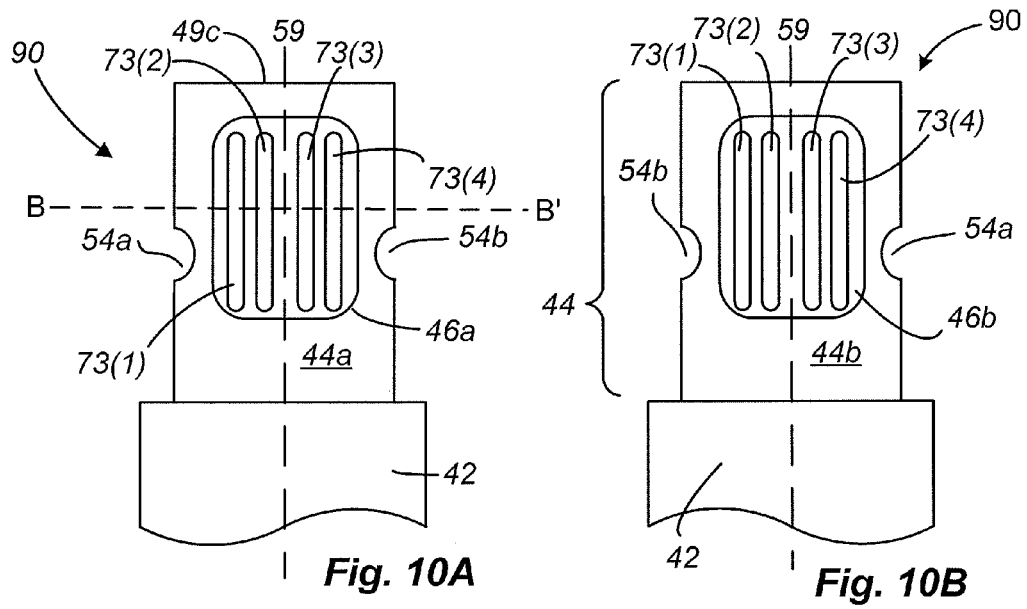
Fig. 10A  Fig. 10B
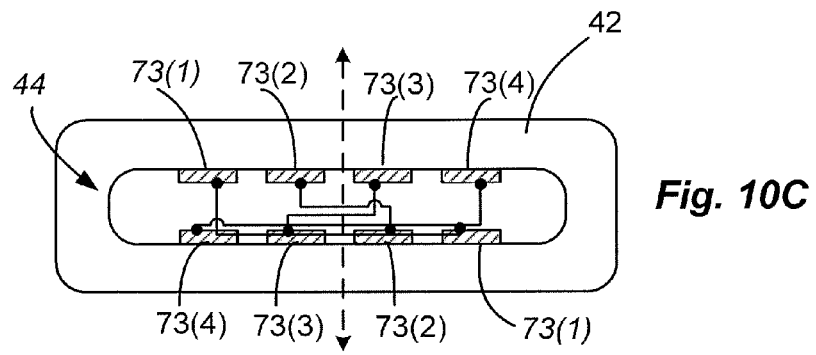
Fig. 10C
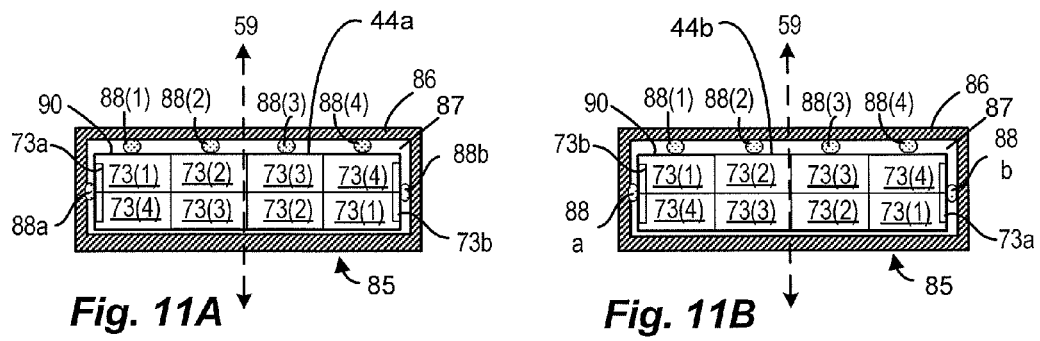
Fig. 11A  Fig. 11B

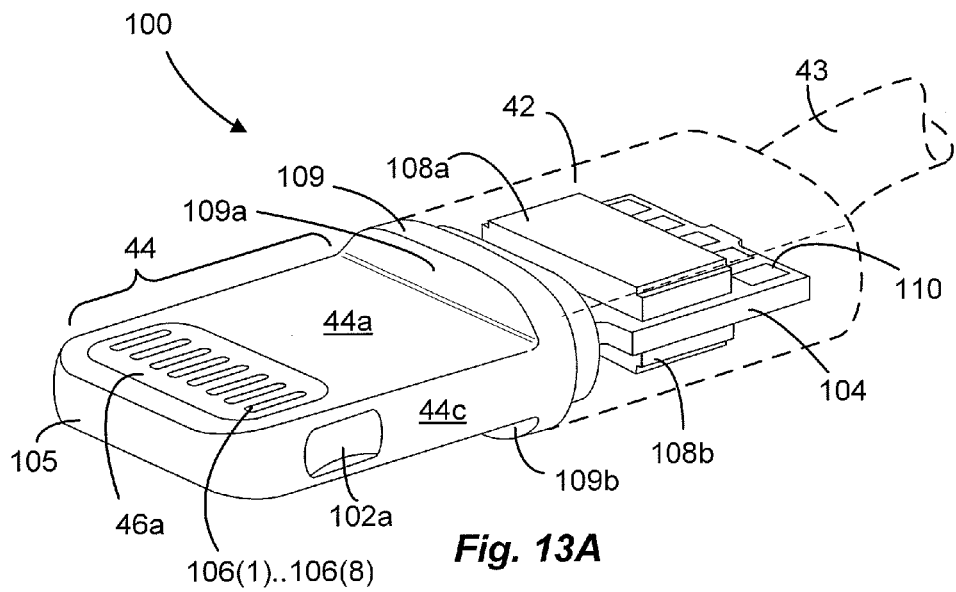
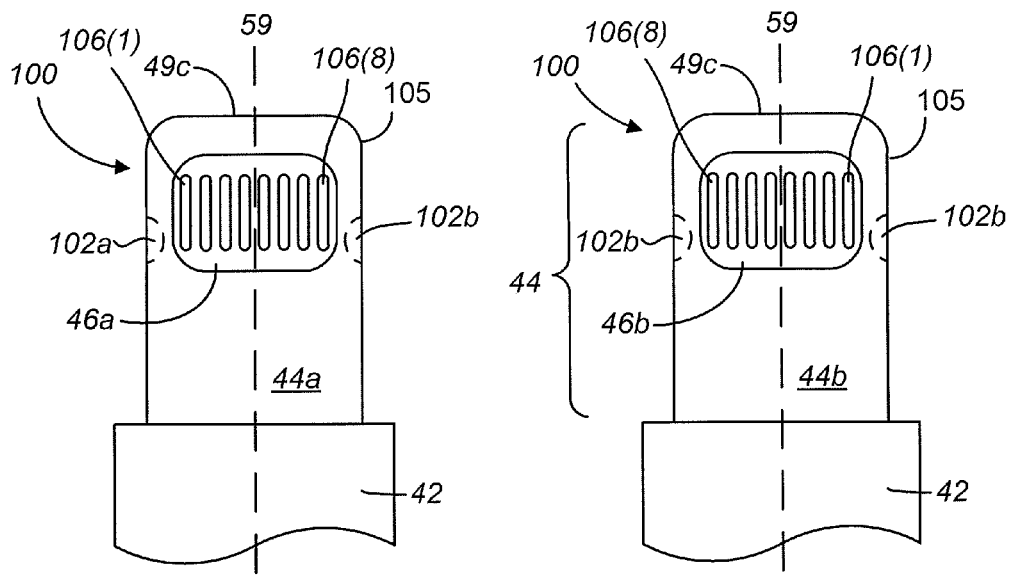
Fig. 13A
Fig. 13B          Fig. 13C

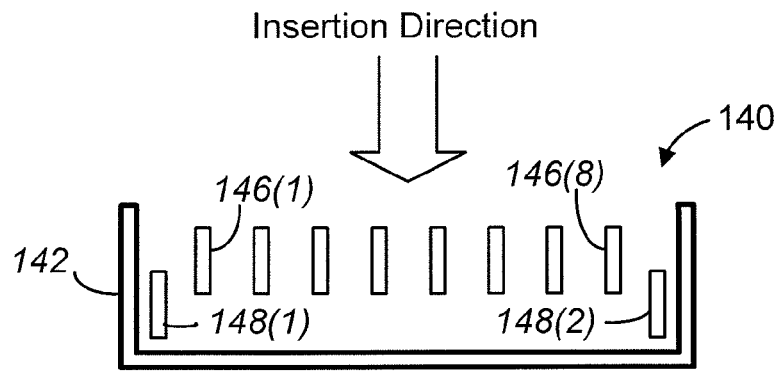
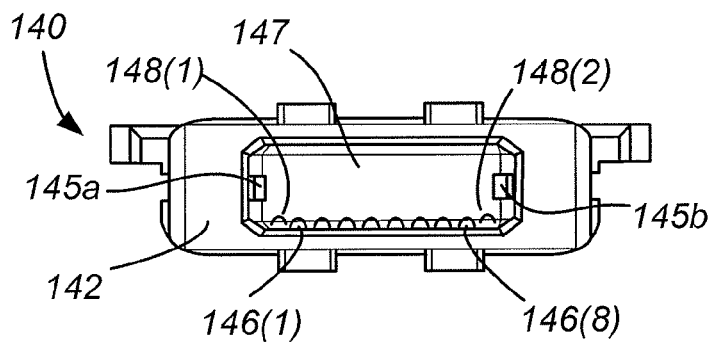
*Fig. 15A*
*Fig. 15B*
| ACC1 | Data A+ | Data A- | P_IN | P_IN | Data B- | Data B+ | ACC2 |
|---|---|---|---|---|---|---|---|
| 146(1) | 146(2) | 146(3) | 146(4) | 146(5) | 146(6) | 146(7) | 146(8) |
*Fig. 15C*
| GND | Data A+ | Data A- | ACC1 | P_IN | Data B- | Data B+ | ACC2 |
|---|---|---|---|---|---|---|---|
| 146(1) | 146(2) | 146(3) | 146(4) | 146(5) | 146(6) | 146(7) | 146(8) |
*Fig. 15D*

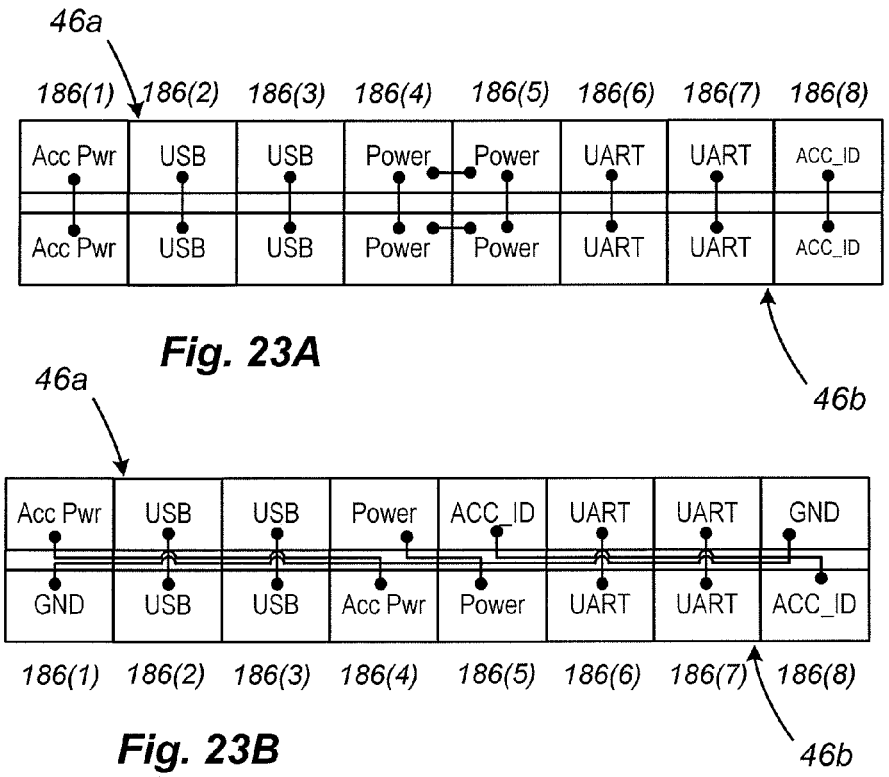
Fig. 23A
Fig. 23B
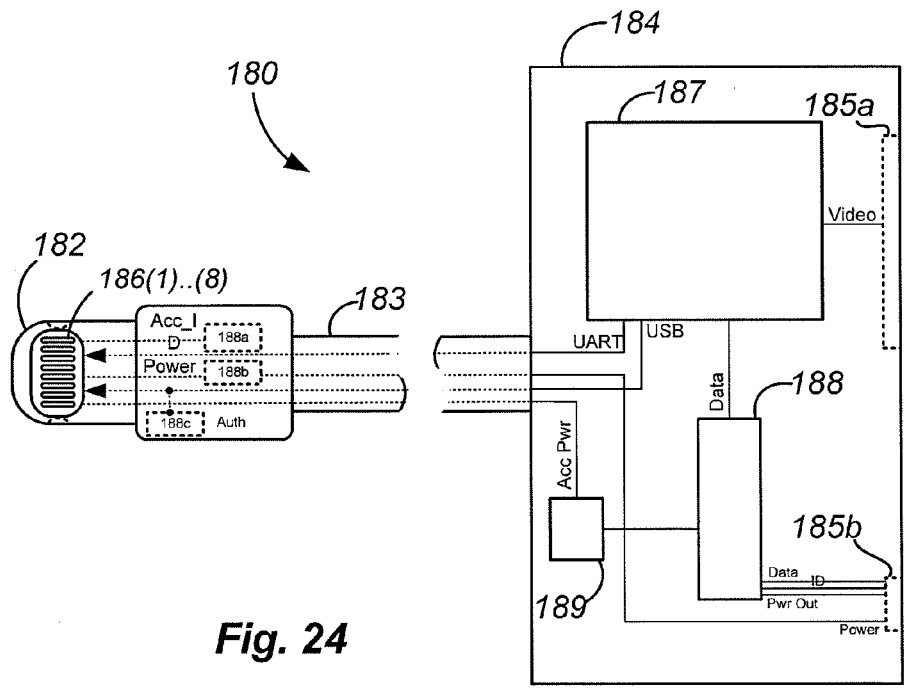
Fig. 24

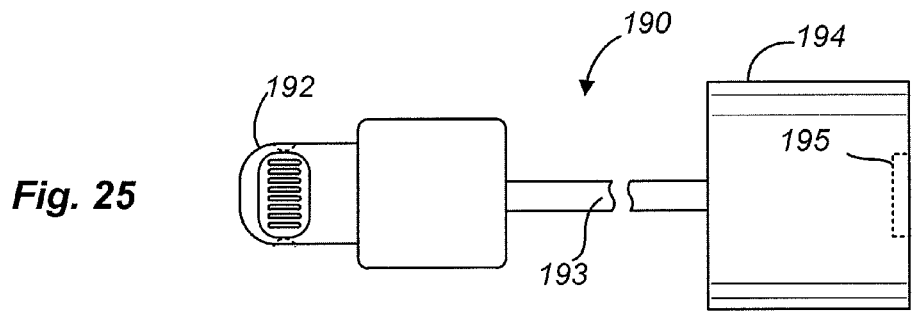
Fig. 25
| | 196(1) | 196(2) | 196(3) | 196(4) | 196(5) | 196(6) | 196(7) | 196(8) |
|---|---|---|---|---|---|---|---|---|
| | Acc Pwr | USB | USB | | | UART | UART | ACC_ID |
| | Acc Pwr | USB | USB | | | UART | UART | ACC_ID |
Fig. 26A
| | 196(1) | 196(2) | 196(3) | 196(4) | 196(5) | 196(6) | 196(7) | 196(8) |
|---|---|---|---|---|---|---|---|---|
| | Acc Pwr | USB | USB | | ACC_ID | UART | UART | GND |
| | GND | USB | USB | Acc Pwr | | UART | UART | ACC_ID |
Fig. 26B
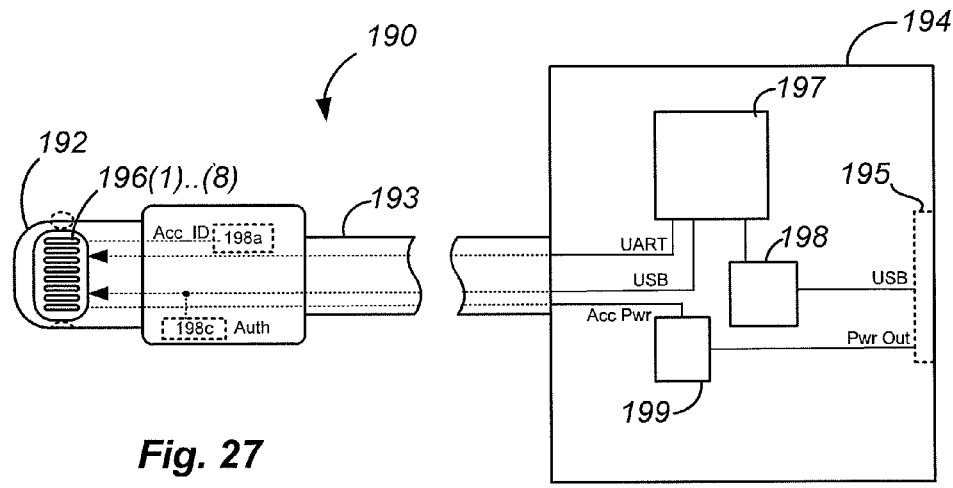
Fig. 27

| Pin | Connector 205 |
|---|---|
| 1 | Ground |
| 2 | Ground |
| 3 | DP Lane 0+ |
| 4 | USB D+ |
| 5 | DP Lane 0- |
| 6 | USB D- |
| 7 | DP Lane 1+ |
| 8 | Vbus |
| 9 | DP Lane 1- |
| 10 | Accessory ID |
| 11 | DP Hot Plug Detect |
| 12 | - - |
| 13 | Accessory Power |
| 14 | - - |
| 15 | Ground |
| 16 | Ground |
| 17 | - - |
| 18 | Accessory Receive |
| 19 | Accessory Transmit |
| 20 | Accessory Detect |
| 21 | Y/PR |
| 22 | C/Y |
| 23 | Comp/Pb |
| 24 | Rem_Sen |
| 25 | DP Auxillary Channel + |
| 26 | DP Auxillary Channel - |
| 27 | Audio Out Left |
| 28 | Audio Out Right |
| 29 | Audio Return |
| 30 | Ground |

*Fig. 28B*

PLUG CONNECTOR WITH EXTERNAL CONTACTS

CROSS-REFERENCES TO RELATED APPLICATIONS

This application is a continuation of U.S. application Ser. No. 13/607,366, filed Sep. 7, 2012; which claims the benefit of U.S. Provisional Patent Application No. 61/556,692, filed Nov. 7, 2011, U.S. Provisional Patent Application No. 61/565,372, filed Nov. 30, 2011, and U.S. Provisional Patent Application No. 61/694,423, filed Aug. 29, 2012, which are commonly assigned, the disclosures of which are hereby incorporated by reference in their entirety.

BACKGROUND OF THE INVENTION

The present invention relates generally to electronic connectors such as audio and data connectors.

Standard audio connectors or plugs are available in three sizes according to the outside diameter of the plug: a 6.35 mm (¼") plug, a 3.5 mm (⅛") miniature plug and a 2.5 mm (3/32") subminiature plug. The plugs include multiple conductive regions that extend along the length of the connectors in distinct portions of the plug such as the tip, sleeve and one or more middle portions between the tip and sleeve resulting in the connectors often being referred to as TRS (tip, ring and sleeve) connectors.

FIGS. 1A and 1B illustrate examples of audio plugs 10 and 20 having three and four conductive portions, respectfully. As shown in FIG. 1A, plug 10 includes a conductive tip 12, a conductive sleeve 16 and a conductive ring 14 electrically isolated from the tip 12 and the sleeve 16 by insulating rings 17 and 18. The three conductive portions 12, 14, 16 are for left and right audio channels and a ground connection. Plug 20, shown in FIG. 1B, includes four conductive portions: a conductive tip 22, a conductive sleeve 26 and two conductive rings 24, 25 and is thus sometime referred to as a TRRS (tip, ring, ring, sleeve) connector. The four conductive portions are electrically isolated by insulating rings 27, 28 and 29 and are typically used for left and right audio, microphone and ground signals. As evident from FIGS. 1A and 1B, each of audio plugs 10 and 20 are orientation agnostic. That is, the conductive portions completely encircle the connector forming 360 degree contacts such that there is no distinct top, bottom or side to the plug portion of the connectors.

When plugs 10 and 20 are 3.5 mm miniature connectors, the outer diameter of conductive sleeve 16, 26 and conductive rings 14, 24, 25 is 3.5 mm and the insertion length of the connector is 14 mm. For 2.5 mm subminiature connectors, the outer diameter of the conductive sleeve is 2.5 mm and the insertion length of the connector is 11 mm long. Such TRS and TRRS connectors are used in many commercially available MP3 players and smart phones as well as other electronic devices. Electronic devices such as MP3 players and smart phones are continuously being designed to be thinner and smaller and/or to include video displays with screens that are pushed out as close to the outer edge of the devices as possible. The diameter and length of current 3.5 mm and even 2.5 mm audio connectors are limiting factors in making such devices smaller and thinner and in allowing the displays to be larger for a given form factor.

Many standard data connectors are also only available in sizes that are limiting factors in making portable electronic devices smaller. Additionally, and in contrast to the TRS connectors discussed above, many standard data connectors require that they be mated with a corresponding connector in a single, specific orientation. Such connectors can be referred to as polarized connectors. As an example of a polarized connector, FIGS. 2A and 2B depict a micro-USB connector 30, the smallest of the currently available USB connectors. Connector 30 includes a body 32 and a metallic shell 34 that extends from body 32 and can be inserted into a corresponding receptacle connector. As shown in FIGS. 2A, 2B, shell 34 has angled corners 35 formed at one of its bottom plates. Similarly, the receptacle connector (not shown) with which connector 30 mates has an insertion opening with matching angled features that prevents shell 34 from being inserted into the receptacle connector the wrong way. That is, it can only be inserted one way—in an orientation where the angled portions of shell 34 align with the matching angled portions in the receptacle connector. It is sometimes difficult for the user to determine when a polarized connector, such as connector 30 is oriented in the correct insertion position.

Connector 30 also includes an interior cavity 38 within shell 34 along with contacts 36 formed within the cavity. Cavity 38 is prone to collecting and trapping debris within the cavity which may sometimes interfere with the signal connections to contacts 36. Also, and in addition to the orientation issue, even when connector 30 is properly aligned, the insertion and extraction of the connector is not precise, and may have an inconsistent feel. Further, even when the connector is fully inserted, it may have an undesirable degree of wobble that may result in either a faulty connection or breakage.

Many other commonly used data connectors, including standard USB connectors, mini USB connectors, FireWire connectors, as well as many of the proprietary connectors used with common portable media electronics, suffer from some or all of these deficiencies or from similar deficiencies.

BRIEF SUMMARY OF THE INVENTION

Various embodiments of the invention pertain to electronic connectors that improve upon some or all of the above described deficiencies. Other embodiments of the invention pertain to methods of manufacturing such electronic connectors as well as electronic devices that include such connectors.

In view of the shortcomings in currently available electronic connectors as described above, some embodiments of the present invention relate to improved plug connectors that have a reduced plug length and thickness, an intuitive insertion orientation and a smooth, consistent feel when inserted and extracted from its corresponding receptacle connector. Additionally, some embodiments of plug connectors according to the present invention only include external contacts and do not include contacts positioned within an internal cavity that is prone to collecting and trapping debris.

One particular embodiment of the invention pertains to an unpolarized multiple orientation plug connector having external contacts carried by a connector tab. The connector tab can be inserted into a corresponding receptacle connector in at least two different insertion orientations. Contacts are formed on first and second surfaces of the tab and arranged in a symmetrical layout so that the contacts align with contacts of the receptacle connector in either of at least two insertion orientations. One or more individual contacts in the first plurality of contacts are electrically coupled within the tab or body of the connector to a corresponding contact in the second plurality of contacts. Additionally, the connector tab itself can have a symmetrical cross-sectional shape to facilitate the multi-orientation aspect of this embodiment.

Another embodiment pertains to a dual orientation plug connector that includes a body and a 180 degree symmetrical metal tab connected to and extending longitudinally away from the body. The tab includes first and second major opposing surfaces and third and fourth minor opposing surfaces that extend between the first and second major surfaces. A first contact region formed at the first major surface of the tab includes a first plurality of external contacts spaced apart along a first row. A second contact region formed at the second major surface of the tab includes a second plurality of external contacts spaced apart along a second row that mirrors the first row. Each individual contact in the first plurality of contacts is electrically connected within the tab or body to a corresponding contact in the second plurality of contacts, and dielectric material is filled in between adjacent contacts in the first and second rows and between the contacts and the metal tab. In some embodiments first and second retention features adapted to engage with retention features on a corresponding receptacle connector are formed on the third and fourth minor surfaces of the tab.

Still another embodiment of the invention pertains to a plug connector that includes a body and a tab connected to and extending away from the body. The tab includes first and second major opposing surfaces along with third and fourth minor opposing surfaces that extend between the first and second major surfaces. A first contact region that includes eight sequentially numbered external contacts spaced apart along a first row is formed at the first major surface of the tab. The sequentially numbered contacts include first and second contacts designated for data signals at locations 2 and 3, first and second power contacts electrically coupled to each other and designated for power at locations 4 and 5, and third and fourth contacts designated for data signals at locations 6 and 7. In some embodiments the plug connector further includes an accessory power contact at one of locations 1 or 8 and an ID contact at the other of locations 1 or 8. In some embodiments the plug connector also has a second contact region formed at the second major surface of the tab that includes eight sequentially numbered external contacts spaced apart along a second row. The second row is directly opposite from and mirrors the first row, and each individual contact in the second first row is electrically connected to a corresponding contact in the second row.

Still another embodiment of the invention pertains to a reversible plug connector that includes a body and connector tab coupled to and extending away from the body. The tab including first and second opposing surfaces along with third and fourth opposing surfaces that extend between the first and second surfaces. A first contact region is formed at the first surface of the tab that includes eight external contacts spaced apart along a first row. A second contact region is formed at the second surface of the tab that includes eight external contacts spaced apart along a second row in contact locations that mirror contact locations in the first row. In one version of this embodiment, each of the first and second rows includes a single ground contact designated for ground, a first pair of data contacts that can be used to carry data signals according to a first communication protocol, and a second pair of data contacts that can be used to carry data signals according to a second communication protocol different than the first protocol. Additional versions of this embodiment may further include one or more of a power in contact designated to carry a first power signal at a first voltage, a power out contact capable of carrying a second power signal at a second voltage lower than the first voltage, and an ID contact capable of carrying a configuration signal that identifies the communication protocols used by the first and second pairs of data contacts. In various additional versions of this embodiment, the contacts are arranged according to one or more of the following rules: (i) the first pair of data contacts in the first and second rows are positioned in a mirrored relationship directly opposite each other, (ii) the second pair of data contacts in the first row and second rows are positioned in a mirrored relationship directly opposite each other, (iii) the ground contacts in the first and second rows are positioned in a cater corner relationship with each other across a centerline of the connector; (iv) the first power contact in the first and second rows are positioned in a cater corner relationship with each other across a centerline of the connector; (v) the ID contacts in the first and second rows are positioned in a cater corner relationship with each other across a first quarter line of the connector; and (vi) the second power contacts in the first and second row are positioned in a cater corner relationship with each other across a second quarter line of the connector.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 2A shows a perspective view of a previously known micro-USB plug connector while

FIGS. 7A-7H are simplified top views of contact layouts within contact region 46 according to different embodiments of the invention;

FIGS. 8A and 8B are simplified views of an embodiment of a plug connector 80 having four contacts on each major opposing surface of tab 44 according to an embodiment of the present invention;

FIG. 8C is a simplified cross-sectional schematic view of plug connector 80 shown in FIGS. 8A and 8B taken along line A-A';

FIGS. 9A and 9B are diagrams depicting the alignment of contacts in plug connector 80 with corresponding contacts in receptacle connector 85 in different insertion orientations according to one embodiment of the invention;

FIGS. 10A and 10B are simplified views of another embodiment of a plug connector 90 having four contacts on each opposing surface of tab 44 according to an embodiment of the present invention;

FIG. 10C is a simplified cross-sectional schematic view of plug connector 90 shown in FIG. 10A taken along line B-B';

FIGS. 11A and 11B are diagrams depicting the alignment of contacts in plug connector 90 with corresponding contacts in receptacle connector 85 in different insertion orientations according to one embodiment of the invention;

FIG. 13A is a simplified perspective view of a plug connector 100 having eight contacts formed on each opposing surface of tab 44 according to one embodiment of the present invention;

FIGS. 13B and 13C are simplified top and bottom views of plug connector 100 shown in FIG. 13A;

FIG. 15A is a schematic representation of a receptacle connector 140 according to an embodiment of the invention;

FIG. 15B is a front plan view of receptacle connector 140 according to one embodiment of the invention;

FIGS. 15C and 15D are diagrams illustrating a pinout arrangement of connector 140 according to two different embodiments of the invention configured to mate with plug connectors having a pinout 106a and 106b, respectively, as shown in FIGS. 14A and 14B;

FIG. 23A is a diagram depicting pin locations of plug connector 182 shown in FIG. 22 according to one embodiment of the invention where connector 182 is compatible with the pinout shown in FIG. 14A;

FIG. 23B is a diagram depicting pin locations of plug connector 182 shown in FIG. 22 according to one embodiment of the invention where connector 182 is compatible with the pinout shown in FIG. 14B;

FIG. 24 is a simplified schematic representation of video adapter 180 according to an embodiment of the invention;

FIG. 25 is a simplified top plan view of an SD card adapter 190 according to an embodiment of the invention;

FIG. 26A is a diagram depicting pin locations of plug connector 192 shown in FIG. 25 according to one embodiment of the invention where connector 192 is compatible with the pinout shown in FIG. 14A;

FIG. 26B is a diagram depicting pin locations of plug connector 192 shown in FIG. 25 according to another embodiment of the invention where connector 192 is compatible with the pinout shown in FIG. 14B;

FIG. 27 is a simplified schematic representation of video adapter 190 according to an embodiment of the invention;

FIG. 28B is a diagram depicting the pinout of connector 205 included within adapter 200 according to one embodiment of the invention;

FIG. 32 is a simplified illustrative block diagram of an electronic media device suitable in which embodiments of the invention may be incorporated or used with.

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Figure 1A:
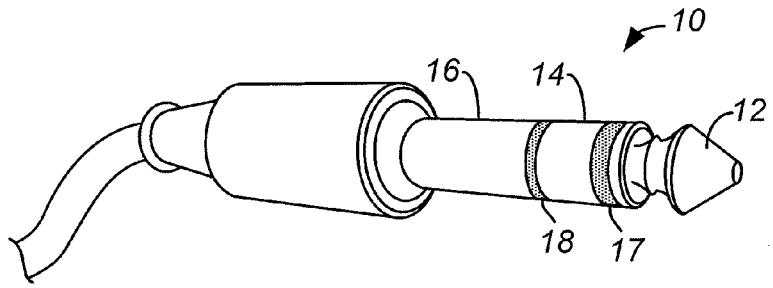
FIGS. 1A and 1B show perspective views of previously known TRS and TRRS audio plug connectors respectively.
Figure 1B:
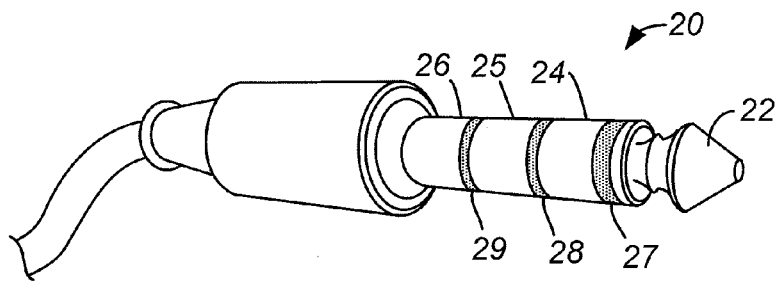
Figure 2A:
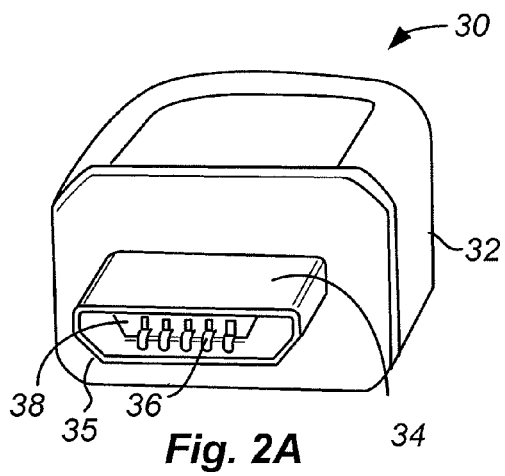
Figure 2B:
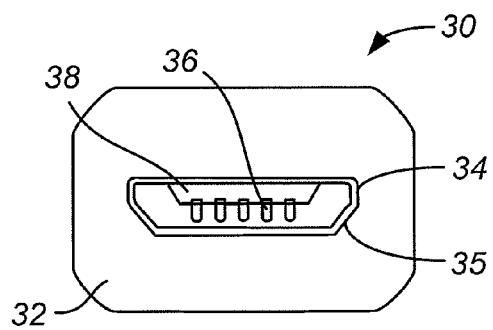
FIG. 2B shows a front plan view of the micro-USB connector shown in FIG. 2A.
Figure 3A:
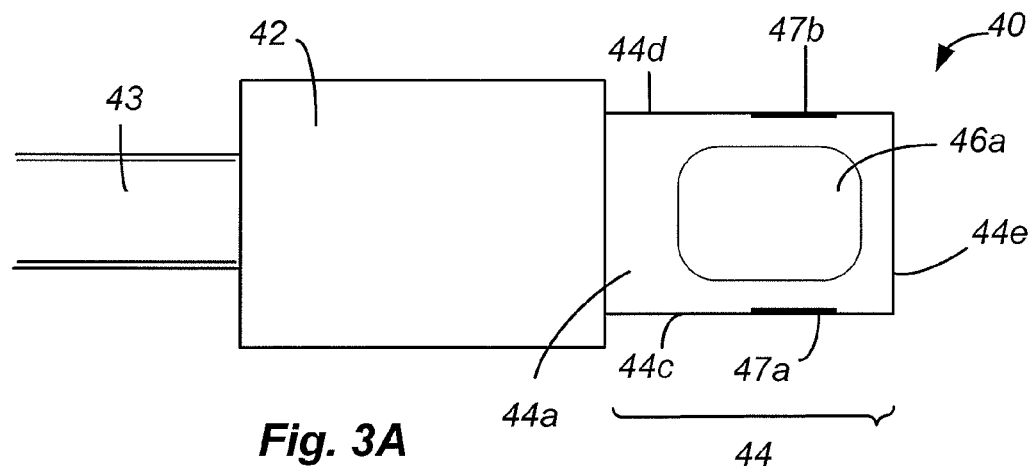
FIG. 3A is simplified top view of a plug connector 40 according to one embodiment of the present invention.
Figure 3B:
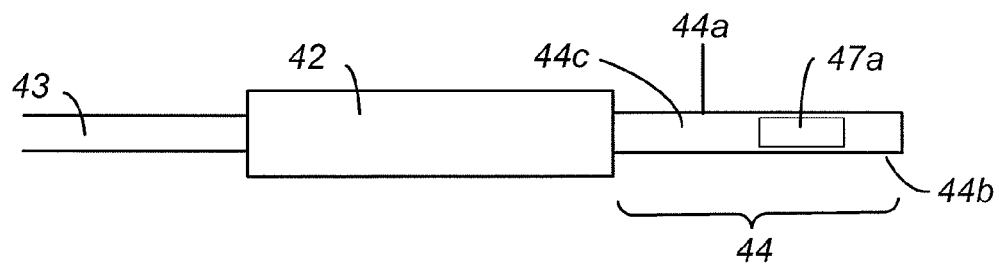
FIGS. 3B and 3C are simplified side and front views, respectively, of connector 40 shown in FIG. 3A.
Figure 3C:
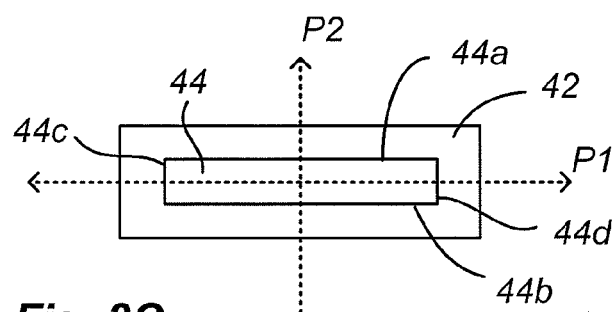

In order to better appreciate and understand the present invention, reference is first made to FIGS. 3A-3C, which are simplified top, side and front views, respectively, of a dual orientation plug connector 40 according to one embodiment of the present invention. Connector 40 includes a body 42 and a tab portion 44 that extends longitudinally away from body 42 in a direction parallel to the length of the connector 40. As shown in FIGS. 3A and 3B, a cable 43 can optionally be attached to body 42 at an end opposite of tab portion 44. Tab 44 is sized to be inserted into a corresponding receptacle connector during a mating event and includes a first contact region 46a formed on a first major surface 44a and a second contact region 46b (not shown in FIGS. 3A-3C) formed at a second major surface 44b opposite surface 44a. Tab 44 also includes first and second opposing side surfaces 44c, 44d that extend between the first and second major surfaces 44a, 44b.

Contact regions 46a and 46b are centered between the opposing side surfaces 44c and 44d, and a plurality of external contacts (not shown in FIGS. 3A-3C) can be formed at an outer surface of tab 44 in each contact region. The contacts can be raised, recessed or flush with the external surface of tab 44 and positioned within the contact regions such that when tab 44 is inserted into a corresponding receptacle connector they can be electrically coupled to corresponding contacts in the receptacle connector. In some embodiments, the plurality of contacts are self-cleaning wiping contacts that, after initially coming into contact with a receptacle connector contact during a mating event, slide further past the receptacle connector contact with a wiping motion before reaching a final, desired contact position. The contacts within regions 46a and 46b can be made from copper, nickel, brass, stainless steel, a metal alloy or any other appropriate conductive material or combination of conductive materials. In some embodiments contacts can be printed on surfaces 44a and 44b using techniques similar to those used to print contacts on printed circuit boards. In some other embodiments the contacts can be stamped from a lead frame, positioned within regions 46a and 46b and surrounded by dielectric material.

In some embodiments, one or more ground contacts can be formed on of tab 44. For example, FIGS. 3A and 3B show a ground contact 47a formed on first side surface 44c and a ground contact 47b formed on second side surface 44d opposite ground contact 47a. As another example, one or more ground contacts may be formed on end surface 44e at the distal tip of connector 40 in addition to, or instead of ground contacts 47a, 47b. In some embodiments, each of the one or more ground contacts can be formed on or form part of an outer portion of its respective side surface. In other embodiments, the one or more ground contacts can be formed within and/or as part of a pocket, indentation, notch or similar recessed region formed on each of the side surfaces 44c, 44d that operatively engage with a retention mechanism in a corresponding receptacle connector as described in detail below.

Tab 44 can have a 180 degree symmetrical, double orientation design which enables the connector to be inserted into a corresponding receptacle connector in both a first orientation where surface 44a is facing up or a second orientation where surface 44a is rotated 180 degrees and facing down. To allow for the orientation agnostic feature of connector 40, connector 40 is not polarized. That is, connector 40 does not include a physical key configured to mate with a matching key in a corresponding receptacle connector and ensure that mating between the two connectors occurs only in a single orientation. Additionally, contacts can be positioned within contact regions 46a and 46b so that individual contacts in region 46a are arranged symmetric with the individual contacts in region 46b located on the opposite side of tab 44, and ground contacts formed at the tip or on the sides of connector tab 44 can also be arranged in a symmetric manner. The symmetrical arrangement of contacts allows the contacts of the plug connector in either region 46a or 46b to properly align with the contacts in the receptacle connector regardless of orientation.

In some embodiments, tab 44 is shaped so that if the tab is divided into top and bottom halves along a horizontal plane that bisects the center of tab 44 (as shown by plane, P1, in FIG. 3C), the physical shape of the cross-section of upper half of tab 44 is substantially the same as the physical shape of the cross-section of the lower half. Similarly, if tab 44 is divided into left and right halves along a vertical plane that bisects the center of tab (as shown by plane, P2, in FIG. 3C), the physical shape of the left half of tab 44 is substantially the same as the shape of the right half. In other dual orientation embodiments, the cross-sectional shape of tab 44 need not be fully symmetrical as long as the connector does not include a key that prevents the connector from being inserted into a corresponding receptacle connector in two different orientations and the contacts align properly in either orientation with contacts in the corresponding receptacle connector.

In addition to the 180 degree symmetrical, dual orientation design, plug connectors according to some embodiments of the invention electrically connect each contact formed at surface 44a of the connector with a corresponding contact on surface 44b on the opposite side of the connector. That is, in some embodiments of the invention, every contact in contact region 46a is electrically connected to a corresponding contact in contact region 46b. Thus, any given signal that is to be carried by the plug connector is sent over a contact within contact region 46a as well as a contact within region 46b. The effect of this aspect of some embodiments of the invention is that the number of different signals that can be carried by a given number of contacts is reduced by half as compared to if the contacts formed in regions 46a and 46b were electrically isolated from each other and designated for different signals. This feature provides a benefit, however, in that the corresponding receptacle connector need only have contacts on one surface within its cavity (for example, a top surface or a bottom surface). The receptacle connector can thus be made thinner than a receptacle connector with contacts on both the top and bottom surfaces of its cavity, which in turn, enables an electronic device in which the receptacle connector is housed to be thinner as well.

Body 42 is generally the portion of connector 40 that a user will hold onto when inserting or removing connector 40 from a corresponding receptacle connector. Body 42 can be made out of a variety of materials and in some embodiments is made from a dielectric material, such as a thermoplastic polymer formed in an injection molding process. While not shown in FIG. 3A or 3B, a portion of cable 43 and a portion of tab 44 may extend within and be enclosed by body 42. Electrical contact to the contacts in contact regions 46a, 46b can be made to individual wires in cable 43 within body 42. In one embodiment, cable 43 includes a plurality of individual insulated wires, one for each electrically unique contact within regions 46a and 46b, that are soldered to bonding pads on a printed circuit board (PCB) housed within body 42. Each bonding pad on the PCB is electrically coupled to a corresponding individual contact within one of contact regions 46a or 46b. Also, one or more integrated circuits (ICs) can be operatively coupled within body 42 to the contacts within regions 46a, 46b to provide information regarding connector 40 and/or an accessory the connector is part of or to perform other specific functions as described in detail below.

In the embodiment illustrated in FIGS. 3A and 3B, body 42 has a rectangular cross section that generally matches in shape but is slightly larger than the cross section of tab 42. As discussed with respect to FIGS. 4A-4E, body 42 can be of a variety of shapes and sizes, however. For example, body 42 may have a rectangular cross section with rounded or angled edges (referred to herein as a "generally rectangular" cross section), a circular cross section, an oval cross section as well as many other suitable shapes. In some embodiments, both the body 42 and tab 44 of connector 40 have the same cross-sectional shape and have the same width and height (thickness). As one example, body 42 and tab 44 may combine to form a substantially flat, uniform connector where the body and tab seem as one. In still other embodiments, the cross section of body 42 has a different shape than the cross section of tab 44, for example, body 42 may have curved upper and lower and/or curved side surfaces while tab 44 is substantially flat.

Also, the embodiment shown in FIGS. 3A-3C includes connector 40 as part of a cable connector. In some embodiments, plug connectors according to the invention are used in devices such as docking stations, clock radios and other accessories or electronic devices. In such embodiments, tab 44 may extend directly out of a housing associated with the docking station, clock radio or other accessory or electronic device. The housing associated with the accessory or device, which may be shaped very differently than body 42, can then be considered the body of the connector.

While tab 44 is shown in FIGS. 3A-3C as having a substantially rectangular and substantially flat shape, in some embodiments of the invention first and second major surfaces 44a, 44b may have matching convex or concave curvatures to them or may have a matching recessed region centrally located between the sides of tab 44. Contact regions 46a and 46b may be formed in the recessed regions and the recessed regions may, for example, extend from the distal tip of tab 44 all the way to base 42 or may extend along only a portion of the length of tab 44 (e.g., between ½ to ¾ of the length of the tab) ending at a point short of base 42. Side surfaces 44c and 44d may also have matching convex or concave curvatures.

Generally, the shape and curvature of surfaces 44a and 44b mirror each other, as do the shape and curvature of surfaces 44a and 44b, in accordance with the dual orientation design of connector 40 as described below. Additionally, while FIGS. 3A-3C show surfaces 44c, 44d as having a width significantly less than that of surfaces 44a, 44b (e.g., less than or equal to one quarter or one half the width of surfaces 44a, 44b), in some embodiments of the invention side surfaces 44c, 44d have a width that is relatively close to or even equal with or wider than that of surfaces 44a, 44b.

Figure 4A:
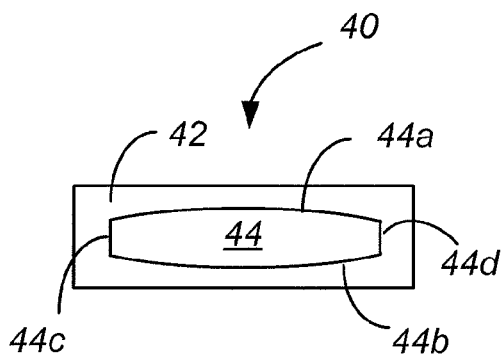
FIGS. 4A-4E are front views of alternative embodiments of connector 40 according to the present invention.
Figure 4B:
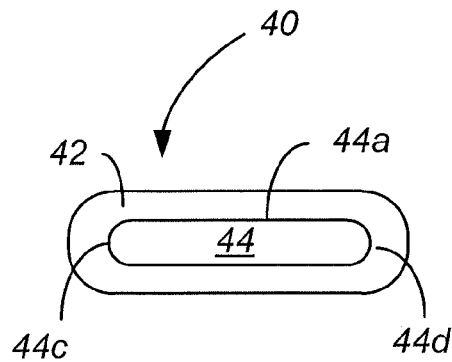
Figure 4C:
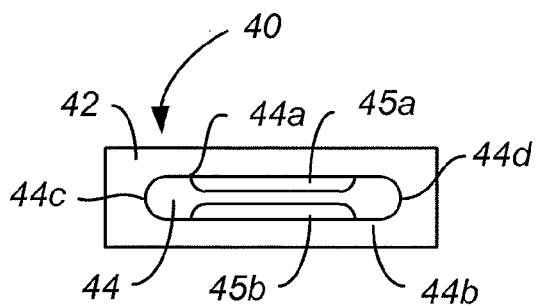
Figure 4D:
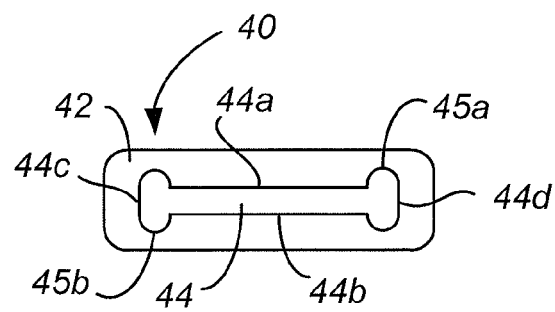
Figure 4E:
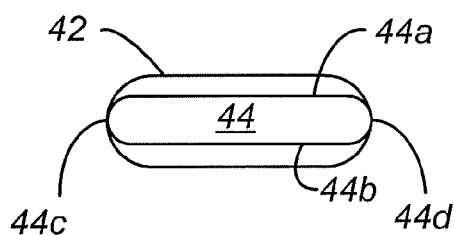

FIGS. 4A-4E are simplified front plan views of embodiments of connector 40 in which body 42 and/or tab 44 have different cross-sectional shapes. For example, in FIG. 4A, major surfaces 44a and 44b are slightly convex, while in FIGS. 4B and 4C, side surfaces 44c and 44d are rounded. FIG. 4C depicts an example of a connector having recessed regions 45a and 45b formed at major surfaces 44a and 44b, respectfully, of tab 44. The recessed regions extend from the distal tip of tab 44 along a portion of the length of tab 44 and are centrally located between side surfaces 44c and 44d. FIG. 4D depicts an example of a connector in which tab 44 has a dog-bone shaped cross-section where ridges 45c and 45d are formed at the sides of the tab. A corresponding receptacle connector may include a cavity shaped to match the ridges so that ridges 45c, 45d help align the connector into the cavity during a mating event. FIG. 4E depicts an example of a connector in which body 42 has approximately the same width as tab 44 but is larger than the tab in the height direction. A person of skill in the art will understand that FIGS. 3C and 4A-4E are but examples of suitable cross-sectional shapes for body 42 and tab 44 and that many other cross-sectional shapes may be employed for each of body 42 and tab 44 in various embodiments of the invention.

Tab 44 may be made from a variety of materials including metal, dielectric or a combination thereof. For example, tab 44 may be a ceramic base that has contacts printed directly on its outer surfaces or can include a frame made from an elastomeric material that includes flex circuits attached to the frame. In some embodiments, tab 44 includes an exterior frame made primarily or exclusively from a metal, such as stainless steel, and contact regions 46a and 46b are formed within openings of the frame as shown, for example, in FIGS. 5A-5C.

Figure 5A:
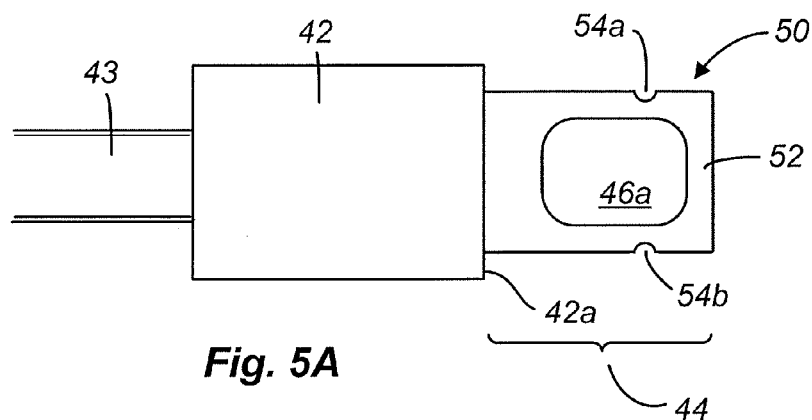
FIGS. 5A and 5B are simplified top and side view of a plug connector 50 according to another embodiment of the present invention.
Figure 5B:
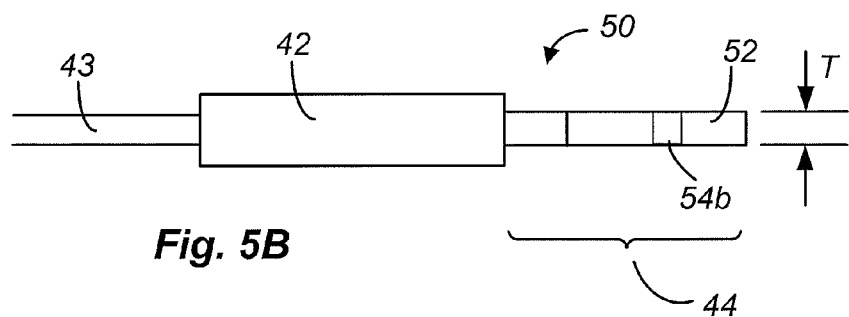

FIGS. 5A and 5B are simplified top and side views of a plug connector 50 according to an embodiment of the invention. Plug connector 50 includes many of the same features as plug connector 40 but further includes first and second retention features 54a and 54b that are adapted to engage with retention features on a corresponding receptacle connector to secure the connectors together during a mating event. Additionally, a frame 52, which is sometimes referred to as a shell and can be referred to as a ground ring when made from an electrically conductive material, provides structural support for the connector and defines the exterior shape of tab 44.

Figure 5C:
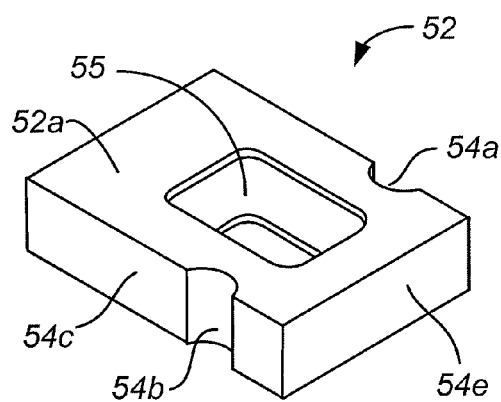
FIGS. 5C and 5D are simplified top and bottom perspective views of one embodiment of a ground ring that can be included in some embodiments of the present invention.
Figure 5D:
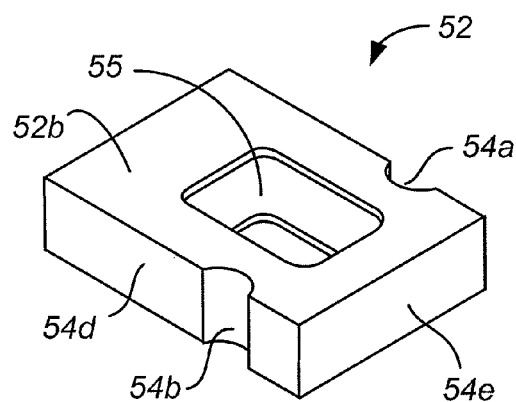

As shown in FIGS. 5C and 5D, which are simplified perspective top and bottom views, respectively, of frame 52, the frame may include first and second opposing sides 52a, 52b extending in the width and length dimensions of the frame, third and fourth opposing sides 52c, 52d extending between the first and second sides in the height and length dimensions, and an end 52e extending in the width and height dimensions between the first and second sides as well as between the third and fourth sides at the distal end of the frame. Sides 52a-52e frame a cavity 55 that can house portions of connector 50. Opposing openings 56a and 56b to cavity 55 are formed in sides 52a and 52b, respectively. Opening 56a defines the location of first contact region 46a, while opening 56b, which in some embodiments has the same size and shape as opening 56a, defines the location of second contact region 46b. Thus, as shown in FIGS. 5C and 5D, each of the contact regions is completely surrounded in the X and Y axis by the outer surface of frame 52. Such a configuration is particularly useful when frame 52 is made from an electrically conductive material, such as stainless steel or another hard conductive metal. In such embodiments, frame 52 can be grounded (and thus can be referred to as ground ring 52) in order to minimize interference that may otherwise occur on the contacts of connector 50. Thus, in some embodiments, ground ring 52 may provide electrostatic discharge (ESD) protection and electromagnetic compatibility (EMC) and act as a single ground reference for all signals carried over the connector.

First and second retention features 54a and 54b can be formed on the opposing sides of tab 44 within frame 52. Retention features 54a, 54b are part of a retention system that includes one or more features on the plug connector that are adapted to engage with one or more features on the corresponding receptacle connector to secure the connectors together when the plug connector is inserted into the receptacle connector. In the illustrated embodiment, retention features 54a, 54b are semi-circular indentations in the side surfaces of tab 44 that extend from surface 44a to surface 44b. The retention features may be widely varied and may include angled indentations or notches, pockets that are formed only at the side surfaces and do not extend to either of the surfaces 44a, 44b upon which contact regions 46a, 46b are formed, or other recessed regions. The retention features are adapted to engage with a retention mechanism on the receptacle connector that can be similarly widely varied. The retention mechanism(s) may be, for example, one or more springs that includes a tip or surface that fits within indentations 54a, 54b, one or more spring loaded detents, or similar latching mechanisms. The retention system, including retention features 54a, 54b and the corresponding retention mechanism on the receptacle connector, can be designed to provide specific insertion and extraction forces such that the retention force required to insert the plug connector into the receptacle connector is higher than the extraction force required to remove the plug connector from the receptacle connector.

While retention features 54a, 54b are shown in FIGS. 5A-5C as having a female mating characteristic and the retention mechanism associated with the receptacle connector was described above as having a male characteristic that is moved into the retention features 54a, 54b, in other embodiments these roles may differ. For example, in one embodiment, retention features 54a, 54b may be spring loaded projections that engage with a female retention mechanism on the receptacle connector. In still other embodiments, one of features 54a, 54b may be male-oriented while the other of features 54a, 54b is female-oriented. In other embodiments, other retention mechanisms can be used such as mechanical or magnetic latches or orthogonal insertion mechanisms. Additionally, while retention features 54a and 54b are shown in FIG. 5A as being formed in frame 52, in embodiments of the invention that do not include a frame, the retention features can be formed in whatever structure or material makes up tab 44.

Retention features 54a, 54b can also be located at a variety of positions along connector 50 including along the side surfaces of tab 44 and/or top and bottom surfaces of tab 44. In some embodiments, retention features 54a, 54b can be located on a front surface 42a of body 42 and adapted to engage with a retention mechanism located on a front exterior surface of the receptacle connector. In the embodiment illustrated in FIGS. 5A-5C, retention features 54a, 54b are positioned within the last third of the length of tab 44. The inventors have determined that positioning the retention features and corresponding latching mechanism in the receptacle connector near the end of the plug connector helps to better secure the connector sideways when it is in an engaged position within the receptacle connector.

Figure 6A:
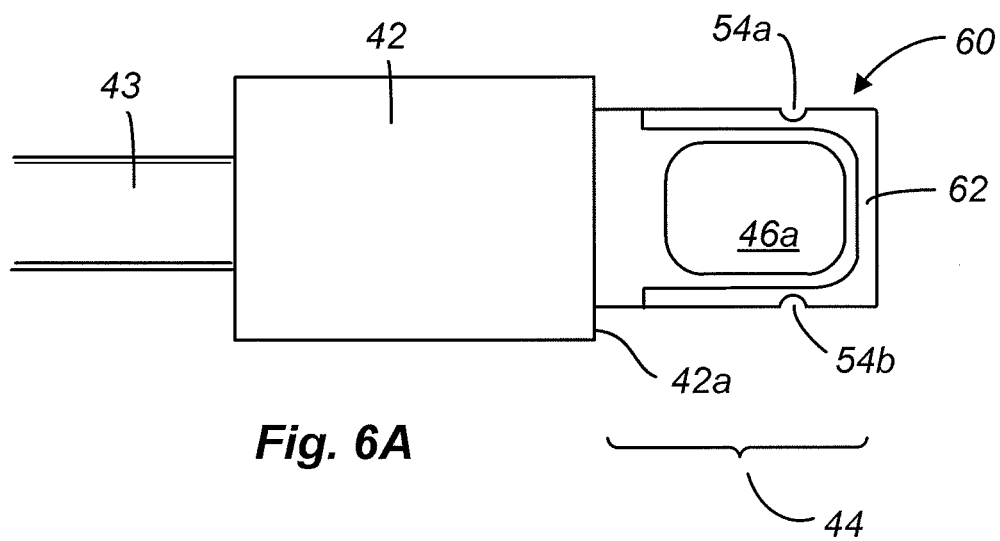
FIG. 6A is simplified top view of a plug connector 60 according to another embodiment of the present invention.
Figure 6B:
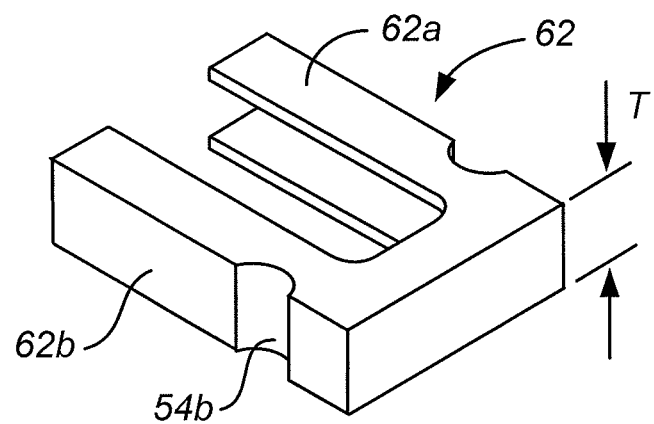
FIG. 6B is a simplified perspective views of another embodiment of a ground ring according to the present invention.

Reference is now made to FIGS. 6A and 6B. FIG. 6A is a simplified top view of a plug connector 60 according to another embodiment of the invention, while FIG. 6B is a simplified perspective view of a frame 62 that forms part of tab 44 of connector 60. Frame 62 is a u-shaped frame that extends from the distal tip of connector 60 along the side of the connector towards body 42 and has a thickness that is equivalent to the thickness (T) of connector 60. Frame 62 includes side portions 62a, 62b that may have varying lengths in different embodiments. In some embodiments sides 62a, 62b extend past contact regions 46a, 46b all the way to the body 42 of the connector. In other embodiments the sides may extend past contact regions 46a, 46b but not all the way to body 42 (as shown in FIG. 7B); may extend exactly to the end of contact regions 46a, 46b or may be relatively short and extend only partially along the length of the contact regions. Contact regions 46a, 46b lie between the opposing sides 62a, 62b. As with frame 52, frame 62 can be made out of an electrically conductive material and referred to as ground ring 62.

The contact regions 46a, 46b in any of connectors 40, 50 or 60 discussed above (as well as connectors 80, 90, 100 and others discussed below) may include any number of external contacts, from one to twenty or more arranged in a variety of different patterns. FIGS. 7A-7H provide different examples of contact arrangements within a contact region 46 according to different embodiments of the invention. As shown in FIG. 7A, contact region 46 may include two contacts 71(1) and 71(2) that are centered and symmetrically positioned within the contact region. Similarly, FIG. 7B depicts a contact region 46 having three contacts 72(1) . . . 72(3) centered and symmetrically positioned within the contact region, while FIGS. 7C and 7D depict contact regions 46 having four such contacts, 73(1) . . . 73(4), and eight such contacts, 74(1) . . . 74(8), respectively.

In some embodiments, individual contacts may be sized differently. This may be particularly useful, for example, where one or more contacts are dedicated to carry high power or high current. FIG. 7E depicts one such embodiment where seven contacts 75(1) . . . 75(7) are arranged in a single row within contact region 46 and a center contact 75(4) is two or three times as wide as the other contacts.

While each of FIGS. 7A-7E include a single row of contacts within region 46, some embodiments of the invention may include two, three or more rows of contacts. As examples, contact region 46 shown in FIG. 7F includes two rows of four contacts 76(1) . . . 76(4) and 76(5) . . . 76(8) with each row being centered between the sides of the contact region and symmetrically spaced with respect to a center line traversing the length of the contact region;

FIG. 7G shows a contact region 46 having a first row of three contacts 77(1) . . . 77(3) and a second row of four contacts 77(4) . . . 77(7) positioned within the contact region; and FIG. 7H depicts a contact region 46 having three rows of three contacts for a total of nine contacts 78(1) . . . 78(9).

Each of the contact regions 46 shown in FIGS. 7A-7H is representative of both regions 46a and 46b according to particular embodiments of the invention. That is, according to one embodiment of the invention, a plug connector may include two contact regions 46a and 46b each of which includes two contacts as shown in region 46 in FIG. 7A. In another embodiment, a plug connector may include contact regions 46a and 46b each of which includes three contacts as shown in FIG. 7B. Still other embodiments of the invention include: a plug connector having contact regions 46a and 46b as shown in region 46 in FIG. 7C; a plug connector having contact regions 46a and 46b as shown in region 46 in FIG. 7D; a plug connector having contact regions 46a and 46b as shown in region 46 in FIG. 7E; a plug connector having contact regions 46a and 46b as shown in region 46 in FIG. 7F; a plug connector having contact regions 46a and 46b as shown in region 46 in FIG. 7G; and a connector 40 having contact regions 46a and 46b as shown in region 46 in FIG. 7H.

Contacts within regions 46a, 46b may include contacts designated for a wide variety of signals including power contacts, ground contacts, analog contacts and digital contacts among others. In some embodiments, one or more ground contacts are formed in regions 46a and 46b while in other embodiments, ground contacts are only located at the tip 44e and/or on the side surfaces 44c, 44d of connector 40. Embodiments that employ ground contacts at one or more positions along the peripheral side and/or tip surfaces of connector 40 instead of within contact regions 46a and 46b may enable the overall footprint of connector tab 44 to be smaller than a similar connector that includes ground contacts in contact regions 46a or 46b.

Power contacts within regions 46a, 46b may carry signals of any voltage and, as an example, may carry signals between 2-30 volts. In some embodiments, multiple power contacts are included in regions 46a, 46b to carry power signals of different voltages levels that can be used for different purposes. For example, one or more contacts for delivering low current power at 3.3 volts that can be used to power accessory devices connected to connector 40 can be included in regions 46a, 46b as well as one or more contacts for delivering high current power at 5 volts for charging portable media devices coupled to connector 40. As discussed with respect to FIG. 7E, in some embodiments one or more power contacts within regions 46a, 46b can be larger than other contacts to more efficiently enable the larger contacts to carry high power and/or high current. In other embodiments, multiple contacts can be electrically coupled together to provide one or more "larger contacts" for carrying high power and/or high current. For example, in one embodiment contacts 74(4) and 75(5) shown in FIG. 7D may be electrically coupled together to act as a single power contact.

Examples of analog contacts that may be included in contact regions 46a, 46b include contacts for separate left and right channels for both audio out and audio in signals as well as contacts for video signals, such as RGB video signals, YPbPr component video signals and others. Similarly, many different types of digital signals can be carried by contacts in regions 46a, 46b including data signals such as, USB signals (including USB 1.0, 2.0 and 3.0), FireWire (also referred to as IEEE 1394) signals, UART signals, Thunderbolt signals, SATA signals and/or any other type of high speed serial interface signal or other type of data signal. Digital signals within contact regions 46a, 46b may also include signals for digital video such as DVI signals, HDMI signals and Display Port signals, as well as other digital signals that perform functions that enable the detection and identification of devices or accessories to connector 40.

In some embodiments, dielectric material is filled in between individual contacts in contact regions 46a, 46b by, for example, using injection molding techniques so that it is flush with the upper surface of the contacts. The dielectric material separates adjacent contacts from each other and separates the set of contacts in the contact region from the frame or the metal surface of the ground ring that surrounds the contacts. In some embodiments the dielectric material and contacts form a flush outer surface of tab 44 that provides a smooth, consistent feel across the surfaces of tab 44, while in other embodiments, each of contact regions 46a, 46b, including the dielectric material and contacts, may be recessed a very small amount (e.g., between 0.2 and 0.01 mm) to help ensure that none of the individual contacts protrude above the outer surface of frame 52, which increases the susceptibility that, over 1000's of use cycles, the protruding or "proud" contact will somehow be mechanically dislodged from the connector. Additionally, to improve robustness and reliability, connector 40 can be fully sealed and includes no moving parts.

To better understand and appreciate the 180 degree symmetrical dual orientation design of some embodiments of the invention, reference is made to FIGS. 8A-8C which depict a plug connector 80 according to a specific embodiment of the invention that includes four individual contacts formed within each of contact regions 46a and 46b. Specifically, FIGS. 8A and 8B are simplified views of a first side 44a and an opposing second side 44b, respectively, of connector 80, while FIG. 8C is a simplified cross-sectional view of connector 80 taken along line A-A' (shown in FIG. 8A) that also includes a schematic representation of electrical connections between the contacts of the connector. As shown in FIG. 8C, each of contacts 73(1) . . . 73(4) at surface 44a of connector 80 is electrically coupled to a contact directly opposite itself at surface 44b by an electrical connection 82(1) . . . 82(4) that is represented in schematic form. For ease of reference, contacts that are electrically coupled together on two different sides of the connector are referred to by the same contact number and are sometimes referred to herein as a "corresponding pair" of contacts or "matching connected contacts". Electrical contact between corresponding pairs of contacts can be made in a variety of ways. In some embodiments electrical contact between contacts in a corresponding pair is made within tab 44 or body 42. As one example, a printed circuit board (PCB) that includes contact pads printed on its upper and lower surfaces can extend within tab 44. Through holes or vias may be formed in the printed circuit board directly between contact pads on opposing surfaces and filled with an electrically conductive material (e.g., copper) to electrically connect each contact pad formed on the upper surface to a corresponding contact pad on the opposite surface. Individual contacts at surface 44a of the connector soldered to contact pads on one side of the PCB can thus be electrically connected to matching connected contacts at surface 44b soldered to contact pads on the other side of the PCB. In other embodiments where a ground ring does not surround the contacts at the tip of the connector, the contacts can be coupled together by wrapping around the tip of the connector from surface 44a to surface 44b instead of being electrically connected through tab 44.

Turning now to FIG. 8A and the dual orientation aspect of connector 80, contact region 46a may include four evenly spaced contacts 73(1) . . . 73(4) formed within the region. With respect to a center plane 59 that is perpendicular to and passes through the middle of connector 50 along its length, contacts 73(1) and 73(2) are in a mirrored relationship with contacts 73(3) and 73(4) across center line 59. That is, the spacing from center line 59 to contact 73(2) is the same as the spacing from center line 59 to contact 73(3). Also, the spacing from center line 59 to contact 73(1) is the same as the spacing from centerline 59 to contact 73(4). Contacts in each of the pairs of contacts 73(1), 73(4) and 73(2), 73(3) are also spaced equally from the sides 44c and 44d of the connector with respect to each other and are spaced along the length of tab 44 an equal distance from end surface 44e.

Similarly, in FIG. 8B contact region 46b includes the same number of contacts as region 46a that are also spaced according to the same spacing as in region 46a. Thus, contact region 46b includes four contacts 73(1) . . . 73(4) spaced within region 46b according to the same layout and spacing as contacts 73(1) . . . 73(4) within region 46a. Because the layout and spacing of contacts in regions 46a and 46b are identical, absent some sort of indicia or mark on one of surfaces 44a or 44b, the surfaces and contact layout on each of surfaces 44a, 44b may look identical or at least substantially the same.

As mentioned above, connector 80 can be mated with a receptacle connector that has a single set of contacts, not counting ground contacts, on an interior surface. As an example, FIGS. 9A and 9B are simplified diagrams that depict plug connector 80 mated with a receptacle connector 85 in two different possible mating orientations. Receptacle connector 85 includes a housing 86 that defines a cavity 87. Contacts 88(1) . . . 88(4) are positioned along a first interior surface of cavity 87 and ground contacts 88(a) and 88(b) are positioned on the side interior surfaces of the cavity. There are no contacts on a second interior surface opposite the first interior surface.

As shown in FIGS. 9A and 9B, when tab 44 of connector 80 is fully inserted within cavity 87 each of contacts 73(1) . . . 73(4) aligns with and is in physical contact with one of contacts 88(1) . . . 88(4) regardless of which of the two possible orientations (referred to herein as "up" or "down" for convenience but it is to be appreciated that these are relative terms intended to connote a 180 degree change in the orientation of the connector only) connector 80 is inserted into cavity 87. When connector 80 is inserted within cavity 87 with side 44a up (FIG. 9A), contact 73(1) aligns with contact 88(1), contact 73(2) aligns with contact 88(2), contact 73(3) aligns with contact 88(3), and contact 73(4) aligns with contact 88(4). When connector 80 is inserted within cavity 87 with side 44b up (FIG. 9B), the contacts align differently such that contact 73(4) aligns with contact 88(1), contact 73(3) aligns with contact 88(2), contact 73(2) aligns with contact 88(3), and contact 73(1) aligns with contact 88(4). Additionally, when plug connector 80 includes side ground contacts 73a, 73b, each side contact aligns with one of side ground contacts 88a, 88b from receptacle connector 85 in either of the two possible insertion orientations as shown in FIGS. 9A and 9B.

Thus, whether plug connector 80 is inserted into receptacle connector 85 in either the "up" or "down" position, proper electrical contact can be made between the contacts in the plug connector and the receptacle connector. Some embodiments of the invention further pertain to an electronic host device that includes a receptacle connector and circuitry that switches the functionality of the receptacle connector contacts pins based on the insertion orientation of the plug connector. In some embodiments, a sensing circuit in the receptacle connector or the host electronic device in which the receptacle connector is housed, can detect the orientation of the plug connector and set software and/or hardware switches to switch internal connections to the contacts in the receptacle connector and properly match the receptacle connector's contacts to the plug connector's contacts as appropriate. Details of various embodiments of such circuitry are set forth in concurrently filed and commonly-owned U.S. application Ser. No. 13/607,550, the contents of which are incorporated herein in their entirety for all purposes.

In some embodiments the orientation of the plug connector can be detected based on a physical orientation key (different from a polarization key in that an orientation key does not prevent the plug connector from being inserted into the receptacle connector in multiple orientations) that, depending on the orientation of the plug connector, engages or does not engage with a corresponding orientation contact in the receptacle connector. Circuitry connected to the orientation contact can then determine which of the two possible orientations the plug connector was inserted into the receptacle connector. In other embodiments, orientation of the plug connector can be determined by detecting a characteristics (e.g., voltage or current level) at one or more of the contacts or by sending and receiving signals over one or more of the contacts using a handshaking algorithm. Circuitry within the host device that is operatively coupled to the receptacle connector can then set software and/or hardware switches to properly match the receptacle connector's contacts to the contacts of the plug connector.

While each contact in contact area 46a of connector 80 is electrically connected to a contact directly opposite itself in contact area 46b, in other embodiments, contacts in contact area 46a can be electrically connected to contacts in contact in area 46b that are not directly opposite each other. FIGS. 10A-10C, which are similar to FIGS. 8A-8C and depict a connector 90 having four contacts spaced identically to that of connector 80, are illustrative of one such an embodiment where each contact in contact area 46a is connected to a corresponding contact in contact area 46b that are spaced in a cater cornered relationship with each other. As shown in FIG. 10A, the layout of contacts 73(1) ... 73(4) in contact region 46a of connector 90 is identical to the layout of the contacts in region 46a of connector 80. In connector 90, however, contact 73(1) in contact area 46a is electrically coupled to a corresponding contact in contact area 46b, contact 73(1), that is on the opposite side of centerplane 59 and spaced the same distance from the centerplane. Similarly, contacts 73(2), 73(3) and 73(4) in contact area 46a are each electrically coupled to a matching contact 73(2), 73(3) and 73(4) in contact area 46b located in a cater cornered relationship on the opposite side of and spaced the same distance from centerline 59.

Electrical contact between contacts in a corresponding pair of contacts in connector 90 can be made in any appropriate way. In one embodiment, connections between matching contacts are made within the tab and/or body of the connector. As one example, a PCB with contact pads printed on its upper and lower surfaces, one for each of contacts 73(1) ... 73(4) in each of regions 46a and 46b, can extend through the interior of tab 44. A series of conductive lines, through holes and vias formed on the PCB can electrically connect each contact from contact region 46a to its matching connected contact in region 46b according to the schematic in FIG. 10C.

Electrically connecting the contacts between surfaces 46a and 46b in the manner shown in FIG. 10C provides the benefit that, regardless of which of the two possible orientations connector 90 is mated with the receptacle connector, the contacts in the receptacle connector align with the same contacts in connector 90. FIGS. 11A and 11B, which are simplified diagrams showing connector 90 mated with receptacle connector 85 in two different possible mating orientations, illustrate this aspect of the embodiment of FIG. 10C. In FIG. 11A, connector 90 is inserted within cavity 87 of connector 85 with side 44a up. In this alignment, plug connector contact 73(1) is in physical contact with receptacle connector contact 88(1), plug connector contact 73(2) is in physical contact with receptacle connector contact 88(2), plug connector contact 73(3) is in physical contact with receptacle connector contact 88(3), and plug connector contact 73(4) is in physical contact with receptacle connector contact 88(4).

As shown in FIG. 11B, when plug connector 90 is inserted within receptacle connector 85 with side 44b up, the contacts align exactly the same way. Thus, a receptacle connector 85 designed to mate with connector 90 does not need to include circuitry that switches the contacts based on the orientation of connector 90. Additionally, as with connector 80, if connector 90 includes side contacts 73a, 73b, each side contact aligns with one of the side contacts 88a, 88b regardless of the insertion orientation.

In still other embodiments, some of individual contacts in contact region 46a can be connected to matching contacts in region 46b directly opposite each other as shown in FIGS. 8A-8C, while other individual contacts in contact region 46a can be connected to matching contacts in region 46b positioned in a cater corner relationship to each other as shown in FIGS. 10A-10C. For example, center contacts 73(2) and 73(3) can be connected together as shown in FIGS. 8A-8C while outer contacts 73(1) and 73(4) can be connected together as shown in FIGS. 10A-10C.

To facilitate the dual orientation feature of certain embodiments of the invention, some or all of the contacts within contact regions 46a, 46b of an connector can be arranged such that similarly purposed contacts are positioned within each of the contact regions in a mirrored relationship with each other with respect to a plane 59 (center plane) that bisects the connector along the length of tab 44. For example, referring back to FIG. 8A, contact 73(1) is in a mirrored relationship with contact 73(4) as each contact is within the same row and is spaced the same distance from plane 59 but on opposite sides of the center plane. Similarly, contact 73(2) is in a mirrored relationship with contact 73(3) with respect to center line 59. Similarly purposed contacts are contacts that are designated to carry similar signals. Examples of similarly purposed contact pairs may include, first and second power contacts, left and right audio out contacts, first and second ground contacts, a pair of differential data contacts or two differential data contacts of the same polarity (e.g., two positive or two negative differential data contacts), a pair of serial transmit and receive contacts, and/or other general first and second digital contacts.

The symmetrical mirrored relationship between similarly purposed contacts within each of regions 46a, 46b ensures that for each pair of similarly purposed contacts in a mirrored relationship, one of the similarly purposed contacts will be electrically connected to a contact in the receptacle connector that is either dedicated to the particular contact or can be readily switched to the particular contact. This in turn simplifies the switching circuitry required within the receptacle connector. As an example, where contacts 73(1) and 73(4) are similarly purposed contacts that are dedicated to a pair of differential data signals, when plug connector 80 is inserted into receptacle connector 85, one of the differential data signal contacts will be in physical contact with receptacle contact 88(1) and the other of the differential data signal contacts will be in physical contact with receptacle contact 88(4) regardless of whether the plug connector is mated with the receptacle connector in an "up" or "down" insertion orientation. Thus, both the receptacle contacts 88(1) and 88(4) can be differential data contacts (or can be operatively coupled via a switch or multiplexor to circuitry that supports differential data contacts) ensuring that they will be electrically coupled to a differential data contact in the plug connector regardless of its insertion orientation. Switching circuitry within the receptacle connector thus does not need to take into account that a power contact or another contact that has internal connections very different than those required by a differential data contact may be at one of the locations that aligns with contact 88(1) or 88(4).

While FIGS. 8A-8C and 10A-10C depict particular embodiments of the invention with an even number of contacts in each of contact regions 46a and 46b, some embodiments of the invention may include an odd number of contacts in each of regions 46a, 46b. In such embodiments, one of the contacts on each side of the plug connector is a central contact that is centered around bisecting plane 59 and thus aligns with a centrally located receptacle contact in both the "up" and "down" positions. The central contacts are not in a mirrored relationship (with respect to centerline 59) per se with another contact, other than the left and right halves of the center contact mirror each other, and thus are not paired with another similarly purposed contact in the same way that other contacts might be.

Figure 12A:
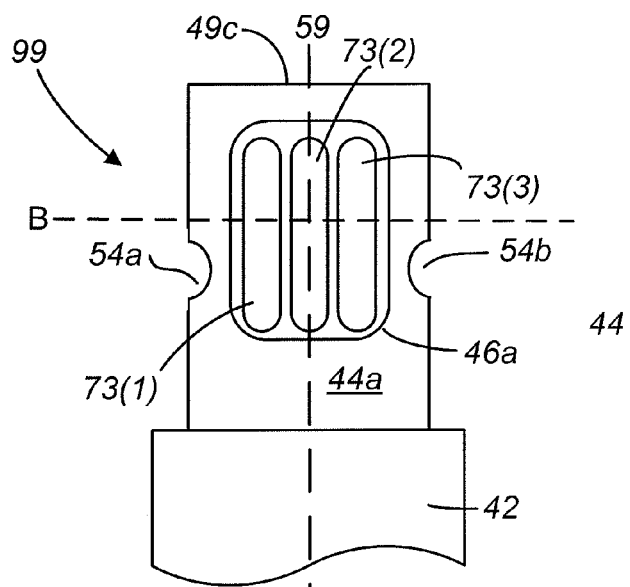
FIG. 12A is a simplified view of another embodiment of a plug connector 99 having three contacts on each opposing surface of tab 44 according to and embodiment of the present invention.
Figure 12B:
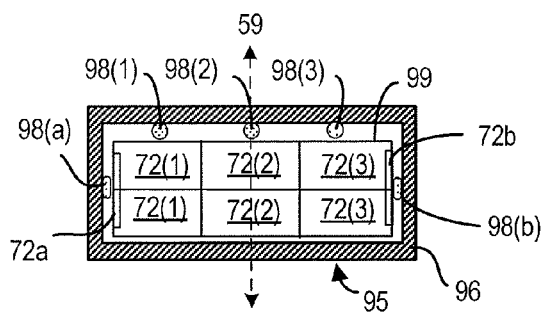
FIGS. 12B and 12C are diagrams depicting the alignment of contacts in plug connector 99 with corresponding contacts in receptacle connector 95 in different insertion orientations according to one embodiment of the invention.
Figure 12C:
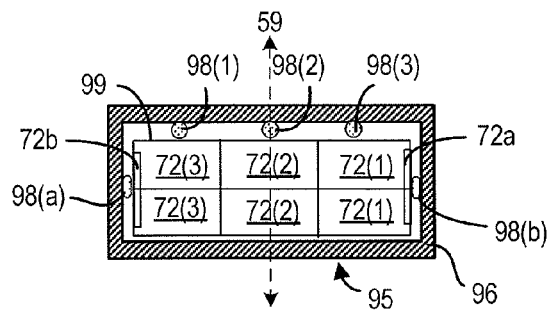

FIGS. 12A-12C illustrate this aspect of certain embodiments of the invention and depict a plug connector 99 that has three contacts 72(1) . . . 72(3) formed on the upper surface of tab 44 of the plug connector that are electrically connected to matching contacts on the lower surface as with connector 80 and FIG. 8C. When connector 99 is inserted into a corresponding receptacle connector 95 in an "up" position, contacts 72(1) . . . 72(3) align with contacts 98(1) . . . 98(3) of the receptacle connector, respectively. When the connector is inserted into receptacle connector 80 in a "down" position, contacts 72(3) . . . 72(1) are reversed and align with contacts 98(1) . . . 98(3) of the receptacle connector, respectively. In both orientations, plug connector contact 72(2) aligns with central receptacle contacts 98(2). Also, in each orientation, each of side contacts 72a, 72b align with side contacts 98a, 98b.

Reference is now made to FIGS. 13A-13C which depict a dual orientation connector 100 having eight contacts spaced apart in a single row in each of contact regions 46a and 46b according to an embodiment of the invention. FIG. 13A is a simplified perspective view of connector 100 and FIGS. 13B and 13C are simplified top and bottom plan views, respectfully, of connector 100. As shown in FIG. 13A, connector 100 includes a body 42 and a tab portion 44 that extends longitudinally away from body 42 in a direction parallel to the length of the connector. A cable 43 is attached to body 42 at an end opposite of tab portion 44.

Tab 44 is sized to be inserted into a corresponding receptacle connector during a mating event and includes a first contact region 46a formed on a first major surface 44a and a second contact region 46b (not shown in FIG. 13A) formed at a second major surface 44b opposite surface 44a. Surfaces 44a, 44b extend from a distal tip of the tab to a spine 109 that, when tab 44 is inserted into a corresponding receptacle connector, abuts a housing of the receptacle connector or host device the receptacle connector is incorporated in. Tab 44 also includes first and second opposing side surfaces 44c, 44d that extend between the first and second major surfaces 44a, 44b. In some embodiments, tab 44 is between 5-10 mm wide, between 1-3 mm thick and has an insertion depth (the distance from the tip of tab 44 to spine 109) of between 5-15 mm. Also in some embodiments, tab 44 has a length that is greater than its width which is greater than its thickness. In other embodiments, the length and width of tab 44 are within 0.2 mm of each other. In one particular embodiment, tab 44 is 6.7 mm wide, 1.5 mm thick and has an insertion depth (the distance from the tip of tab 44 to spine 109) of 6.6 mm. In other embodiments, tab 44 has the same 6.7 mm width and 1.5 mm height but a longer length. Such embodiments may be particularly useful for mating with receptacle connectors with an opening in the side of an electronic device that has a curved or otherwise highly stylized enclosure. In such devices, the length of the tab can be increased by an amount that is determined by the slope of device enclosure and a height of body 42. That is, tab 44 may have a length A to operate properly with a receptacle connector housed within an enclosure having a vertical edge or face at the opening of the receptacle connector. However, to work properly with a sloped device enclosure, an additional length B may be added to compensate for the curvature of the device enclosure and additional length C may be added to compensate for the thickness of plug connector housing 42 to ensure that contacts within regions 46a, 46b are able to mate with contacts in the receptacle connector in the curved enclosure just as they would in an enclosure having a flat or vertical face. As the curve of the enclosure becomes shallower, the value of B may be correspondingly increased. Similarly, as plug connector housing 42 becomes thicker, the value of C may be increased.

The structure and shape of tab 44 is defined by a ground ring 105 that is similar to ground ring 52 shown in FIG. 5C and can be made from stainless steel or another hard conductive material. Ground ring 105 also includes a flange portion or spine 109 that includes surface 109a and 109b that extend from the spine to the surfaces 44a and 44b, respectively, of the ground ring. Connector 100 includes retention features 102a, 102b formed as curved pockets in the sides of ground ring 105 that do not extend to either of upper surface 44a or lower surface 44b. Body 42, which is connected to ground ring 105 at spine 109, is shown in FIG. 13A in transparent form (via dotted lines) so that certain components inside the body are visible. As shown, within body 42 is a printed circuit board (PCB) 104 that extends into ground ring 105 between contact regions 46a and 46b towards the distal tip of connector 100. One or more integrated circuits (ICs), such as Application Specific Integrated Circuit (ASIC) chips 108a and 108b, can be operatively coupled to PCB 104 to provide information regarding connector 100 and any accessory or device that connector 100 is part of and/or to perform specific functions, such as authentication, identification, contact configuration and current or power regulation.

As an example, in one embodiment an ID module is embodied within an IC operatively coupled to the contacts of connector 100. The ID module can be programmed with identification and configuration information about the connector and/or its associated accessory that can be communicated to a host device during a mating event. As another example, an authentication module programmed to perform an authentication routine, for example a public key encryption routine, with circuitry on the host device can be embodied within an IC operatively coupled to connector 100. The ID module and authentication module can be embodied within the same IC or within different ICs. As still another example, in embodiments where connector 100 is part of a charging accessory, a current regulator can be embodied within one of IC's 108*a* or 108*b*. The current regulator can be operatively coupled to contacts that are able to deliver power to charge a battery in the host device and regulate current delivered over those contacts to ensure a constant current regardless of input voltage and even when the input voltage varies in a transitory manner.

Bonding pads 110 can also be formed within body 42 near the end of PCB 104. Each bonding pad can be connected to a contact or contact pair within regions 46*a* and 46*b*. Wires (not shown) within cable 43 can then be soldered to the bonding pads to provide an electrical connection from the contacts to the accessory or device that connector 100 is associated with. Generally, there is one bonding pad and one wire within cable 43 for each set of electrically independent contacts (e.g., a pair of matching connected contacts, one in region 46*a* and one in region 46*b* that are electrically coupled to each other through PCB 104) of connector 100. Additionally, one or more ground wires (not shown) from cable 43 can also be soldered or otherwise connected to ground ring 105 for a ground signal.

As shown in FIGS. 13B, 13C, eight external contacts 106(1) . . . 106(8) are spaced apart along a single row in each of contact regions 46*a*, 46*b*. Each contact in contact region 46*a* is electrically connected to a corresponding contact in contact region 46*b* on the opposite side of the connector. Contacts 106(1) . . . 106(8) can be used to carry a wide variety of signals including digital signals and analog signals as well as power and ground as previously discussed. In one embodiment, each contact 106(1) . . . 106(8) has an elongated contact surface. In one embodiment the overall width of each contact is less than 1.0 mm at the surface, and in another embodiment the width is between 0.75 mm and 0.25 mm. In one particular embodiment, a length of each contact 106(*i*) is at least 3 times as long at the surface than its width, and in another embodiment a length of each contact 106(*i*) is at least 5 times as long at the surface than its width.

Figure 14A:
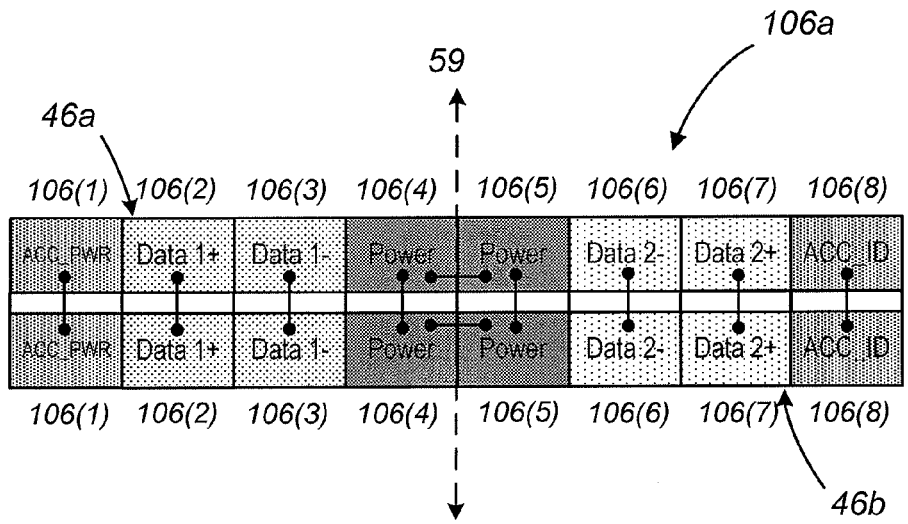
FIG. 14A is a diagram illustrating a pinout arrangement of connector 100 according to one embodiment of the invention.

FIG. 14A depicts one particular implementation of a pinout 106*a* for plug connector 100 according to one embodiment of the invention. Pinout 106*a* includes eight contacts 106(1) . . . 106(8) that can correspond to the contacts in FIGS. 13A-13C. Each of contacts 106(1) . . . 106(8) in pinout 106*a* are mirrored contacts meaning an individual contact 106(*i*) is coupled to another contact 106(*i*) directly opposite itself on the opposing side of the connector. Thus, each of contacts 106(1) . . . 106(8) is in a mirrored relationship with an identical contact, which for convenience is represented by the same reference number as its counterpart or mirrored contact.

As shown in FIG. 14A, pinout 106*a* includes two contacts 106(4), 106(5) that are electrically coupled together to function as a single contact dedicated to carrying power; first and second accessory contacts 106(1) and 106(8) that can be used for an accessory power signal and an accessory ID signal, and four data contacts 106(2), 106(3), 106(6) and 106(7). There is no dedicated contact for ground in any of contacts 106(1) . . . 106(8) on the upper or lower surfaces of the connector. Instead, ground is taken between the ground ring (not shown in FIG. 14A) and contacts in the side of the corresponding receptacle connector as discussed above.

Power contacts 106(4), 106(5) can be sized to handle any reasonable power requirement for a portable electronic device, and for example, can be designed to carry between 3-20 Volts from an accessory to charge a host device connected to connector 100. Power contacts 106(4), 106(5) are positioned in the center of contact regions 46*a*, 46*b* to improve signal integrity by keeping power as far away as possible from the sides of ground ring 105.

Accessory power contact 106(1) can be used for an accessory power signal that provides power from the host to an accessory. The accessory power signal is typically a lower voltage signal than the power in signal received over contacts 106(4) and 106(5), for example, 3.3 volts as compared to 5 volts or higher. The accessory ID contact provides a communication channel that enables the host device to authenticate the accessory and enables the accessory to communicate information to the host device about the accessory's capabilities as described in more detail below.

Data contacts 106(2), 106(3), 106(6) and 106(7) can be used to enable communication between the host and accessory using one or more of several different communication protocols. In some embodiments, data contacts 106(2) and 106(3) operate as a first pair of data contacts and data contacts 106(6), 106(7) operate as a second pair of data contacts allowing two different serial communication interfaces to be implemented over the data contacts as discussed below. In pinout 106*a*, data contacts 106(2), 106(3) are positioned adjacent to and on one side of the power contacts, while data contacts 106(6) and 106(7) are positioned adjacent to but on the other side of the power contacts. The accessory power and accessory ID contacts are positioned at each end of the connector. The data contacts can be high speed data contacts that operate at rate that is at least two orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 14B:
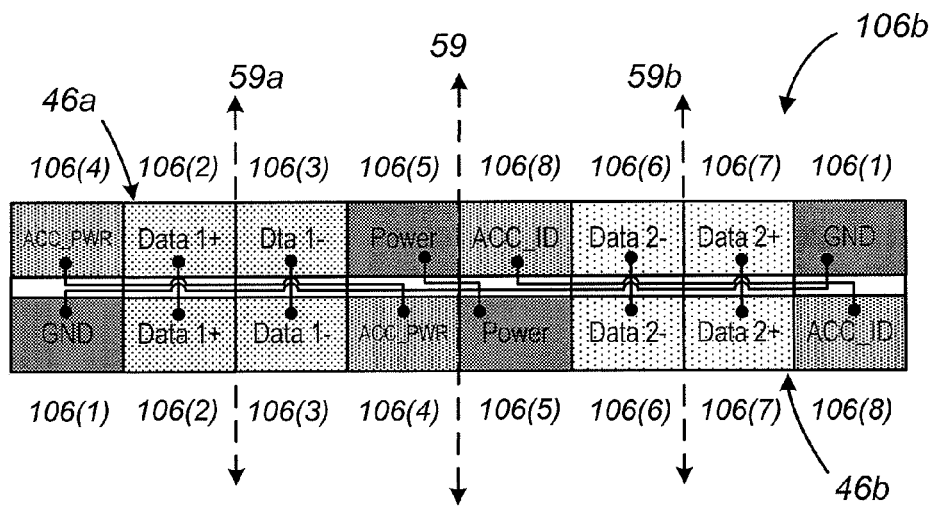
FIG. 14B is a diagram illustrating a pinout arrangement of connector 100 according to another embodiment of the invention.

FIG. 14B depicts an implementation of a pinout 106*b* for plug connector 100 according to another embodiment of the invention. Similar to pinout 106*a*, pinout 106*b* also includes eight contacts 106(1) . . . 106(8) on each side of connector 100 that can correspond to the contacts in FIGS. 13A-13C. Pinout 106*a* differs from pinout 106*b* in that some of the contacts are mirrored contacts while other contacts are in a cater corner relationship with each other across either a centerline 59 of the connector or across one of two quarter lines 59*a*, 59*b* of the connector as described below (as used herein, the term "quarter line" does not encompass the centerline). Also, pinout 106*a* includes a single power contact instead of two power contacts on each side of the connector and adds a dedicated ground contact.

Specifically, as shown in FIG. 14B, pinout 106*b* includes a first pair of mirrored data contacts 106(2), 106(3) and a second pair of mirrored data contacts 106(6) and 106(7) where each individual mirrored data contact is electrically connected to a corresponding data contact directly opposite itself on the opposing side of the connector. The power contact 106(5) includes two contacts positioned in a cater corner relationship with each other across centerline 59, while the ground contact 106(1) includes two contacts positioned in a cater corner relationship with each other across centerline 59. The accessory power contact 106(4) and accessory ID contact, on the other hand, are positioned in a cater corner relationship with counterpart contacts across quarter lines 59*a* and 59*b*, respectively. When connector 100 includes the pinout 106*b*, one side of connector 100 may have contacts 106(1) . . . (8) ordered sequentially as shown in FIG. 14B, while and the other side of connector 100, includes contacts ordered as follows: 106(1), 106(7), 106(6), 106(8), 106(5), 106(3), 106(2), 106(4) where each individual contact 106(*i*) is electrically coupled to a contact having the same reference number on the opposite side of the connector as shown in FIG. 14B.

Power contact 106(5) can be sized to handle any reasonable power requirement for a portable electronic device, and for example, can be designed to carry between 3-20 Volts from an accessory to charge a host device connected to connector 100. Ground contact 106(8) provides a dedicated ground contact at one end of the row of contacts as far away as possible from power contact 106(5). Ground in pinout 106*b* is also provided through the ground ring 105 via contacts in the side of the corresponding receptacle connector as with pinout 106*a*. The additional, dedicated ground contact 106(1), however, provides additional ground coverage and provides a benefit in that the contact integrity of ground pin 106(1) can be specifically designed to carry the electrical ground signal (e.g., using gold plated copper contacts) without being constrained by the hardness or other requirements associated with the contacts in the side of ground ring 105 that ensure the ground ring is sufficiently robust to withstand multiple thousands of use cycles.

Data contacts 106(2), 106(3), 106(6) and 106(7) in pinout 106*b* can be identical to the data contacts discussed with respect to pinout 106*a*. In pinout 106*b*, each pair of data contacts 106(2), 106(3) and 106(6), 106(7) is positioned between either power contact 106(5) or ground contact 106 (1), each of which carries a DC signal, and one of the accessory power or accessory ID contacts 106(4) and 106(8), respectively, which carry either an accessory power signal (a DC signal) or a relatively low speed accessory ID signal. As discussed above, the data contacts can be high speed data contacts that operate at rate that is at least two orders of magnitude faster than the accessory ID signals making it look essentially like a DC signal to the high speed data lines.

Thus, positioning the data contacts between either the power contacts or ground contacts and the ACC contacts improves signal integrity by sandwiching the data contacts between contacts designated for DC signals or essentially DC signals.

In one embodiment, pinout 106*a* represents the signal assignments of a plug connector 100 in a plug connector/receptacle connector pairing that can be the primary physical connector system for an ecosystem of products that includes both host electronic devices and accessory devices. In another embodiment, pinout 106*b* represents such signal assignments. Examples of host devices include smart phones, portable media players, tablet computers, laptop computers, desktop computers and other computing devices. An accessory can be any piece of hardware that connects to and communicates with or otherwise expands the functionality of the host. Many different types of accessory devices can be specifically designed or adapted to communicate with the host device through connector 100 to provide additional functionality for the host. Plug connector 100 can be incorporated into each accessory device that is part of the ecosystem to enable the host and accessory to communicate with each other over a physical/electrical channel when plug connector 100 from the accessory is mated with a corresponding receptacle connector in the host device. Examples of accessory devices include docking stations, charge/sync cables and devices, cable adapters, clock radios, game controllers, audio equipment, memory card readers, headsets, video equipment and adapters, keyboards, medical sensors such as heart rate monitors and blood pressure monitors, point of sale (POS) terminals, as well as numerous other hardware devices that can connect to and exchange data with the host device.

It can be appreciated that some accessories may want to communicate with the host device using different communication protocols than other accessories. For example, some accessories may want to communicate with the host using a differential data protocol, such as USB 2.0, while other accessories may want to communicate with the host using an asynchronous serial communication protocol. In one embodiment data contacts 106(2), 106(3), 106(6) and 106(7) can be dedicated to two pairs of differential data contacts, two pairs of serial transmit/receive contacts, or one pair of differential data contacts and one pair of serial transmit/receive contacts depending on the purpose of connector 100 or function of the accessory connector 100 is part of As an example that is particularly useful for consumer-oriented accessories and devices, the four data contacts can accommodate two of the following three communication interfaces: USB 2.0, Mikey Bus or a universal asynchronous receiver/transmitter (UART) interface. As another example that is particularly usefully for debugging and testing devices, the set of data contacts can accommodate two of either USB 2.0, UART or a JTAG communication protocols. In each case, the actual communication protocol that is used to communicate over a given data contact can depend on the accessory as discussed below.

As mentioned above, connector 100 may include one or more integrated circuits that provide information regarding the connector and any accessory or device it is part of and/or perform specific functions. The integrated circuits may include circuitry that participates in a handshaking algorithm that communicates the function of one or more contacts to a host device that connector 100 is mated with. For example, an ID module can be embodied within IC 108*a* as discussed above and operatively coupled to the ID contact, contact 106(8) in each of pinouts 106*a* and 106*b*, and an authentication module can be embodied in IC 108*a* with the ID module or in a separate IC, such as IC 108*b*. The ID and authentication modules each include a computer-readable memory that can be programmed with identification, configuration and authentication information relevant to the connector and/or its associated accessory that can be communicated to a host device during a mating event. For instance, when connector 100 is mated with a receptacle connector in a host electronic device, the host device may send a command over its accessory ID contact (that is positioned to align with the ID contact of the corresponding plug connector) as part of a handshaking algorithm to determine if the accessory is authorized to communicate and operate with the host. The ID module can receive and respond to the command by sending a predetermined response back over the ID contact. The response may include information that identifies the type of accessory or device that connector 100 is part of as well as various capabilities or functionalities of the device. The response may also communicate to the host device what communication interface or communication protocol the connector 100 employs on each of data contact pairs 106(2), 106(3) and 106(6), 106(7). If connector 100 is part of a USB cable, for example, the response sent by the ID module may include information that tells the host device that contacts 106(2) and 106(3) are USB differential data contacts. If connector 100 is a headset connector, the response may include information that tells the host that contacts 106(6) and 106(7) are Mikey Bus contacts. Switching circuitry within the host can then configure the host circuitry operatively coupled to the contacts in the receptacle connector accordingly as discussed below.

During the handshaking routine the authentication module can also authenticate connector 100 (or the accessory it is part of) and determine if connector 100 (or the accessory) is an appropriate connector/accessory for the host to interact with using any appropriate authentication routine. In one embodiment authentication occurs over the ID contact prior to the identification and contact switching steps. In another embodiment authentication occurs over one or more of the data contacts after they are configured according to response sent by the accessory.

FIGS. 15A and 15B depict one embodiment of a receptacle connector 140 according to the invention that can be included in a host device to enable an accessory having a connector 100 to be physically coupled to the host device. As shown in FIGS. 15A, 15B, receptacle connector 140 includes eight contacts 146(1) ... 146(8) that are spaced apart in a single row. In one embodiment, receptacle connector 140 the pinout of contacts 146(1) ... 146(8) is compatible with a plug connector having pinout 106a, and in another embodiment the pinout of contacts 146(1) ... 146(8) is compatible with a plug connector having pinout 106b. The contacts are positioned within a cavity 147 that is defined by a housing 142. Receptacle connector 140 also includes side retention mechanisms 145a, 145b that engage with retention features 102a, 102b in connector 100 to secure connector 100 within cavity 147 once the connectors are mated. Retention mechanisms 145a, 145b can be, for example springs, and can be made from an electrically conductive material to double as ground contacts. Receptacle connector 140 also includes two contacts 148(1) and 148(2) (sometimes referred to as "connector detect" contacts) that are positioned slightly behind the row of signal contacts and can be used to detect when connector 100 is inserted within cavity 140 and detect when connector 100 exits cavity 140 when the connectors are disengaged from each other.

Figure 16A:
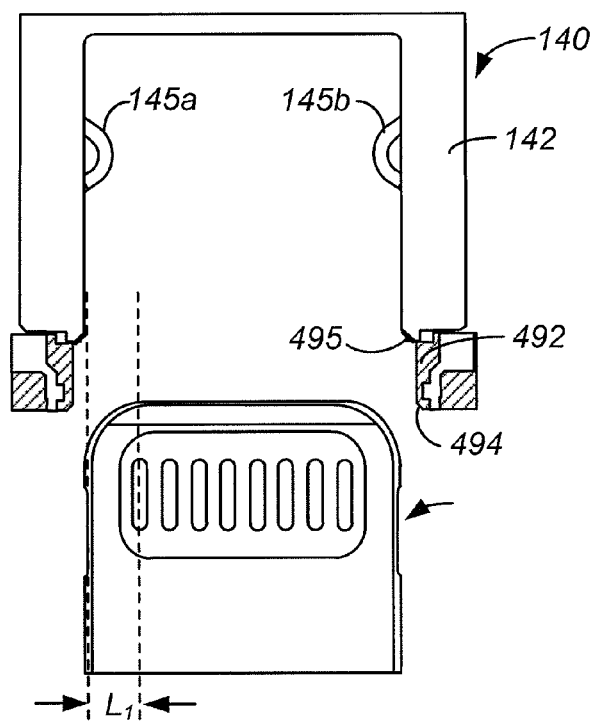
FIGS. 16A-16K are simplified views depicting a sequence of events associated with mating plug connector 100 to receptacle connector 140 according to one embodiment of the invention.
Figure 16B:
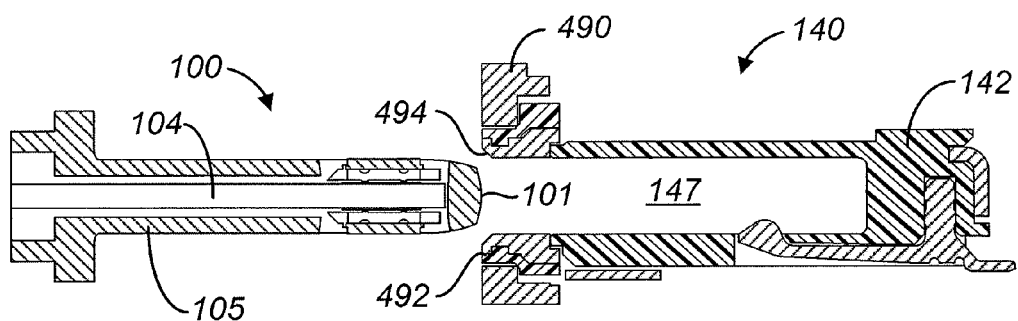

In one embodiment, receptacle connector 140 has a pinout as shown in FIG. 15C that matches pinout 106a and in another embodiment receptacle connector 140 has a pinout as shown in FIG. 16B that matches pinout 106b. In each of FIGS. 15C and 15D, the ACC1 and ACC2 pins are configured to mate with either the accessory power or accessory ID pins of the plug connector depending on the insertion orientation of plug connector, the pair of Data A contacts is configured to mate with either the pair of Data 1 contacts or the pair of Data 2 contacts of the plug connector, and the P_IN (power in) pin or pins are configured to mate with the Power contact or contacts of the plug connector. Additionally, in the pinout of FIG. 15D, the GND contact is configured to mate with the GND contact in the plug connector.

Reference is now made to FIGS. 16A-16K, which show simplified sectional views of plug connector 100 associated with an accessory device (not shown) being mated with receptacle connector 140 incorporated into a host electronic device (the housing or enclosure of which is partially shown in each figure). Each time a user interacts with an accessory device or host electronic device, the user may make an evaluation regarding its quality. Such an interaction may occur when a user inserts a plug connector, such as connector 100 into a corresponding receptacle connector, such as receptacle connector 140. If the plug connector is easy to insert into the receptacle connector, the user may gain the impression that the electronic device that includes connector 100 or connector 140 is of high quality, and that the company that manufactured the electronic device is a company of quality as well that can be trusted to manufacture reliable devices. Also, such ease of insertion may improve the user's experience and simply make the device more enjoyable to use.

Accordingly, embodiments of the present invention may provide plug connectors and receptacle connectors openings that provide for the easy insertion of the plug connector into the receptacle connector. An example is shown in FIG. 16A, which is a simplified top view of plug connector 100 and receptacle connector 140 in alignment with each other prior to a mating event according to an embodiment of the invention. In this example, plug connector 100 may have a curved leading edge 101. Leading edge 101 may be rounded for approximately 1 mm of its length at each of its ends as shown by distance $L_1$, and in some embodiments is rounded for between 0.5 mm and 1.5 mm at each end. This rounded front end may make it easier to insert plug connector 100 into receptacle connector 140 when the plug connector is rotated off axis, that is, when the plug connector is inserted at an incorrect pitch angle. Also in this example, a multi-tiered opening may be provided by the device enclosure (and its associated parts) to receptacle connector 140 into which plug connector 100 is inserted. The multi-tiered opening may make it easier to insert the plug connector into the receptacle when the plug connector is inserted either too far left or too far right of the opening in the X direction.

In this specific example, an opening of receptacle connector 140 may be formed by an edge of a trim ring 492 that cooperates with receptacle housing 142 to form an insertion cavity into which plug connector 100 is inserted during a mating event. Trim ring 492, which can be connected to the device enclosure 490 at a location not shown in FIG. 16A, may have chamfered leading edges 494. Receptacle housing 142 may be offset behind trim ring 492, and may have an angled surface 495 at the sides of trim ring 492 that further narrows the insertion cavity. In some embodiments chamfered edges 494 and angled surfaces 495 are each angled between 30-60 degrees and in one embodiment are angled at approximately 45 degrees. Also, in some embodiments chamfered edges 494 are between 0.1 and 0.5 mm wide and angled surfaces 495 are between two and four times the width of chamfered edges 494. In one particular embodiment, chamfered leading edges are chamfered by approximately 0.3 mm and angled surfaces 495 narrow the opening of the insertion cavity by approximately 1 mm on each side of the trim ring. Thus, in this embodiment, the multi-tiered opening may provide a 2.6 mm tolerance in the placement of plug connector 100 relative to the opening of receptacle connector 140. This relatively large tolerance (given the overall width of 6.6 mm for the plug connector) combined with the curved edges of plug connector 100, may make it relatively easy for a user to insert the plug connector into the receptacle connector. Again, this ease of insertion may inform a user's opinion as to the quality of the accessory device and/or host electronic device.

Figure 16C:
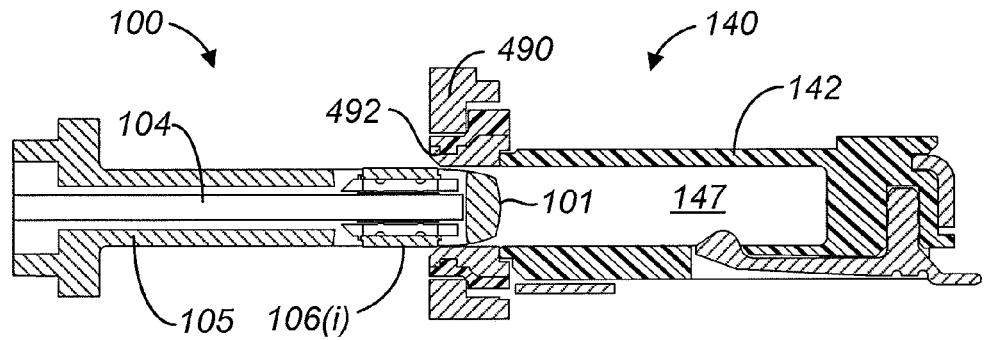
Figure 16D:
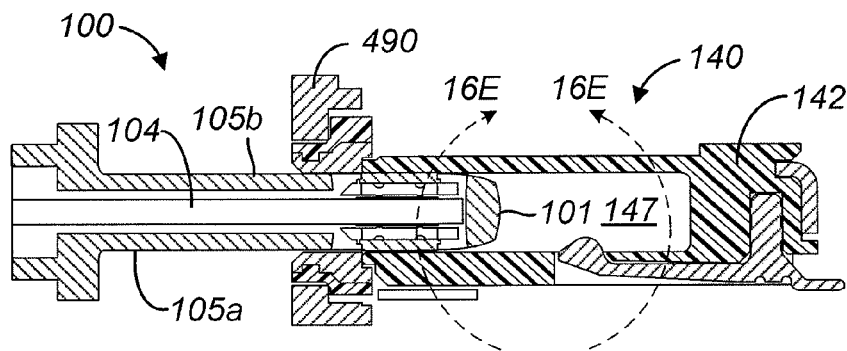

FIG. 16B is a simplified cross-sectional view of plug connector 100 and receptacle connector 140 in the same alignment position with each other prior to a mating event shown in FIG. 16A. As the plug connector is inserted into cavity 147 of the receptacle connector the first point of contact between the two connectors will be ground ring 105 contacting metal trim ring 492, which surrounds the opening to cavity 147 and is grounded. Thus, any static charge that has built up on the plug connector can be discharged upon contact with the trim ring. As the plug connector is inserted further into cavity 147, different portions of the plug connector may first come into contact with or engage with various portions of the receptacle connector as shown in FIGS. 16C-K. For example, FIG. 16C depicts the respective positions of the two connectors when individual contacts 106(*i*) may come in contact with trim ring 492. In one embodiment, this is approximately 1.5 mm after leading edge 101 of connector 100 has entered cavity 147 or 6.35 mm from a fully mated position. FIG. 16D depicts the respective positions of the two connectors when individual contacts 106(*i*) may last contact the trim ring. In one embodiment, this is approximately 4.1 mm after leading edge 101 of connector 100 has entered cavity 147 or 3.75 mm from a fully mated position.

Figure 16E:
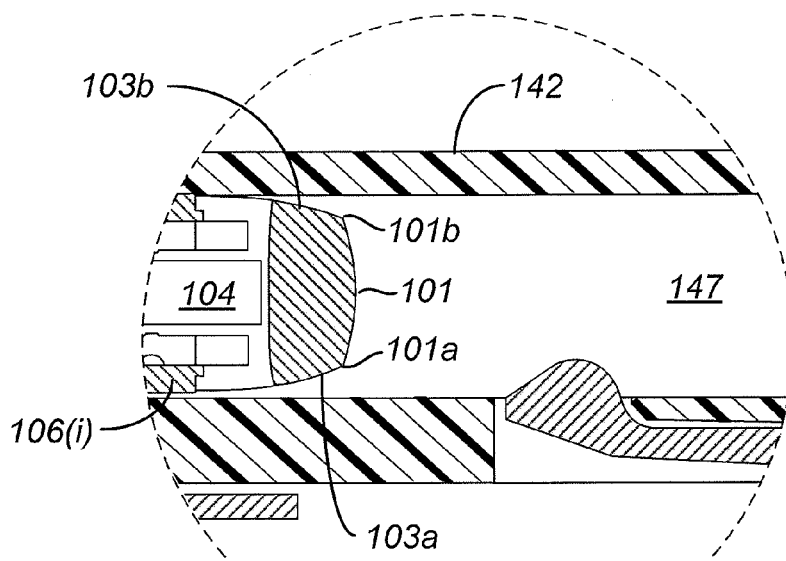
Figure 16F:
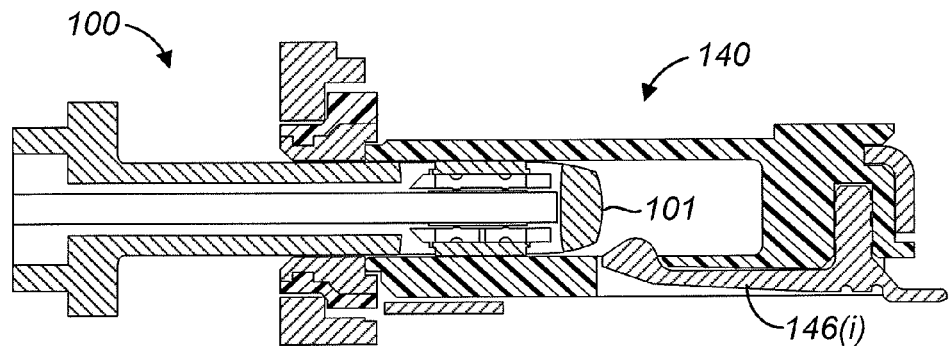

FIGS. 16D and 16F each depict connector 100 at a position prior to plug connector contacts 106 coming into physical contact with receptacle connector contacts 146. As shown in FIGS. 16D and 16E, each receptacle connector contact 146(*i*) includes a tip 146*a*, a beam portion 146*b* and an anchor portion 146*c*. Plug connector contacts 106 are wiping contacts, that is each contact 106(*i*) moves laterally with a wiping motion across the tip 146*a* of its respective contact 146(*i*) during a mating event until settling into a fully mated position where a central portion of the contact surface of contact 106(*i*) is in physical contact with tip 146*a* of receptacle contact 146(*i*). The process in which the contacts of a plug connector and receptacle first come in contact with each other causes wear and tear on the contacts that may result in degraded performance after thousands of repeated use cycles. Embodiments of the invention have designed the contacts to reduce such wear and tear and thus improve device lifetime. To better understand this aspect of certain embodiments of the invention, reference is made to FIG. 16E, which is an exploded view of the portion of FIG. 16D shown in dotted lines.

Figure 16G:
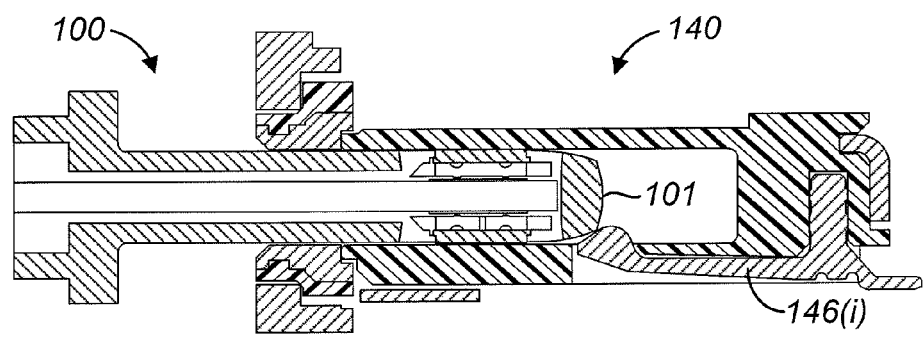

As shown in FIG. 16E, the interface between leading edge 101 and top and bottom surfaces 105*a* and 105*b* of connector 100 may form edges 101*a* and 101*b*, respectively. As plug connector 100 is inserted further into receptacle connector 140, edge 101*a* (or edge 101*b* if the connector is inserted in a reversed orientation) of contact 106(*i*) may engage or come into contact with receptacle contact 146(*i*) as shown in FIG. 16G. Embodiments of the invention may form surfaces 103*a*, 103*b* of ground ring 105 such that edge 101*a* is located at a height Z that reduces wear of receptacle contact 106(*i*) and improves device lifetime. Specifically, as surfaces 103*a*, 103*b* are angled more steeply, height Z may increase. This, in turn, may cause edges 101*a*, 101*b* to engage contact 146(*i*) near top surface or tip 146*a*. But when plug connector 100 is engaged in receptacle connector 140, contact 106(*i*) on the plug connector may mate with receptacle contact 146(*i*) at top surface 146*a* (as shown in FIG. 16K). Accordingly, if surfaces 103*a*, 103*b* are sloped too sharply, edges 101*a*, 101*b* may wear the metallic plating near the tip 146*a* of receptacle contact 146(*i*), which may degrade electrical connections between connector insert contact 106(*i*) and connector receptacle contact 146(*i*).

It should be noted that a large height Z could be accommodated for by increasing a height of receptacle contact 146(*i*). But this would require a larger deflection of receptacle contact 146(*i*) during insertion of the plug connector. A larger deflection of receptacle contact 146(*i*) may require a longer contact beam and resulting greater receptacle length in the insertion direction of cavity 147 to avoid fatigue and cold-working of receptacle contact 146(*i*). Conversely, when Z is too small, edges 101*a*, 101*b* may encounter contact 146(*i*) at a location much lower than top surface 146*a*, shown in this example as location 146*d*. Engaging contact 146(*i*) at location 146*d* may increase the force placed upon receptacle contact 146(*i*) during insertion of the plug connector, thereby increasing the wear to the plating of contact 146(*i*). Thus, embodiments of the present invention may provide a ground ring 105 having edges 101*a*, 101*b* that are positioned to engage connector receptacle contacts 146 at a location away from top surface 146*a* in order to protect plating at this mating point. Edges 101*a*, 101*b* may further be positioned to avoid excessive force being imparted to receptacle connector contacts 146 during the insertion of the plug connector.

Figure 16H:
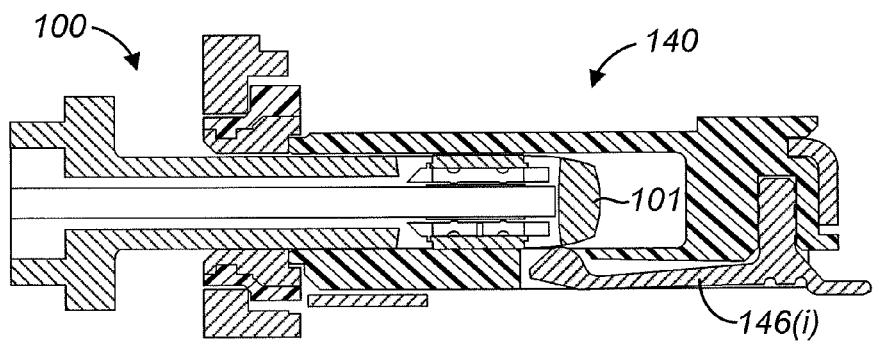
Figure 16I:
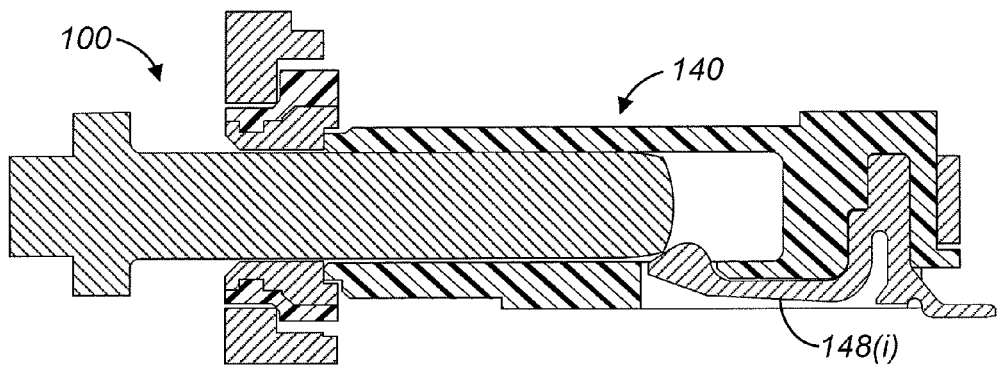
Figure 16J:
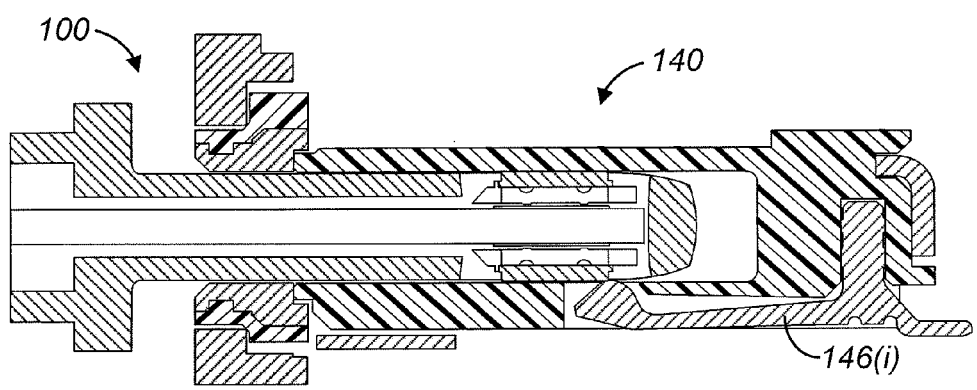
Figure 16K:
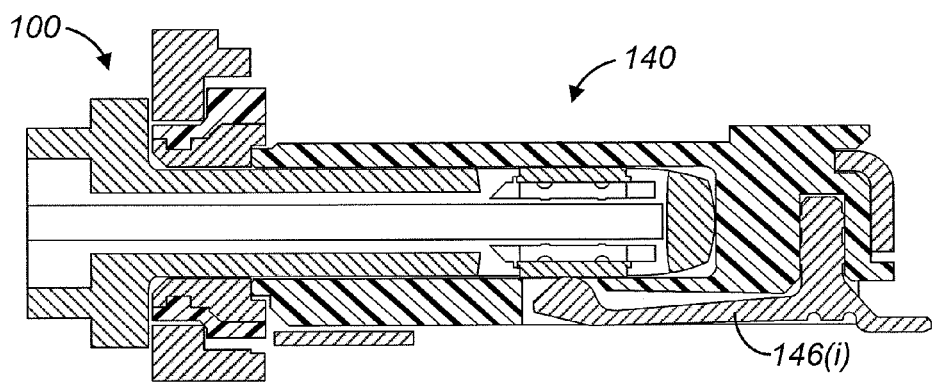

Turning now to FIGS. 16F and 16H, prior to any of contacts 106 coming into electrical contact with contacts 146, ground ring 105 comes into contact with latches 145*a*, 145*b*, which also act as ground contacts (FIG. 16F) and later each of contacts 146 slide past the interface between the front portion of ground ring 105 and the beginning of one of contact regions 46*a*, 46*b* (FIG. 16H). In one particular embodiment, initial contact with latches 145*a*, 145*b* occurs 2.6 mm from a fully mated position and contacts 146 first touch the dielectric material in one of contact regions 46*a*, 46*b* 1.4 mm from a fully mated position. Then, as shown in FIG. 16I, just 0.2 mm after contacts 146 are no longer in physical contact with ground ring 105 (1.2 mm from a fully mated position), connector 100 contact connector detect contacts 148(1) and 148 (2), and just 0.4 mm later, plug connector contacts 106 begin to come into contact with receptacle connector contacts 146 and a fully mated position is achieved 0.8 mm later.

FIG. 16K depicts the completion of a mating event between the plug and receptacle connectors where plug connector 100 is fully inserted within cavity 147 of the receptacle connector 140. In the fully mated position, each of contacts 106(1) . . . 106(8) from one of contact regions 46*a* or 46*b* are physically coupled to one of contacts 146(1) . . . 146(8) depending on the insertion orientation of connector 100 with respect to connector 140. Thus, when plug connector 100 has pinout 106*a*, contact 146(1) will be physically connected to either contact 106(1) or 106(8) depending on the insertion orientation; data contacts 146(2), 146(3) will connect with either data contacts 106(2), 106(3) or with data contacts 106(7), 106(6) depending on the insertion orientation, etc.

Figure 17:
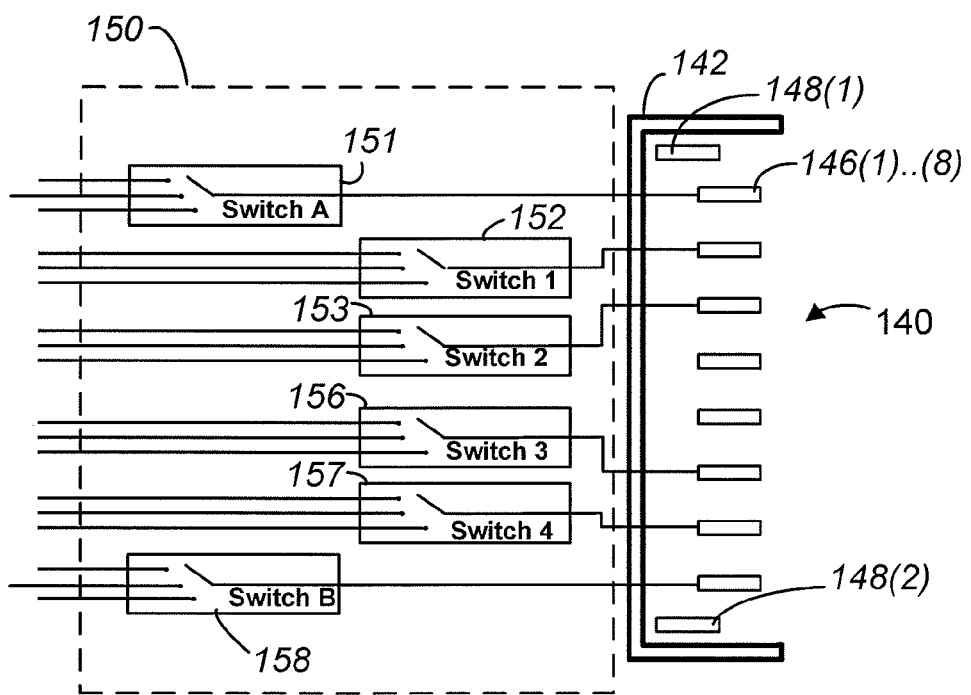
FIG. 17 is a schematic representation of receptacle connector 140 coupled to switching circuitry 150 within a host device according to an embodiment of the invention.

Prior to a mating event, the host will generally not know the insertion orientation of plug connector 100 or what communication protocol will be transmitted over data contacts 106 (2), 106(3), 106(6) and 106(7). Switching circuitry within the host device includes switches that operatively connect circuitry on the host side necessary to support signals and communication interfaces used by the contacts of connector 100 to the receptacle connector contacts 146(1) . . . 146(8) as appropriate. FIG. 17 depicts one embodiment of switching circuitry 150 configured to allow a host device to implement pinout 106*a* shown in FIG. 14A. Switching circuitry 150 includes switches 151 and 158 that are operatively coupled to receptacle contacts 146(1) and 146(8), respectively, and switches 152, 153, 156 and 157 that are operatively coupled to contacts 146(2), 146(3), 146(6) and 146(7), respectively. In one embodiment, switches are not required for contacts 146 (4) and 146(5) as, regardless of the insertion orientation, these contacts always align with power contacts 106(4) and 106(5) in pinout 106*a* which are electrically connected to each other. In another embodiment, there is a switch 151-158 for each of contacts 146(1) . . . 146(8) and the switch is initially in an open state until circuitry connected to contacts 148(1), 148(2) detects that connector 100 has been fully inserted within the receptacle connector and the accessory is authorized to operate with the host at which time the switches connect the circuitry as described below.

Each of switches 151 and 158 enables circuitry that provides an accessory power signal to a receptacle connector contact to be switched onto either contact 146(1) or 146(8) depending on the insertion orientation of plug connector 100.

Additionally, some embodiments of the invention allow data signals (e.g., a pair of UART transmit and receive signals or JTAG clock signals) to be transmitted over contacts 146(1), 146(8). Switches 151 and 158 can also operatively connect the circuitry required to implement such UART or JTAG communication to contacts 146(1), 146(8) as determined during the handshaking routine and/or communicated by connector 100. Similarly, each of switches 152, 153, 156 and 157 switch the necessary circuitry to support communication interfaces USB 2.0, Mikey Bus or UART onto contacts 152, 153, 156, and 157 as instructed by connector 100.

Switching circuitry 150 also allows the communication interface employed by the data contacts to be dynamically switched while connector 100 is coupled to a host device. The dynamic switching can be initiated, for example, by a message sent from the ID module within the accessory to the host device over contact 106(8) informing the host that a new communication interface will be used on the contacts. As an example, in response to an initial handshaking sequence when connector 100 is mated with a corresponding connector on the host device, the ID module may send a response informing the host that data contacts 106(2), 106(3) and 106(6), 106(7) are used for two pairs of USB 2.0 differential data contacts. As some point later during operation of the accessory that connector 100 is incorporated into, the accessory may require the use of a UART serial interface to communicate with the host device over the same two contacts previously dedicated for USB signals. To do so, the accessory sets internal switches coupled to contacts 106(6), 106(7) that switches the contacts from being operatively coupled to USB circuitry in the accessory to instead be coupled to UART circuitry and sends a message to host 100 noting the new configuration of contacts 106(6), 106(7).

Figure 18:
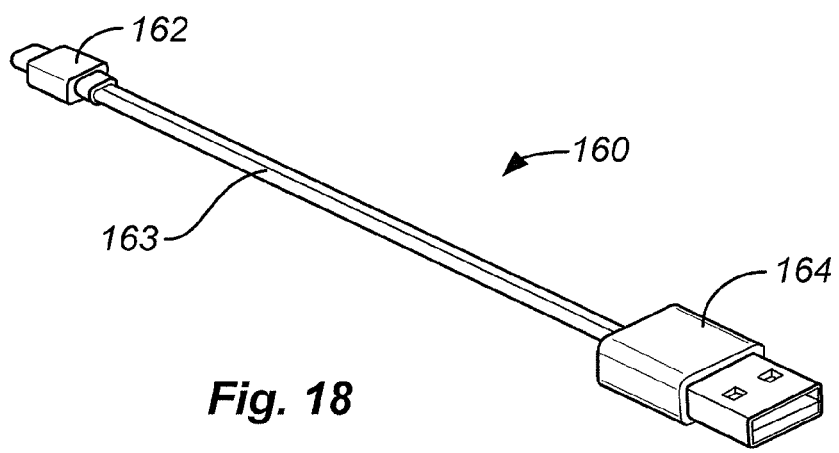
FIG. 18 is a simplified perspective view of a USB charger/adapter cable 160 having a USB connector at one end and a connector according to an embodiment of the invention at the other end.

As previously stated, many different types of accessories may employ plug connector 100 to physically couple to and communicate with a host device that includes a receptacle connector 140. FIGS. 18-28 provide several specific examples of such accessories. FIG. 18 is a simplified perspective view of a USB charger/adapter 160 according to an embodiment of the invention. USB adapter 160 includes an eight contact dual-orientation inline connector 162 at one end and a USB male connector 164 at the other end. An optional cable 163 couples connector 162 to connector 164, in other embodiments both connectors 162 and 164 extend from opposite sides of a single compact housing. Connector 162 can have the same physical form factor as connector 100 shown in FIG. 13A and includes contacts 166(1) . . . 166(8) that correspond in size and shape to contacts 106(1) . . . 106(8).

Figure 19A:
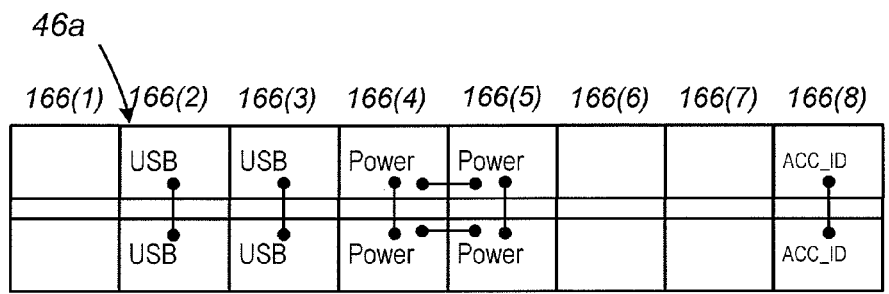
FIG. 19A is a diagram depicting pin locations of plug connector 162 shown in FIG. 18 according to one embodiment of the invention where connector 162 is compatible with the pinout shown in FIG. 14A.
Figure 19B:
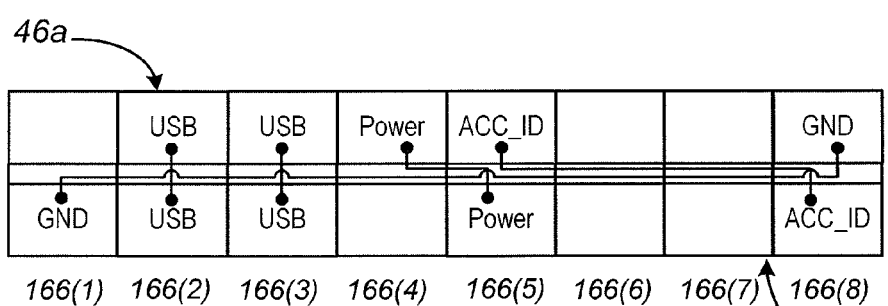
FIG. 19B is a diagram depicting pin locations of plug connector 162 shown in FIG. 18 according to another embodiment of the invention where connector 162 is compatible with the pinout shown in FIG. 14B.
Figure 20:
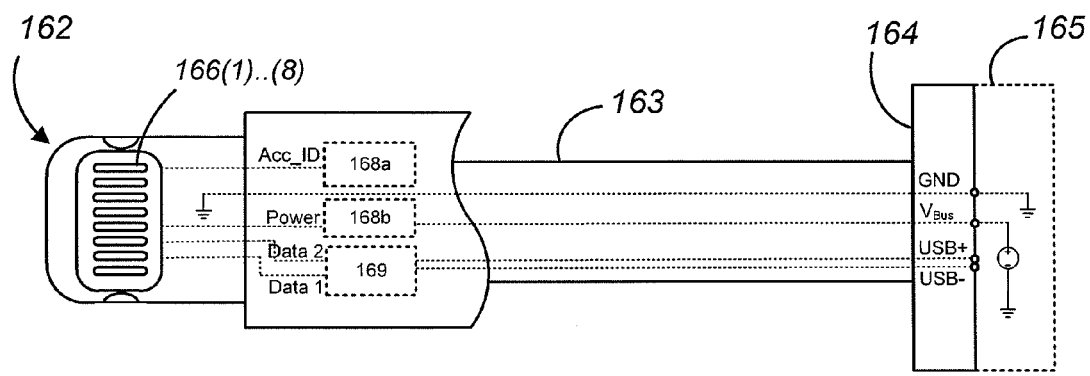
FIG. 20 is a simplified schematic representation of USB charger/adapter 160 according to an embodiment of the invention.

USB charger/adapter 160 is specifically adapted to be used in data synchronization applications and charging applications. To this end, connector 162 includes two USB 2.0 differential data contacts at locations where the pair of differential data contacts, Data 1, are located (locations 166(2), 166(3)). FIGS. 19A and 19B depict two different pinouts of USB charger 160 where the pinout in FIG. 19A is compatible with pinout 160a and the pinout in FIG. 19B is compatible with pinout 160b. As shown in FIG. 20, the USB contacts are coupled through ESD protection circuitry 169 to the USB contacts in connector 164. Connector 162 also includes power contact(s) coupled to a current regulator 168b to provide a power out signal from the $V_{Bus}$ line of USB connector 164 that can be used to charge the host device. The accessory ID contact is connected to an ID module 168a within connector 162 to enable an initial handshaking routine between the connector and its host. A memory within ID module 168a stores information that informs the host that contacts 166(2), 166(3) are dedicated for USB 2.0 differential data signals.

Adapter 160 also includes an authentication module (not shown) to authenticate the adapter to the host as discussed above with respect to FIG. 14. In one embodiment the authentication module is embodied within ID module 168a and authenticates adapter 160 over the ID contact. In another embodiment the authentication module is connected to data contacts 166(2), 166(3) and authenticates the adapter over these contacts after the handshaking routine between the host and ID module operatively connects USB circuitry within the host connected to the receptacle contacts that align with contacts 166(2) and 166(3). Ground is provided at the sides of connector 162 via contacts in the side of the ground ring, and in the embodiment of FIG. 19B at ground contact 166(1). Since the USB adapter does not require other data signals nor does it require power to be delivered to it from the host, contacts for accessory power and for the second data pair, Data 2 are not required and, in some embodiments are left unconnected to circuitry. As configured, connector 520 allows for USB 2.0 synchronization as well as 5 volt, 2 amp charging when USB connector 164 is coupled to a charger 165.

Figure 21:
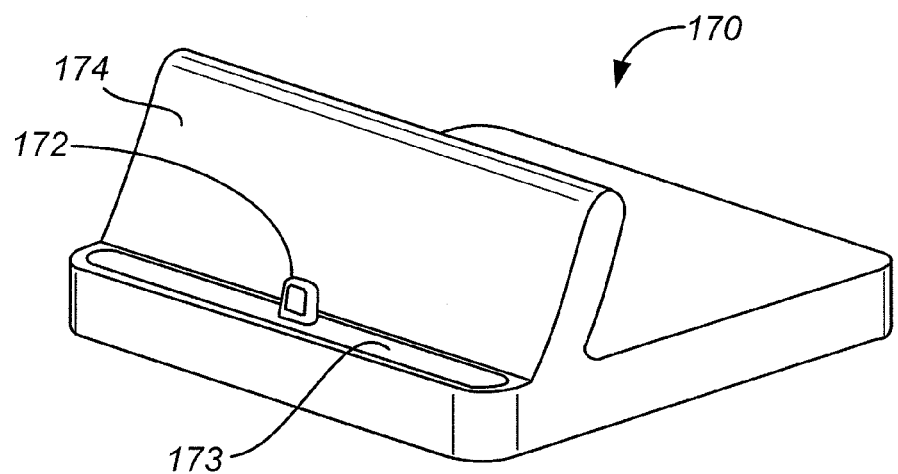
FIG. 21 is a simplified perspective view of a docking station 170 according to an embodiment of the invention.

FIG. 21 is a simplified perspective view of a docking station 170 that includes a plug connector 172 according to an embodiment of the invention similar to connector 100 discussed in FIGS. 13A-C and 14. Connector 172 extends upward from a surface 173 upon which a portable electronic device may be placed when docked in station 170. When docked, tab 172 is mated with a receptacle connector incorporated into the portable media device and a second surface 174 can support a back of the electronic device. The ID contact of connector 172 is connected to an ID module within the connector to inform the host that two of the data contacts are dedicated for USB 2.0 differential data signals. Docking station 170 also includes an authenticate module that can authenticate the docking station to its host as discussed with respect to USP adapter 160. The docking station can charge the portable media device over the two centrally located power contacts that are coupled together and coupled to current regulator to provide a power out signal. Ground is provided at the sides of connector via contacts in the side of the ground ring.

Docking station 170 allows a portable media device, such as an iPod or MP3 player or an iPhone or other smart phone to be connected to a computer via connector 172. In one embodiment, connector 172 supports the full complement of eight contacts set forth in FIGS. 16A and 16B and docking station 170 can connect to the computer with a USB cable. In another embodiment the docking station includes a receptacle connector having the same pinout as connector 140 and can connect to a computer also having a receptacle connector 140 with a cable adapter that includes two plug connectors 100 coupled together via a cable.

Figure 22:
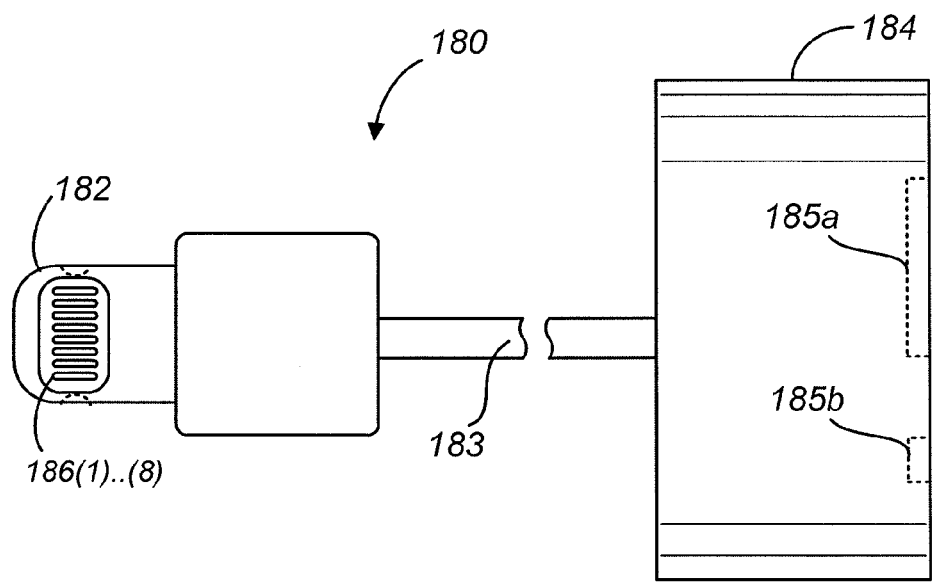
FIG. 22 is a simplified top plan view of a video adapter 180 according to an embodiment of the invention.

FIG. 22 is a simplified top plan view of a video adapter 180 according to an embodiment of the invention. Video adapter 180 includes a plug connector 182 similar to connector 100 discussed in FIGS. 13A-C. The pinout of adapter 180, shown in FIGS. 23A (for a version compatible with pinout 160a) and 23B (for a version compatible with pinout 160b), includes one set of USB 2.0 differential data contacts and a set of UART transmit/receive contacts. The accessory ID contact is coupled to an ID module 188a within the connector that includes a memory that stores information to inform the host that two of the data contacts are dedicated for USB 2.0 communication while the other two data contacts are dedicated to UART signals. In one embodiment one of the sets of data contacts (either the USB or UART contacts) can be connected to an authentication module 188c to authenticate adapter 180, while in another embodiment the authentication module is connected to the ID contact along with the ID module as discussed above with respect to other accessories.

Adapter 180 includes an adapter housing 184 within which is a video connector 185a for any suitable format of video signal. In one embodiment video connector 185a is an HDMI receptacle connector, in another embodiment connector 185a is a VGA receptacle connector, and in still another embodiment connector 185a is a component video connector. A video processor 187 (shown in FIG. 24) separates audio and video data sent over connector 182 in USB 2.0 format and converts the data to the appropriate format for output over connector 185a.

In some embodiments video adapter 180 also includes a receptacle connector 185b that includes the same pinout and physical form factor as connector 140. Any plug connector that can mate with connector 140 could also mate with connector 185b. Connector 185b enables other accessories to be coupled to the same host device that connector 182 is coupled with via a cascaded connection. A controller 188 is coupled to connector 185b and provides all the functionality (authentication, contact switching, etc.) that the host device provides with respect to connector 140. Thus, controller 188 can set the eight contacts of connector 185b in the same manner that the switching circuitry 150 can set contacts 146(1) ... 146(8). Power boosting circuitry 189 boosts the accessory power signal received from the host device over contact 186(4) and provides the signal as a power out signal through controller 188 to the appropriate contact in connector 185b. Additionally, in this embodiment adapter 180 can provide power regulated by current regulator 188b to the host device over the power contacts (contacts 186(4) and 186(5) in the embodiment of FIG. 23A or contact 186(5) in the embodiment of FIG. 23B) when connector 185b is connected to an accessory or other device that enables charging.

FIG. 25 a simplified top plan view of a SD (secure digital) card adapter 190 according to an embodiment of the invention. SD card adapter 190 includes a plug connector 192 similar to connector 100 discussed in FIGS. 13A-C and a housing 194. Housing 194 and plug connector 192 are connected by a cable 193. As shown in FIG. 27, within housing 194 is an SD card reader 195, a microcontroller 197, an SD card interface 198 and a power converter 199 that is operatively coupled to convert the power provided by the host over contact 196(4) to a 3 volt power out signal that is provided to an appropriate contact on the SD card reader.

The pinout of connector 192 includes one set of USB 2.0 differential data contacts and one set of UART transmit/receive contacts as shown in each of FIGS. 26A (for a version compatible with pinout 160a) and 26B (for a version compatible with pinout 160b). Power contacts (contacts 196(4) and 196(5) in the embodiment of FIG. 26A or contact 196(5) in the embodiment of FIG. 26B) are not used. The ID contact is coupled to an ID module 198a that includes a memory that stores information to inform the host that two of the data contacts are dedicated for USB 2.0 communication while the other two data contacts are dedicated to UART signals. In one embodiment one of the sets of data contacts (either the USB or UART contacts) can be connected to an authentication module 198c to authenticate adapter 190, while in another embodiment the authentication module is connected to the ID contact along with the ID module as discussed above with respect to other accessories. SD card interface 198 is coupled to SD card reader 195 to read data stored on an SD card inserted within the card read and transmits the data to the host device over the two USB data contacts under the control of microcontroller 197.

In another embodiment of the invention, a camera adapter is provided that is similar to SD card adapter 190 but connects to a camera over a USB connection. This embodiment includes a USB connector instead of an SD card reader and also provides power boosting circuitry to supply a 5 volts out signal over the USB power contact. The USB camera adapter does not include an SD card interface and instead buffers data received directly over the camera's USB contacts and provides the data to the host via the two USB data contacts.

Figure 28A:
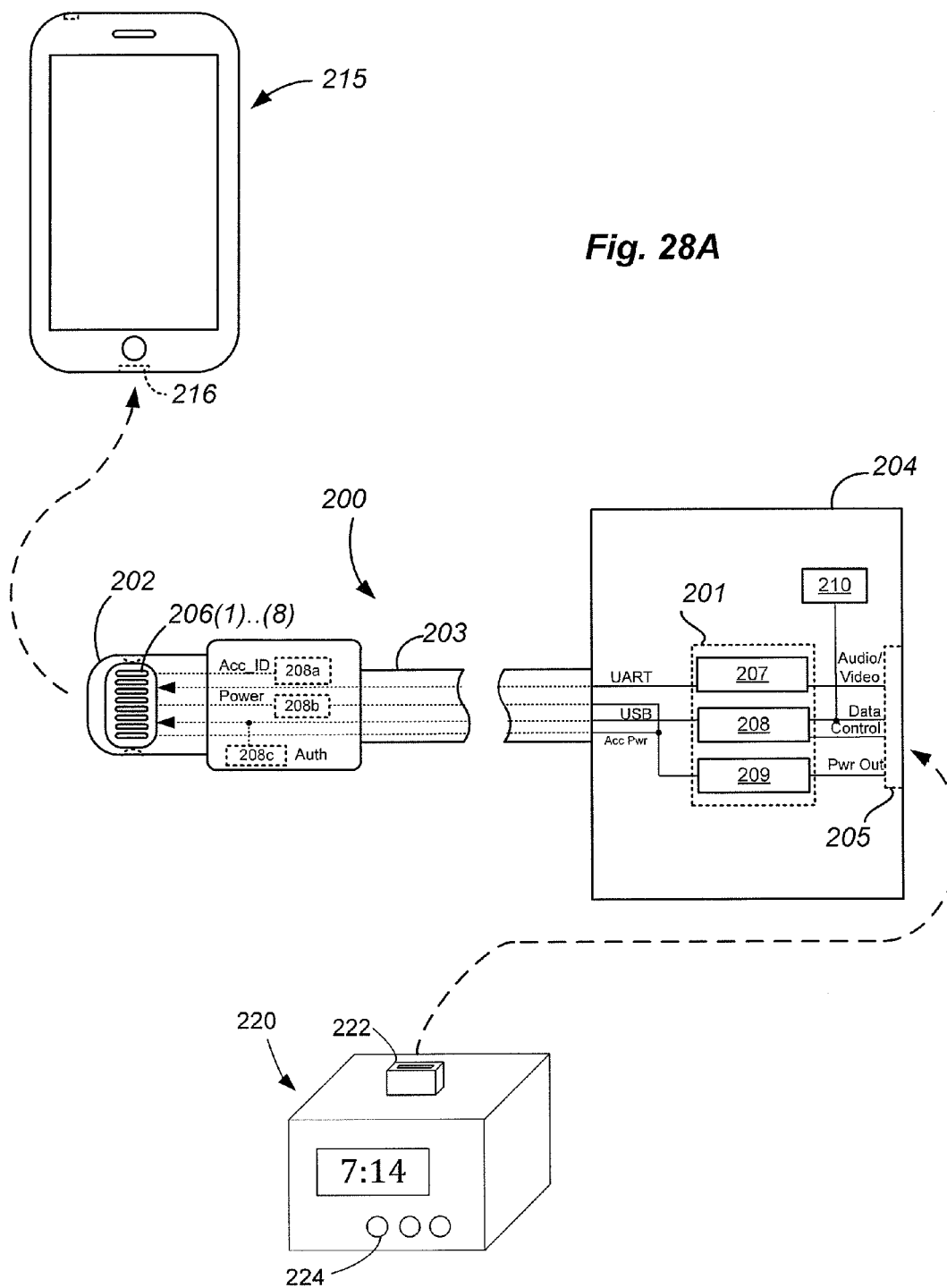
FIG. 28A is a simplified schematic representation of an accessory adapter 200 according to an embodiment of the invention.

FIG. 28A is a simplified schematic representation of an adapter 200 according to an embodiment of the invention. Adapter 200 includes an external contact plug connector 202 and a receptacle connector 205 each of which include multiple contacts that can accommodate some or all of video, audio, data and control signals along with power and ground. Plug connector 202 is compatible with a receptacle connector 216 of a host device 215 that can be, for example, a portable media player. Receptacle connector 205 is compatible with a plug connector 222 of an accessory 220, which is shown to be a docking station/clock radio but can be any electronic accessory that includes a plug connector that can be coupled to adapter 200. Plug connector 222 is incompatible with receptacle connector 216 (and thus receptacle connector 205 is also incompatible with plug connector 202). The incompatibility may be either a physically incompatibility between the two connectors (e.g., plug connector 222 has a size or shape that does not enable it to be mated with connector 216) or an electrical incompatibility (i.e., even though plug connector 22 can be physically connected to receptacle connector 216, the connectors carry one or more signals or power supply outputs that are incompatible in frequency, voltage levels or some other electrical parameter with each other). Adapter 200 allows accessory 220 to communicate with host 215. In some embodiments connector 202 is similar to connector 100 discussed in FIGS. 13A-C and has a pinout as discussed with respect to FIG. 14 that enables the connector to be coupled to a host device in which receptacle connector 216 corresponds to connector 140 shown in FIG. 15. Also in some embodiments connector 205 is a 30-pin connector, such as the 30-pin connector employed on Apple iPod and iPhone devices, that has a pinout as shown in FIG. 28B.

As shown in FIG. 28A, adapter 200 includes conversion circuitry 201 within housing 204 that converts signals and voltages received from accessory 220 over contacts of connector 205 to signals and voltages that can be transmitted over connector 202 and processed by host device 215. The converters also convert signals and voltages sent by host 215 over contacts 206(1) ... 206(8) to signals and voltages that can be transmitted over connector 205 and processed by accessory 220. In one embodiment, conversion circuitry 201 includes an audio/video converter 207, a data converter 208 and a power converter 209. Other embodiments include only one or two of converters 207, 208 and 209 or include other types of converters altogether.

Audio/video converter 207 can be a one-way converter (e.g., only converts video and/or audio data sent from the host to a format that can be received and processed by the accessory or only converts video and/or audio data sent from the accessory to a format that can be received and processed by the host) or a two-way converter (i.e., converts video and/or audio data sent between the host and the accessory in both directions). In one particular embodiment, audio/video converter 207 is a one-way converter that converts digital audio and digital video data sent over USB data lines of connector 202 into analog audio and analog video signals. In another embodiment converter 207 only converts audio data and adapter 200 does not support the conversion of video data between host 215 and accessory 220.

Similarly, data converter 208 can be a one-way or two-way data converter. In one embodiment, data converter 208 is capable of translating data signals received over a first communication protocol used by accessory 220 and connector 205 to either a USB protocol or UART protocol used by connector 202 and host 215. In another embodiment, connectors 202 and 205 each support USB and UART communication protocols and data converter 208 passes USB signals between the two connectors without conversion but converts the UART signals received from each of host 215 and accessory 220 to a format appropriate for the other of host 215 and accessory 220. Data converter 208 can also process control and ID signals received over connector 205 as may be required to communicate with the accessory. Power converter 209 can convert a first DC voltage received from accessory 220 over connector 205 to a second DC voltage that can be transmitted to host 215 over connector 202, and can convert a third DC voltage received from the host 215 over connector 202 to a fourth DC voltage provided to the accessory 220 through connector 205.

The pinout of connector 202 includes one set of USB 2.0 differential data contacts and one set of UART transmit/receive contacts as shown in FIG. 23. The ID contact is coupled to an ID module 208a that includes a memory that stores information to inform the host that two of the data contacts are dedicated for USB 2.0 communication while the other two data contacts are dedicated to UART signals. A current regulator 208b is operatively coupled to the two centrally located power contacts 206(4), 206(5) to regulate current to the host when connector 206 is connected to an accessory or other device that enables charging.

In some embodiments adapter 202 can include two levels of authentication. In a first level, adapter 202 authenticates itself to host 215 through its connection to the host via connector 202 and connector 216. As described above with respect to other accessories, in one embodiment this level of authentication can be performed an authentication module 208c over one of the sets of data contacts (either the USB or UART contacts) after the contacts in the host's receptacle connector are configured, and in another embodiment it can be done by an authentication module connected to the ID contact as an initial part of the handshaking algorithm between the host and adapter 200. After the adapter is authenticated and in communication with the host over contacts 202, a second level of authentication can occur where an authentication processor 210 in adapter 200 authenticates accessory 220 connected to it via connector 205 and connector 222 according to an authentication protocol that accessory 220 would normally employ when connecting to a host that the accessory 220 was designed to operate with.

In particular embodiments where connector 205 has a pinout as shown in FIG. 28B and adapter converts digital video data received over connector 202 to analog video data out sent over connector 205, the circuitry of adapter 200 can be connected to contacts within connectors 202 and 205 as shown in Table 1 (for an adapter in which connector 202 has a pinout compatible with pinout 106a) or as shown in Table 2 (for an adapter in which connector 202 has a pinout compatible with pinout 106b) below.

TABLE 1

| Connector 202 Contacts | Adapter 200 Circuitry | Connector 205 Contacts |
|---|---|---|
| USB: 202(2), 202(3) | Audio/Video Converter 207 | Contacts 21, 22, 23, 27, 28 |
| USB: 202(2), 202(3); UART: 202(6), 202(7) | Data Converter 208 | Contacts 4, 6, 10, 18, 19, 20, 24, 30 (used as device detect) |
| Pwr: 202(4), 202(5); Acc_Pwr: 202(1) | Power Converter 209 | Contacts 8, 13 |
| GND: Ground ring via side contacts | Ground | Contacts 1, 2, 15, 16, and 29 |
| N/A | No Connection | Contacts 3, 5, 7, 9, 11, 12, 14, 17, 25, 26 |

TABLE 2

| Connector 202 Contacts | Adapter 200 Circuitry | Connector 205 Contacts |
|---|---|---|
| USB: 202(2), 202(3) | Audio/Video Converter 207 | Contacts 21, 22, 23, 27, 28 |
| USB: 202(2), 202(3); UART: 202(6), 202(7) | Data Converter 208 | Contacts 4, 6, 10, 18, 19, 20, 24, 30 (used as device detect) |
| Pwr: 202(5); Acc_Pwr: 202(4) | Power Converter 209 | Contacts 8, 13 |
| GND: 202(8) and side contacts | Ground | Contacts 1, 2, 15, 16, and 29 |
| N/A | No Connection | Contacts 3, 5, 7, 9, 11, 12, 14, 17, 25, 26 |

In another embodiment where adapter 200 does not support the conversion of video data, the contact-to-adapter circuitry connections set forth in Table 1 can be used expect that contacts 21, 22, and 23 are left in an open state and not connected to active circuitry within the adapter. Adapter 200 can also include a microcontroller (not shown) that can communicate with accessory 220 using a protocol that the accessory would normally use to communicate with a host device that the accessory is compatible with. For example, in one embodiment adapter 200 includes a microcontroller that supports communication with accessory 220 using the iAP protocol employed by an Apple iPod or iPhone device. Some or all of the conversion circuitry 200 can be part of the microcontroller or it can be separate circuitry. The microcontroller can also set selected contacts of connector 205 (e.g., contacts 13, 18-20 and 30, which is used as iPod detect) to an open state so that the accessory does not recognize that it is connected to a host until after adapter 200 authenticates itself to the host and the host configures its contacts to allow communication between the host and adapter 200. Once the host and adapter are operatively connected and in full communication with each other, adapter 200 can connect the previously open/floating contacts with appropriate circuitry so that the accessory recognizes it has been connected to the adapter and can respond to any authentication requests from adapter 200 to initiate and complete a communication link between the adapter and accessory and then ultimately the host to the accessory via adapter 200.

Figure 29:
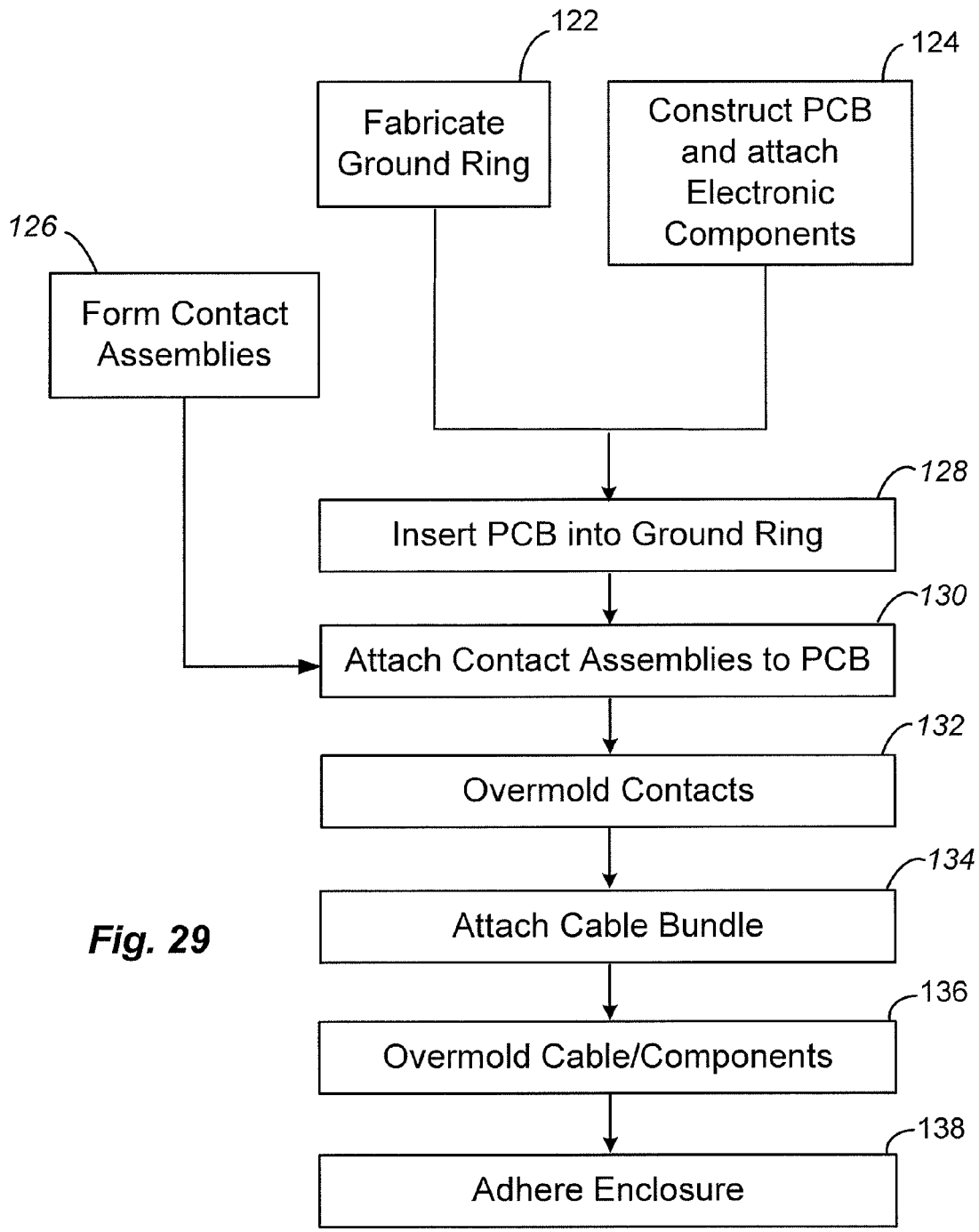
FIG. 29 is a flowchart depicting steps associated with manufacturing connector 100 shown in FIGS. 13A-13C according to one embodiment of the invention.
Figure 30A:
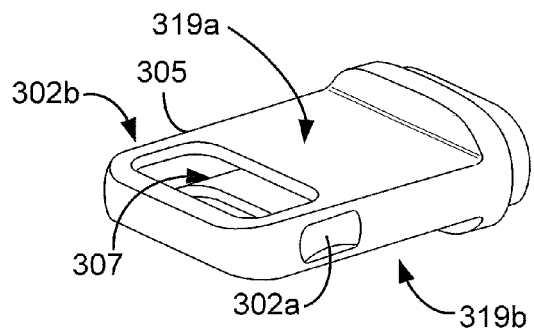
FIGS. 30A-30T depict various views of connector 100 at different stages of manufacture discussed with respect to FIG. 29.
Figure 30B:
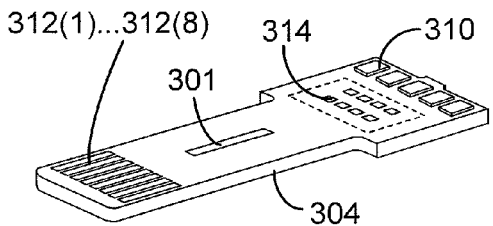
Figure 30C:
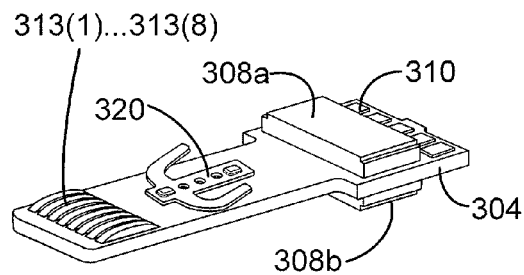
Figure 30D:
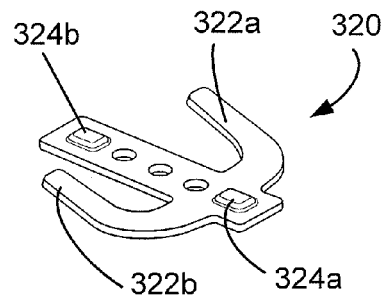
Figure 30E:
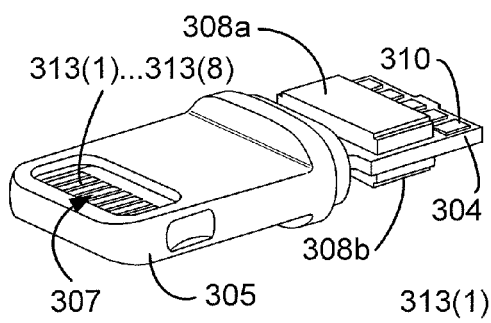
Figure 30F:
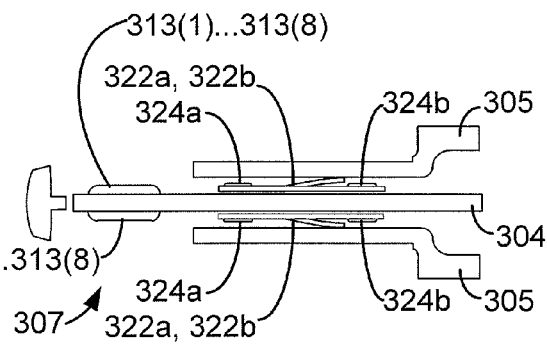
Figure 30G:
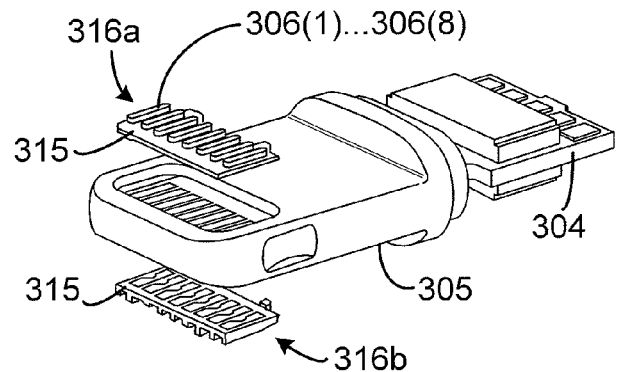
Figure 30H:
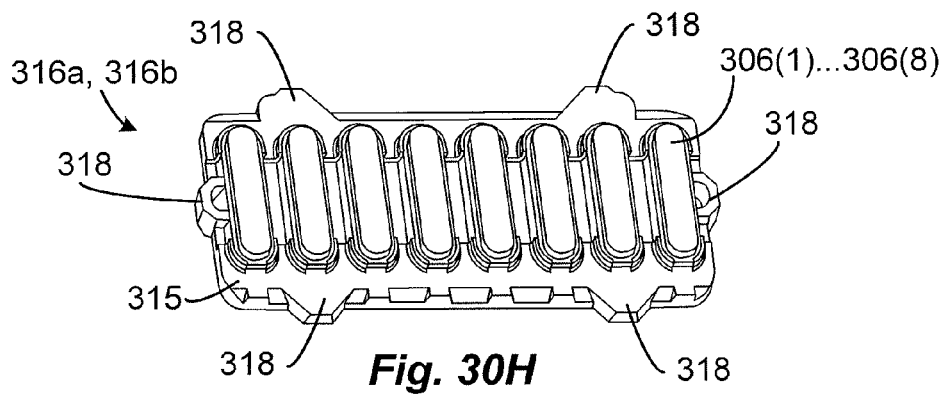
Figure 30I:
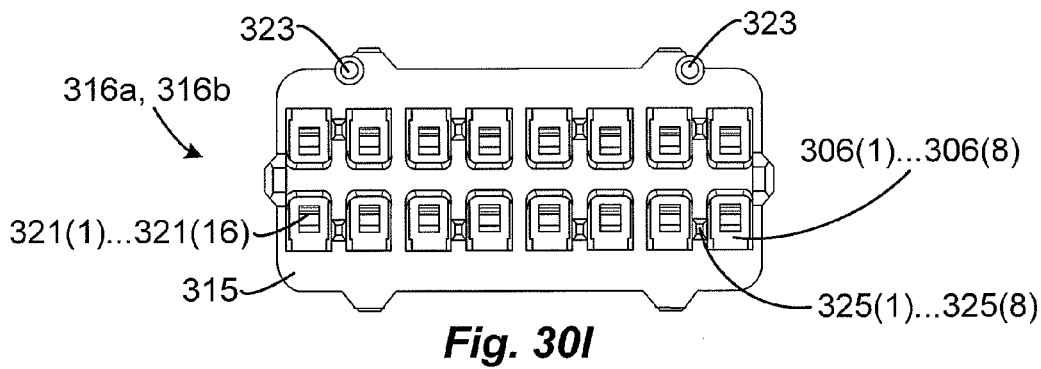
Figure 30J:
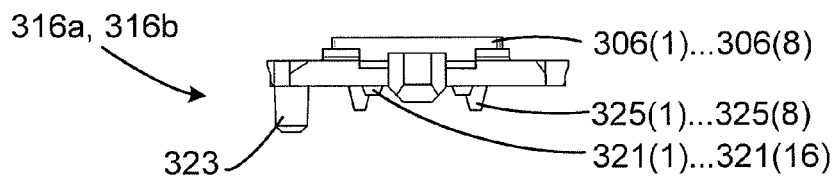
Figure 30K:
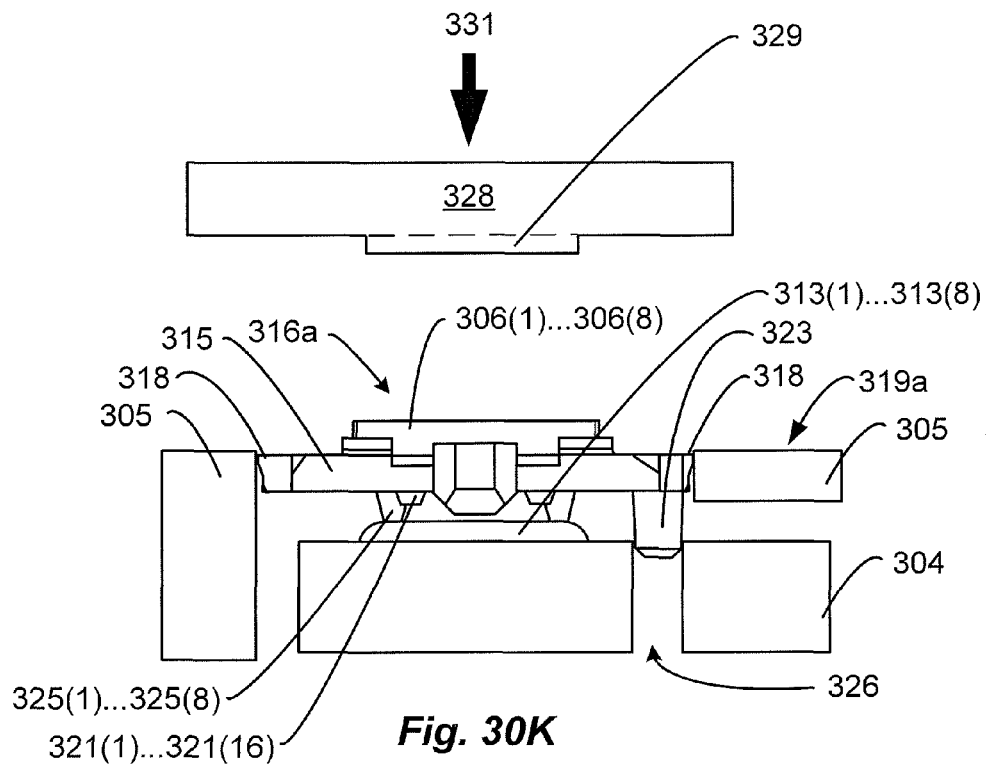
Figure 30L:
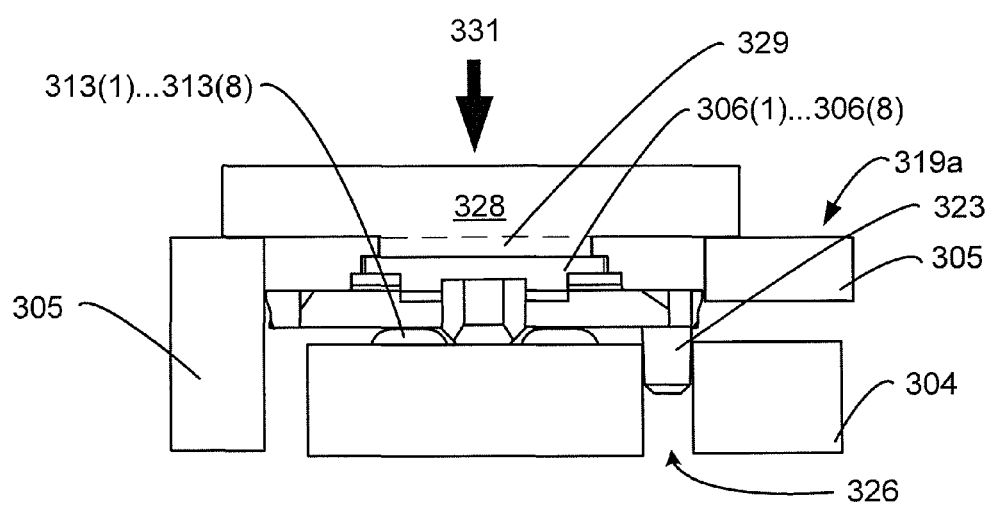
Figure 30M:
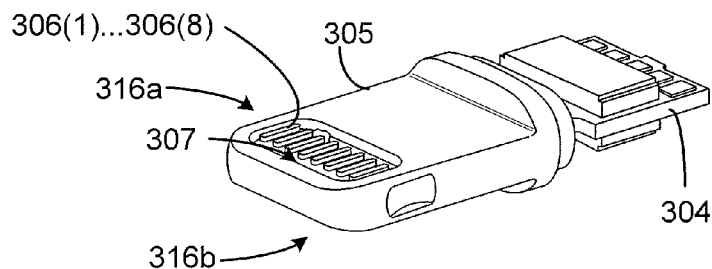
Figure 30N:
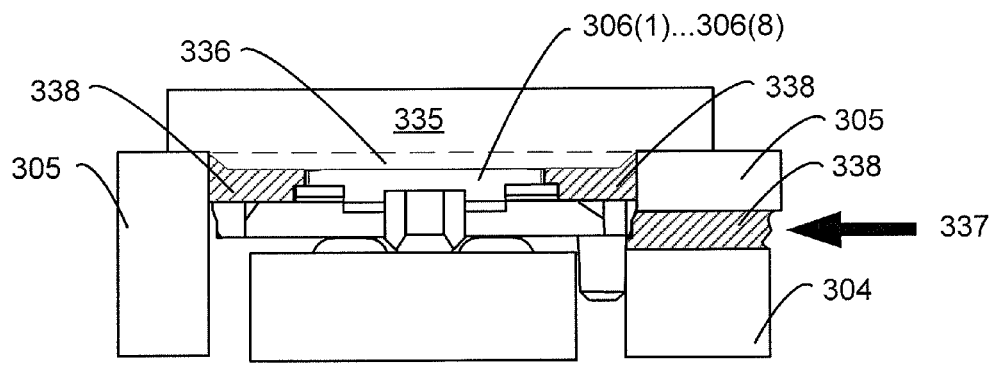
Figure 30O:
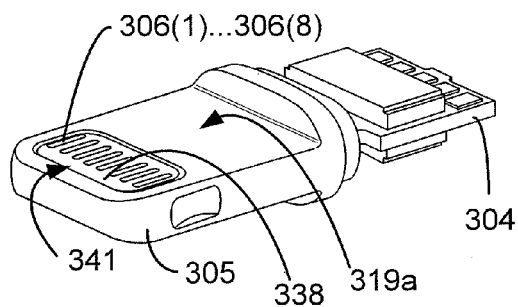
Figure 30P:
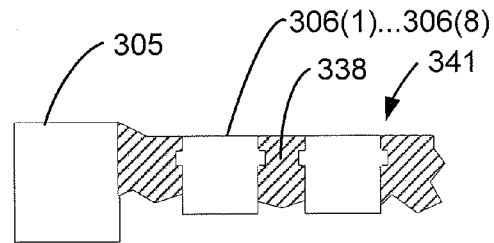
Figure 30Q:
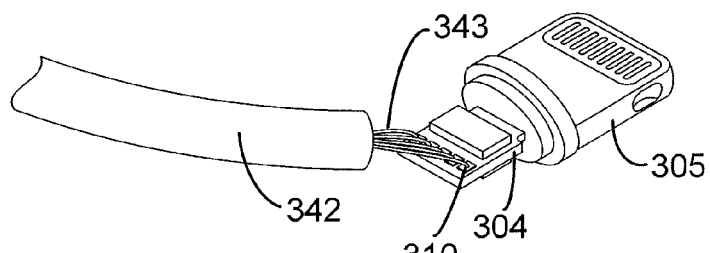
Figure 30R:
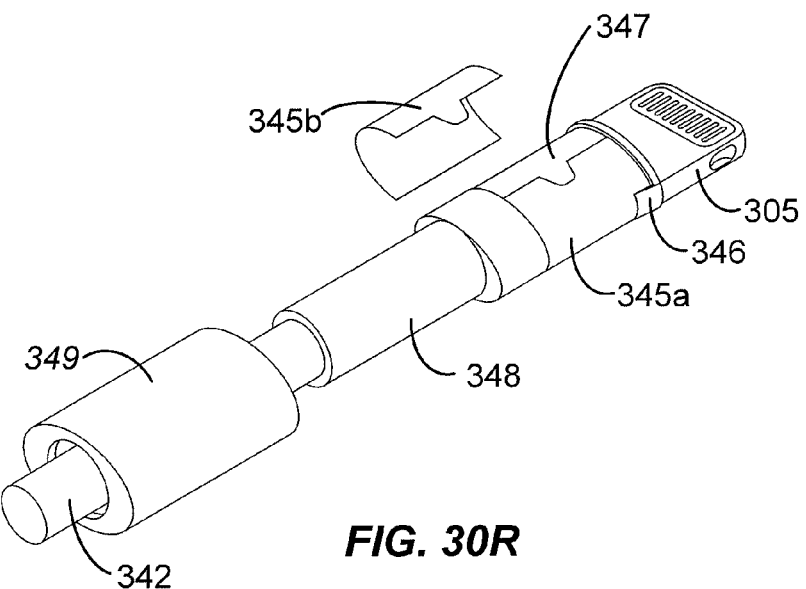
Figure 30S:
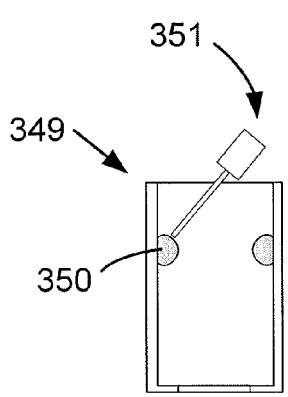
Figure 30T:
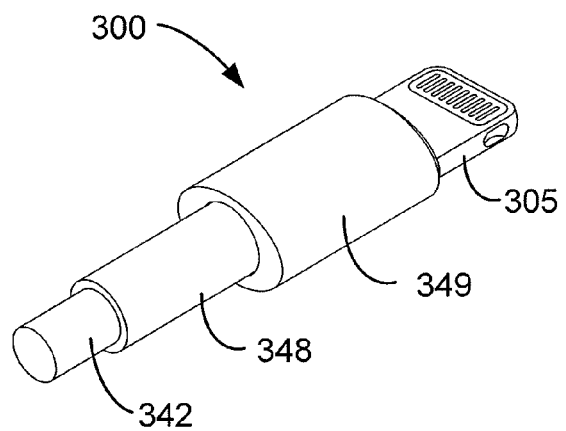
Figure 31:
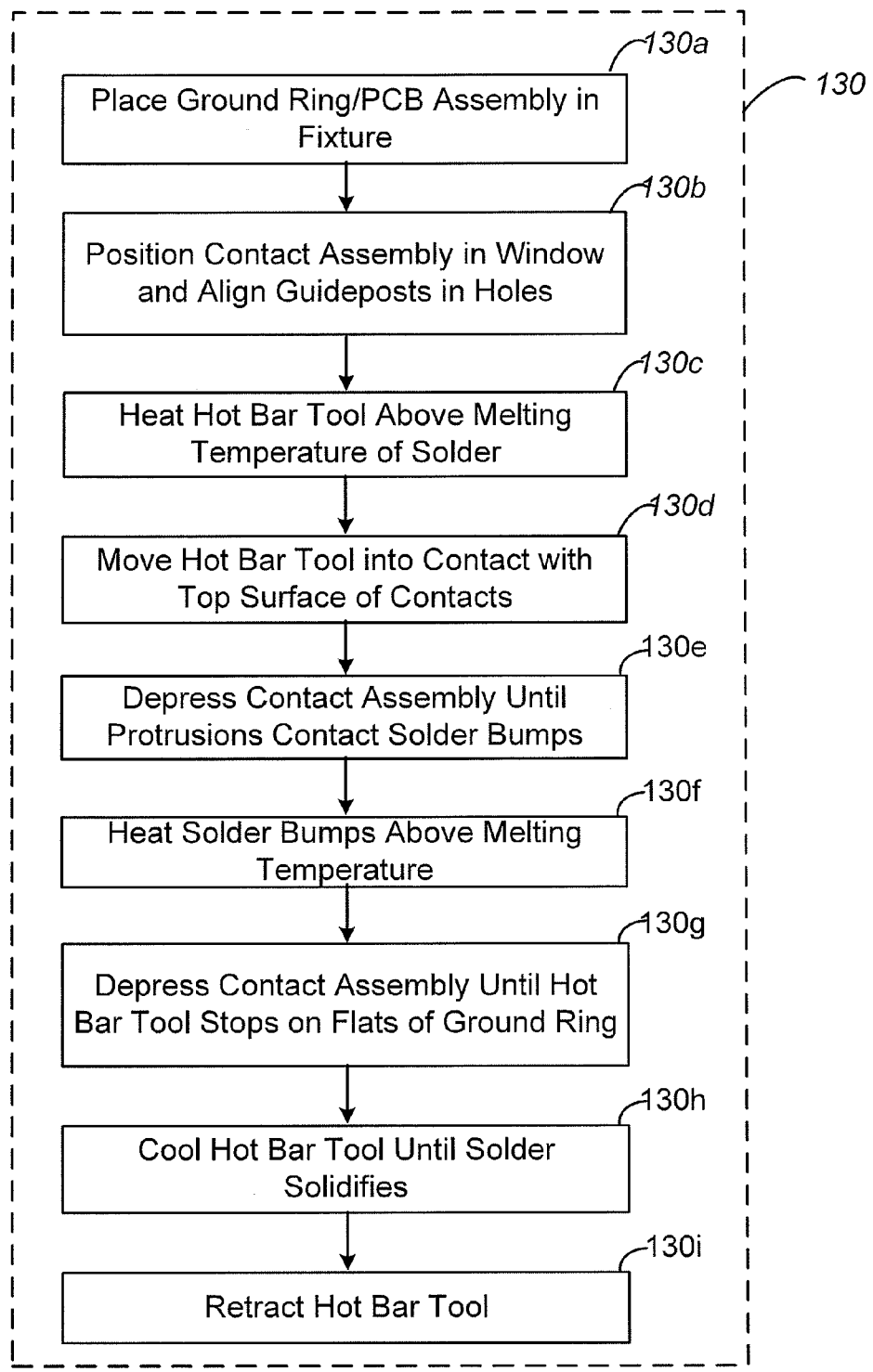
FIG. 31 is a flowchart depicting various sub-steps associated with attaching contact assemblies to a printed circuit board as done in step 130 shown in FIG. 29 according to one embodiment of the invention.

Reference is now made to FIGS. 29, 30A-30T and 31, regarding the steps associated with the manufacture and assembly of connector 300 (see FIG. 30T). FIG. 29 is a flow chart that illustrates the general steps associated with the manufacture and assembly of connector 300 according to one embodiment of the invention. FIGS. 30A-30T depict connector 300 at the various stages of manufacture set forth in FIG. 29. FIG. 31 is a flow chart that further details the general step of attaching the contact assembly to the PCB, identified as step 130 in the general manufacturing and assembly process illustrated in FIG. 29.

Now referring to FIGS. 30A-30D, the manufacture of connector 300 may be initiated with the fabrication of ground ring 305, the construction of printed circuit board (PCB) 304, and the construction of contact assemblies 316a, 316b (FIG. 29, steps 122, 124 and 126) each of which can occur independent of the others in any order. In step 122, ground ring 305 (see FIG. 30A) may be fabricated using a variety of techniques such as, for example, a metal injection molding process (MIM), a cold heading process or a billet machining process. A MIM process may provide a great deal of flexibility in achieving a desired geometry and can result in a part that is close to the final desired shape with minimal post machining operations. In some embodiments, alternative processes such as plastic injection molding and plating may be used to form ground ring 305. Pockets 302a, 302b and window 307 may be machined or molded into the ground ring and the surface of the ground ring can be smoothed using a media blasting process. Further, it may be desirable to grind or machine surfaces of the ground ring such as flats 319a, 319b on the top and bottom of the ground ring. Grinding and machining operations can be used to create tightly toleranced features. For example, flats 319a, 319b may be precision ground to form a pair of surfaces that are substantially flat and a precise distance apart. Tightly toleranced component geometry may be beneficial for subsequent assembly operations and may further benefit the performance of particularly small connectors. In one embodiment, the perimeter of the connector body is less than 30 mm. Ground ring 305 may be plated with one or more metals to achieve the desired finish.

PCB 304 (see FIGS. 30B-30C), which is fabricated in step 124, may be a traditional epoxy and glass combination or may be any equivalent structure capable of routing electrical signals. For example, some embodiments may use a flexible structure comprised of alternating layers of polyimide and conductive traces while other embodiments may use a ceramic material with conductive traces or a plastic material processed with laser direct structuring to create conductive traces. The PCB may be formed with a set of conductor bonding pads 310 disposed at one end and a set of contact bonding pads 312(1) . . . 312(8) disposed at the opposing end. In one embodiment the contact bonding pads are each split along a transverse direction into two separate bonding pads. The PCB may also be equipped with one or more ground spring bonding pads 301 to electrically connect one or more ground springs 320, as illustrated in FIG. 30D. Additionally, a set of component bonding pads 314 may be formed on the PCB to electrically connect one or more active or passive electronic components such as, for example, integrated circuits (ICs), resistors or capacitors. The embodiments depicted herein are for exemplary purposes only, other embodiments may have a different arrangement of bonding pads 301, 314, 310, 312(1) . . . 312(8), more or less bonding pads, as well as bonding pads formed on either or both of the opposing sides of PCB 304, and fewer, more or different electronic components.

Exemplary electronic components 308a, 308b are depicted on either side of PCB 304 (see FIG. 30C). In some embodiments a conductive epoxy is used to electrically attach the electronic components to PCB 304. In other embodiments a solder alloy may be employed using myriad technologies such as, for example, through-hole mounting, stencil print and reflow, chip-on-board, flip-chip or other appropriate connection method. In one embodiment a stencil printing process is used to dispose solder paste on component bond pads 314. Electronic components 308a. 308b are then disposed on the solder paste and a convective heating process can be used to reflow the solder paste, attaching the electronic components to the PCB. The solder alloy may be a lead-tin alloy, a tin-silver-copper alloy, or other suitable metal or metallic alloy.

The same solder reflow attachment process may be used to attach a ground spring 320 to PCB 304. The ground spring is depicted in more detail in FIG. 30D. Ground spring 320 may be comprised of a phosphor-bronze alloy or other metal and optionally plated with nickel and gold. The ground spring may further have one or more spring arms 322a, 322b and one or more protuberances 324a, 324b with one or more perforations there between. The perforations between the protuberances may improve the mechanical strength of the attachment of ground spring 320 to PCB 304 which help center PCB 304 within ground ring 305 during the assembly process as described below and provide an additional ground contact between PCB 304 and the ground ring.

During the electronic component attachment process, solder paste may be deposited on contact bonding pads 312(1) . . . 312(8), and reflowed. FIG. 30C depicts solder bumps 313(1) . . . 313(8) that are formed on the contact pads during reflow processing. The solder paste forms a bump during reflow processing due to the high surface tension of the solder when in its liquid state.

In some embodiments, after the components are attached to PCB 304, the assembly may be washed and dried. However, in other embodiments the assembly may not be washed until subsequent processing. In other embodiments a no-clean flux is used to aid the soldering process and there is no wash process. In further embodiments a no-clean or a cleanable flux is used to aid the soldering process and the assembly is washed. Finally, some or all of electronic components 308a, 308b may be encapsulated with a protective material such as, for example, an epoxy, a urethane or a silicone based material. In some embodiments the protective encapsulant may provide mechanical strength for improved reliability and/or environmental protection from moisture for sensitive electronic components. In further embodiments the protective encapsulant may improve the dielectric breakdown voltage performance of connector 300. The encapsulant may be applied with an automated machine or with a manual dispenser.

The next step of assembly may involve inserting PCB 304 through a back opening of ground ring 305 so that solder bumps 313(1) . . . 313(8) are positioned within window 307 (FIG. 29, step 128; FIGS. 30E and 30F). FIG. 30E depicts PCB 304 inserted into ground ring 305. FIG. 30F depicts a longitudinal cross-section view of the assembly shown in FIG. 30E taken through line A-A' and contact pads 313(2). FIG. 30F depicts ground spring arms 322a, 322b in contact with the top and bottom surfaces of ground ring 305. Also, it can be seen that ground ring protuberances 324a, 324b define the maximum off-center position PCB 304 can occupy within the ground ring. More specifically, PCB 304 can only move vertically within ground ring 304 as far as the protuberances allow. Further, it can be seen that solder bumps 313(1) . . . 313(8) disposed on contact bonding pads 312(1) . . . 312(8) are aligned within window 307. In some embodiments the next step of assembly comprises depositing flux on solder bumps 313(1) . . . 313(8) through window 307. This can be done, for example, with an automated atomized spray nozzle, or by an operator with a dispenser.

Next, contact assemblies 316a, 316b (formed in FIG. 29, step 126) may be positioned within window 307 on each side of ground ring 305 for attachment to PCB 304 (FIG. 29, step 130, FIG. 30G). The contact assemblies employed in some embodiments are illustrated in FIGS. 30H-30J. FIG. 30H shows a top perspective view while FIG. 30I shows a plan view from the bottom and FIG. 30J shows a side view. Each contact assembly 316a, 316b may include a molded frame 315 that can be formed from a dielectric material such as polypropylene. In other embodiments the frame is made of a liquid crystal polymer that may be partially filled with glass fiber. One embodiment has eight contacts 306(1) . . . 306(8) that are insert molded and secured by frame 315. Frame 315 may be equipped with one or more alignment posts 323 that protrude from a bottom surface of frame 315 as shown in FIG. 30F. Alignment posts 323 may be tapered and may have a beveled distal end fit within alignment rules in PCB 304 and are designed to align frame 315 with PCB 304. In some embodiments, the frame may have alignment tabs 318 disposed on the perimeter of the frame that align each frame 315 within openings 307. Further, the frame may have one or more crushable combs 325(1) . . . 325(8) that protrude from the bottom surface of the contact assembly 316a, 316b and help ensure correct spacing between frame 315 and PCB 304 in the vertical direction.

Each contact 306(1) . . . 306(8) in contact assembly 316a, 316b can be made from a variety of conductive materials, for example, phosphor-bronze, copper or stainless steel. Further, the contacts can be plated to improve their performance and appearance with, for example, nickel/gold, multi-layer nickel/gold, nickel/palladium, or any other acceptable metal. The contacts may be cut to size in a progressive stamping and forming process from a metal sheet and insert molded in frame 315. Each contact may be comprised of more than one metallic component and further, each contact may have one or more metallic protrusions 321(1) . . . 321(16) disposed on the bottom surface of the contact assembly. FIG. 30I depicts the bottom view of one embodiment with eight contacts, where each contact has two protrusions. FIG. 30J shows a side view of an exemplary contact assembly 316a, 316b where it can be seen that crushable combs 325(1) . . . 325(8) protrude a greater distance from the bottom of the contact assembly than do contact protrusions 321(1) . . . 321(16).

Reference is now made to FIGS. 30K and 30L to illustrate the contact assembly attachment process for one particular embodiment. The detailed steps in the flow chart depicted in FIG. 31 will be used to illustrate the process employed in this embodiment. Ground ring 305 and PCB 304 may be placed in a fixture to hold the components in place (FIG. 31, step 130a; FIG. 30K). Contact assembly 316a can be positioned in window 307 of ground ring 305 and alignment posts 323 may be engaged with guide holes 326 in PCB 304 (FIG. 31, step 130b). The contact assembly alignment tabs 318 may precisely position contact assembly 316a in window 307. Crushable combs 325(1) . . . 325(8) may be in physical contact with PCB 304.

Now referring to FIG. 30K, a hot bar tool 328 with a step 329 can be used to hot bar solder contact assembly 316a to PCB 304. In step 130c, the hot bar tool may be heated to a temperature above the melting temperature of solder bumps 313(1) . . . 313(8). For example, if the solder bumps are composed of a tin/silver/copper alloy comprised of approximately three percent silver, one-half percent copper with the remainder tin, the hot bar tool may be heated above 221 degrees centigrade. The higher the temperature of the hot bar tool, the faster the solder may reflow. In step 130d, the hot bar tool may travel down, in the direction of arrow 331, towards the contact assembly until it physically touches the top surface of contacts 306(1) . . . 306(8). In step 130e, the hot bar tool may push the contact assembly further in the direction of arrow 331, partially deforming crushable combs 325(1) . . . 325(8) against PCB 304. The crushable combs may be designed specifically for this purpose and may impart a controlled amount of force resisting movement of contact assembly 316a in the direction of arrow 331. Alignment tabs 318 and alignment posts 323 may keep the contact assembly centered in window 307 (see FIG. 30A) during the assembly process. Step 329 of hot bar tool 328 may be precision formed to maintain the top surface of contacts 306(1) . . . 306(8) coplanar and at a controlled height during the attachment process. In step 130e, the contact assembly may be further pushed in the direction of the arrow until contact protrusions 321(1) . . . 321(16) come into contact with solder bumps 313(1) . . . 313(8). Hot bar tool 328 may be configured to impart a controlled force in the direction of arrow 331 at this time so no damage to the contact assembly results.

As mentioned above, solder bumps 313(1) . . . 313(8) may be coated with flux. In some embodiments the coating of flux may not only improve the wetting of the solder to contact protrusions 321(1) . . . 321(16), it may also enable more efficient heat transfer from contacts 306(1) . . . 306(8) to the solder bumps. In step 130f, hot bar tool 328 may transfer thermal energy through the contacts and into the solder bumps. Once an adequate amount of thermal energy has been transferred into the solder bumps, they may transition to a liquid state when heated above their melting temperature. Once in a liquid state, the solder bumps offer little resistance to additional movement of contact assembly 316a in the direction of arrow 331. In step 130g, the contact assembly may then be pushed further by the hot bar tool, causing increased deformation of crushable combs 325(1) . . . 325(8), until the hot bar tool "stops" on flat 319a of ground ring 305. FIG. 30L depicts the stop position of the hot bar tool. In this figure it can be seen that step 329 of hot bar tool 328 may be used to precisely position the top surface of contacts 306(1) . . . 306(8) a known distance below flat 319a of ground ring 305. In some embodiments, step 329 has a height between 0.1 and 0.01 mm and thus recesses the contacts 306(1) . . . 306(8) that same amount from surface 319a of ground ring 305. In other embodiments, step 329 is not included and the contacts are pressed flush with surface 319a. Also, during step 130g, contact protrusions 321(1) . . . 321(16) on the bottom surface of contact assembly 316a may be wetted by the liquefied solder bumps 313(1) . . . 313(8). In step 130h, the hot bar tool may then be cooled until the liquefied solder bumps cool to a temperature below the liquidus temperature of the solder alloy and solidify. In step 130i, the hot bar tool may then be then retracted and the assembly can be removed from the fixturing.

In some embodiments the contact attachment process is performed on one side of ground 305 ring at a time, while in other embodiments the process is performed simultaneously on both sides of the ground ring. In some embodiments crushable combs 325(1) . . . 325(8) may deform between 0.02 mm and 0.12 mm. In other embodiments the crushable combs may deform between 0.05 mm and 0.09 mm. In some embodiments the heating of the crushable combs by hot bar tool 328 makes them easier to deform. The partially assembled connector may look like FIG. 30M with contact assemblies 316a, 316b installed in either side of ground ring 305. The partially assembled connector may then be cleaned.

The next step of assembly may involve placing a partially assembled connector (see FIG. 30M) in an insert molding tool and forming a thermoplastic or similar dielectric overmold 338 around contacts 306(1) . . . 306(8) and within window 307 of ground ring 305 (FIG. 29, step 132; FIGS. 30M-30P). This process may provide a smooth and substantially flat mating surface 341 in the contact region of ground ring 305. FIG. 30N illustrates the insert molding process of one embodiment. An insert molding tool 335 may be configured to seal against the top surfaces ground ring 305. A step 336 on mold tool 335 may simultaneously seal against the top surfaces of contacts 306(1) . . . 306(8). The mold tool may further be equipped to seal against PCB 304. To simultaneously seal all of these surfaces and protect against dielectric overmold bleeding, the insert mold tool may be equipped with spring loaded inserts to accommodate dimensional variations of connector components. The insert mold tool may also be configured to inject dielectric overmold 338 from the rear of the connector, shown generally by arrow 337. In one embodiment the insert mold tool has a recessed gate for injecting the dielectric overmold. In some embodiments, ground spring protuberances 324a, 324b (see FIG. 30F) may accurately maintain the position of PCB 304 within ground ring 305 during the dielectric overmold injection process. In some embodiments, dielectric overmold 338 may be polyoxymethylene (POM). In other embodiments, dielectric overmold 338 may be a nylon-based polymer.

FIG. 30O depicts one embodiment after the insert molding process. In some embodiments, a mating surface 341 may be disposed below the top surface of ground ring 305 and be substantially coplanar with the top surface of contacts 306(1) . . . 306(8). FIG. 30P shows a simplified cross-section of FIG. 30O in the region of mating surface 341. From this illustration it can be seen that mating surface 341 may reside in a depression below the top surface of the ground ring. In some embodiments the depression may be between 0.01 to 0.1 mm below the top surface of ground ring 305. This depression may protect the contacts from touching surfaces, such as that of a mating device, potentially causing damage to the top surface of the contacts. In some embodiments the recess may extend around the entire perimeter of window 307 (see FIG. 30M). In further embodiments the recess may be deeper in some areas and shallower in others. In other embodiments the recess may be deeper towards the rear of the connector and substantially coplanar with the top surface of ground ring 305 towards the distal end of the connector. In yet further embodiments, mating surface 341 of dielectric overmold 338 may be substantially coplanar with flat 319a of ground ring 305. In some embodiments, dielectric overmold 338 may be used to aid in retaining the contacts within the connector.

When connector 300 is part of a cable, the next step of assembly may comprise attaching a cable bundle 342 to the partially assembled connector (FIG. 29, step 134; FIG. 30Q). The cable bundle may have individual conductors (e.g., wires) 343, for attachment to conductor bonding pads 310 of PCB 304. The individual conductors may be cut and stripped and the jacket of the cable bundle may also be cut and stripped. Each conductor may be soldered to its respective conductor bonding pad using an automated, a semi-automated or a manual process. In one embodiment the conductors are aligned in a fixture and each conductor is automatically soldered to each conductor bonding pad. In another embodiment each conductor is welded to its respective conductor bonding pad. In some embodiments, where connector 300 is part of an electronic device or accessory that does not attach a cable to the connector, for example, a docking station, individual wires, a flex circuit or the like may electrically connect bonding pads 304 to circuitry in the device. Myriad conductor attachment processes may be used without departing from the invention.

The next several figures illustrate further example assembly steps when connector 300 is part of a cable as shown in FIG. 30Q. In such instances, the next step of assembly may involve overmolding a portion of the connector, including electronic components attached to PCB 304, and the cable (FIG. 29, step 136; FIG. 30R). A first insert molding operation may be performed, encapsulating PCB 304 in plastic material, and forming a connector body 347. A second insert molding process may be performed afterwards creating a strain relief sleeve 348 attached to the rear face of connector body 347 and extending over cable 342 for a short distance. In some embodiments the connector body may be made partially from insert molded plastic and partially from other materials. The first and second insert molding materials may be any type of plastic or other non-conductive material. In one embodiment, both materials are thermoplastic elastomers wherein the second insert molding material is of a lower durometer than the first insert molding material. FIG. 30R depicts an embodiment with a two piece conductive metal shield 345a, 345b that may be installed over a portion of connector body 347 and electrically bonded to ground ring 305 with tab 346. In some embodiments, shield 345a, 345b may be installed first and connector body 347 may be molded in a subsequent operation. In some embodiments, shield can 346 may be welded to ground ring 305. In some embodiments shield 345a, 345b may be made from steel while in other embodiments copper or tin alloys may be used.

The next step of assembly may involve attaching an enclosure 349 to body 347 (FIG. 29, step 138; FIGS. 30R-30T). In FIG. 30R, enclosure 349 is illustrated in a preassembled position, located on cable bundle 342. The enclosure may be sized appropriately to slide over connector body 347, substantially enclosing the connector body within the enclosure. The enclosure can be manufactured from any type of plastic or other non-conductive material and in one embodiment is made from ABS.

A cross-sectional view of the enclosure 349 is shown in FIG. 30S. This figure further depicts bonding material 350 deposited on two locations on an inside surface of enclosure 349. The bonding material may be deposited with a syringe and needle assembly 351 as shown, or it can be deposited with myriad other techniques without departing from the invention. The final assembly step is shown in FIG. 30T and comprises sliding enclosure 349 over connector body 347 until the enclosure substantially encloses the connector body.

Bonding material 350 may be cured, adhering the inside surface of enclosure 349 to the outside surface of connector body 347. In some embodiments the bonding material may be a cyanoacrylate that cures in the presence of moisture. In other embodiments the bonding material may be an epoxy or urethane that is heat cured. Other bonding materials are well known in the art and may be employed without departing from the invention.

Embodiments of the invention are suitable for a multiplicity of electronic devices, including any device that receives or transmits audio, video or data signals among others. In some instances, embodiments of the invention are particularly well suited for portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, desktop computers, as well as tablet (e.g., Apple's iPad devices), laptop or other mobile computers. Some of these devices may be configured to provide audio, video or other data or sensory output.

Figure 32:
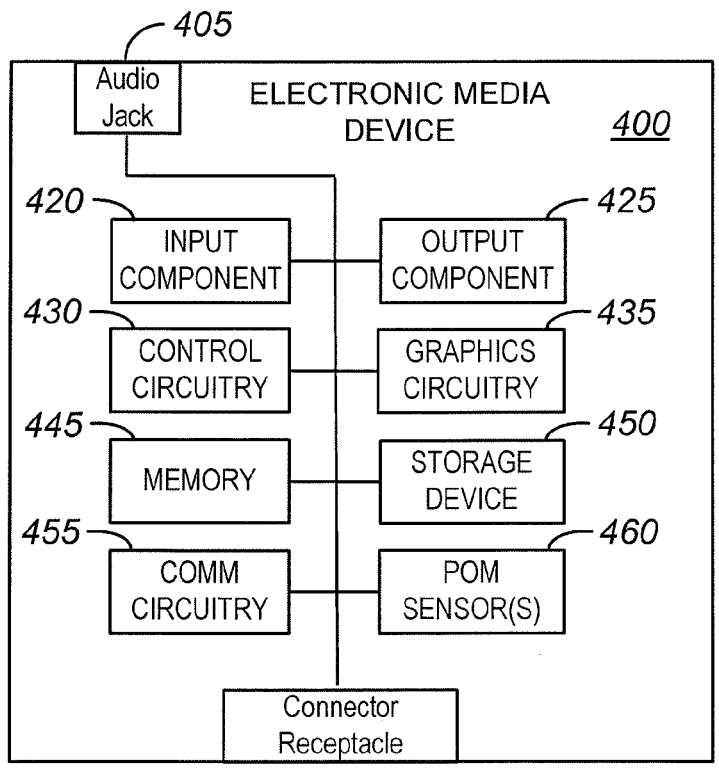

FIG. 32 is a simplified illustrative block diagram representing an electronic media device 400 that includes an audio plug receptacle 405 according to embodiments of the present. Electronic media device 400 may also include, among other components, connector receptacle 410, one or more user input components 420, one or more output components 425, control circuitry 430, graphics circuitry 435, a bus 440, a memory 445, a storage device 450, communications circuitry 455 and POM (position, orientation or movement sensor) sensors 460. Control circuitry 430 may communicate with the other components of electronic media device 400 (e.g., via bus 440) to control the operation of electronic media device 400. In some embodiments, control circuitry 430 may execute instructions stored in a memory 445. Control circuitry 430 may also be operative to control the performance of electronic media device 400. Control circuitry 430 may include, for example, a processor, a microcontroller and a bus (e.g., for sending instructions to the other components of electronic media device 400). In some embodiments, control circuitry 430 may also drive the display and process inputs received from input component 420.

Memory 445 may include one or more different types of memory that may be used to perform device functions. For example, memory 445 may include cache, flash memory, ROM, RAM and hybrid types of memory. Memory 445 may also store firmware for the device and its applications (e.g., operating system, user interface functions and processor functions). Storage device 450 may include one or more suitable storage mediums or mechanisms, such as a magnetic hard drive, flash drive, tape drive, optical drive, permanent memory (such as ROM), semi-permanent memory (such as RAM) or cache. Storage device 450 may be used for storing media (e.g., audio and video files), text, pictures, graphics, advertising or any suitable user-specific or global information that may be used by electronic media device 400. Storage device 450 may also store programs or applications that may run on control circuitry 430, may maintain files formatted to be read and edited by one or more of the applications and may store any additional files that may aid the operation of one or more applications (e.g., files with metadata). It should be understood that any of the information stored on storage device 450 may instead be stored in memory 445.

Electronic media device 400 may also include input component 420 and output component 425 for providing a user with the ability to interact with electronic media device 400. For example, input component 420 and output component 425 may provide an interface for a user to interact with an application running on control circuitry 430. Input component 420 may take a variety of forms, such as a keyboard/keypad, trackpad, mouse, click wheel, button, stylus or touch screen. Input component 420 may also include one or more devices for user authentication (e.g., smart card reader, fingerprint reader or iris scanner) as well as an audio input device (e.g., a microphone) or a video input device (e.g., a camera or a web cam) for recording video or still frames. Output component 425 may include any suitable display, such as a liquid crystal display (LCD) or a touch screen display, a projection device, a speaker or any other suitable system for presenting information or media to a user. Output component 425 may be controlled by graphics circuitry 435. Graphics circuitry 435 may include a video card, such as a video card with 2D, 3D or vector graphics capabilities. In some embodiments, output component 425 may also include an audio component that is remotely coupled to electronic media device 400. For example, output component 425 may include a headset, headphones or ear buds that may be coupled to electronic media device 400 with a wire or wirelessly (e.g., Bluetooth headphones or a Bluetooth headset).

Electronic media device 400 may have one or more applications (e.g., software applications) stored on storage device 450 or in memory 445. Control circuitry 430 may be configured to execute instructions of the applications from memory 445. For example, control circuitry 430 may be configured to execute a media player application that causes full-motion video or audio to be presented or displayed on output component 425. Other applications resident on electronic media device 400 may include, for example, a telephony application, a GPS navigator application, a web browser application and a calendar or organizer application. Electronic media device 400 may also execute any suitable operating system, such as a Mac OS, Apple iOS, Linux or Windows and can include a set of applications stored on storage device 450 or memory 445 that is compatible with the particular operating system.

In some embodiments, electronic media device 400 may also include communications circuitry 455 to connect to one or more communications networks. Communications circuitry 455 may be any suitable communications circuitry operative to connect to a communications network and to transmit communications (e.g., voice or data) from electronic media device 400 to other devices within the communications network. Communications circuitry 455 may be operative to interface with the communications network using any suitable communications protocol such as, for example, Wi-Fi (e.g., a 802.11 protocol), Bluetooth, high frequency systems (e.g., 900 MHz, 2.4 GHz and 5.6 GHz communication systems), infrared, GSM, GSM plus EDGE, CDMA, quadband and other cellular protocols, VoIP or any other suitable protocol.

In some embodiments, communications circuitry 455 may be operative to create a communications network using any suitable communications protocol. Communications circuitry 455 may create a short-range communications network using a short-range communications protocol to connect to other devices. For example, communications circuitry 455 may be operative to create a local communications network using the Bluetooth protocol to couple with a Bluetooth headset (or any other Bluetooth device). Communications circuitry 455 may also include a wired or wireless network interface card (NIC) configured to connect to the Internet or any other public or private network. For example, electronic media device 400 may be configured to connect to the Internet via a wireless network, such as a packet radio network, an RF network, a cellular network or any other suitable type of network. Communication circuitry 445 may be used to initiate and conduct communications with other communications devices or media devices within a communications network.

Electronic media device 400 may also include any other component suitable for performing a communications operation. For example, electronic media device 400 may include a power supply, an antenna, ports or interfaces for coupling to a host device, a secondary input mechanism (e.g., an ON/OFF switch) or any other suitable component.

Electronic media device 400 may also include POM sensors 460. POM sensors 460 may be used to determine the approximate geographical or physical location of electronic media device 400. As described in more detail below, the location of electronic media device 400 may be derived from any suitable trilateration or triangulation technique, in which case POM sensors 460 may include an RF triangulation detector or sensor or any other location circuitry configured to determine the location of electronic media device 400.

POM sensors 460 may also include one or more sensors or circuitry for detecting the position orientation or movement of electronic media device 400. Such sensors and circuitry may include, for example, single-axis or multi-axis accelerometers, angular rate or inertial sensors (e.g., optical gyroscopes, vibrating gyroscopes, gas rate gyroscopes or ring gyroscopes), magnetometers (e.g., scalar or vector magnetometers), ambient light sensors, proximity sensors, motion sensor (e.g., a passive infrared (PIR) sensor, active ultrasonic sensor or active microwave sensor) and linear velocity sensors. For example, control circuitry 430 may be configured to read data from one or more of POM sensors 460 in order to determine the location orientation or velocity of electronic media device 400. One or more of POM sensors 460 may be positioned near output component 425 (e.g., above, below or on either side of the display screen of electronic media device 400).

Figure 33:
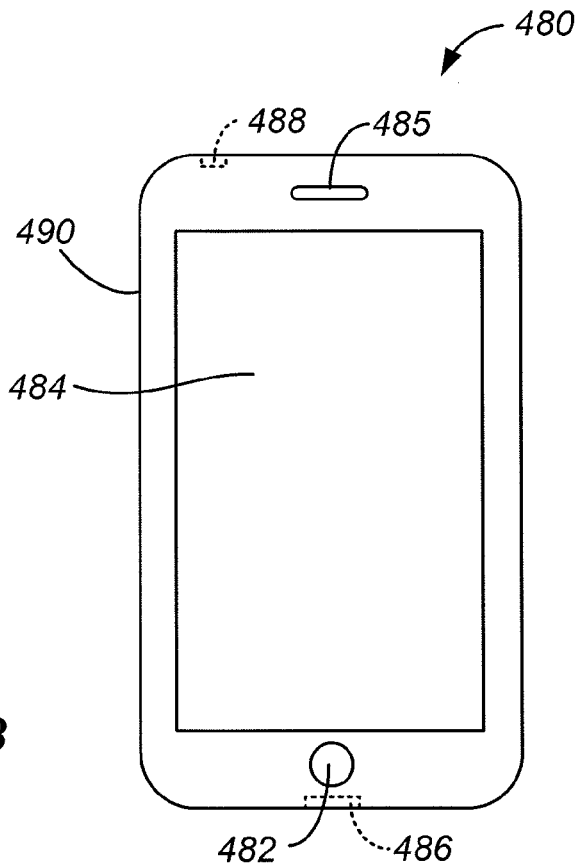
FIG. 33 depicts an illustrative rendering of one particular embodiment of an electronic media device suitable for use with embodiments of the present invention.

FIG. 33 depicts an illustrative rendering of one particular electronic media device 480. Device 480 includes a multipurpose button 482 as an input component, a touch screen display 484 as a both an input and output component, and a speaker 485 as an output component, all of which are housed within a device housing 490. Device 480 also includes a primary receptacle connector 486 and an audio plug receptacle 488 within device housing 490. Each of the receptacle connectors 486 and 488 can be positioned within housing 490 such that the cavity of the receptacle connectors into which a corresponding plug connector is inserted is located at an exterior surface of the device housing. In some embodiments, the cavity opens to an exterior side surface of device 480. For simplicity, various internal components, such as the control circuitry, graphics circuitry, bus, memory, storage device and other components are not shown in FIG. 33. Embodiments of the invention disclosed herein are particularly suitable for use with plug connectors that are configured to mate with primary receptacle connector 486, but in some embodiments can also be used with audio plug receptacle 488. Additionally, in some embodiments, electronic media device 480 has only a single receptacle connector 486 that is used to physically interface and connect the device (as opposed to a wireless connection which can also be used) to the other electronic devices.

As will be understood by those skilled in the art, the present invention may be embodied in many other specific forms without departing from the essential characteristics thereof. For example, various embodiments of the invention were described above with respect to dual orientation connectors. Other embodiments include connectors that have more than two possible insertion orientations. For example, a connector system according to the invention could include a plug connector that has a triangular cross-section to fit within a triangular cavity of a corresponding receptacle connector in any one of three possible orientations; a plug connector that has a square cross-section and fits within a receptacle connector in any one of four possible insertion orientations; a plug connector that has a hexagonal cross-section to fit within a corresponding receptacle connector in any one of six possible orientations; etc. Also, in some embodiments, a plug connector of the invention is shaped to be inserted into a receptacle connector in multiple orientations but only includes contacts on a single side of the plug connector. Such a connector can be operatively coupled in anyone of its multiple orientations to a receptacle connector that has contacts on each of the surfaces of the interior cavity. As an example, one embodiment of a plug connector similar to connector 80 shown in FIGS. 8A-8B could have contacts formed only in region 46a and not in region 46b. Such a plug connector could be operatively coupled to a receptacle connector, such as receptacle connector 85 shown in FIGS. 9A-9B, in either of two orientations if the receptacle connector had appropriate contacts on both the upper and lower surfaces of interior cavity 87. The connector could also be operatively coupled to receptacle connector 85 having contacts only on the upper surface of cavity 87 if it is inserted within cavity 87 with side 44a in an "up" position as shown in FIG. 9A.

As still another example, FIGS. 13A-13C described an embodiment where each contact in contact region 46a is electrically connected to a matching contact in contact region 46b on the opposite side of the connector. In some embodiments, only a subset of contacts in region 46a are electrically connected to contacts in region 46b. As an example, in one embodiment that includes eight contacts formed in a single row within each contact region 46a and 46b similar to connector 100 shown in FIG. 13A, contacts 106(4) and 106(5) in region 46a are each electrically connected to corresponding contacts 106(4) and 106(5) in region 46 while contacts 106(1) . . . 106(3) and 106(6) . . . 106(8) are electrically independent from each other and are electrically independent from contacts within region 46b. Thus, such an embodiment may have fourteen electrically independent contacts instead of the eight. In still other embodiments, none of the contacts in region 46a are electrically coupled to contacts in region 46b. Also, in another embodiment of adapter 200 connector 202 can be a 30-pin plug connector having the pinout shown in FIG. 28B while connector 205 is an eight contact receptacle connector similar to receptacle connector 140 shown in FIG. 15.

Also, while a number of specific embodiments were disclosed with specific features, a person of skill in the art will recognize instances where the features of one embodiment can be combined with the features of another embodiment. For example, some specific embodiments of the invention set forth above were illustrated with pockets as retention features. A person of skill in the art will readily appreciate that any of the other retention features described herein, as well as others not specifically mentioned, may be used instead of or in addition to the pockets. Also, those skilled in the art will recognize, or be able to ascertain using no more than routine experimentation, many equivalents to the specific embodiments of the inventions described herein. Such equivalents are intended to be encompassed by the following claims.

What is claimed:

1. A plug connector comprising:
   a tab adapted to be inserted into a receptacle connector during a mating event, the tab including first and second opposing surfaces along with third and fourth opposing surfaces that extend between the first and second surfaces;
   a first contact region formed at the first surface of the tab, the first contact region including eight sequentially numbered external contacts spaced apart along a first row, the sequentially numbered contacts including a first pair of data contacts at locations 2 and 3, a second pair of data contacts at locations 6 and 7, a first power contact positioned between the first and second pairs of data contacts, and a first ground contact positioned at one end of the first row four contact locations away from the first power contact; and
   wherein the first and second pairs of data contacts are high speed data contacts that operate at rate that is at least two orders of magnitude faster than an operating rate of signals on contacts at locations 1, 4, 5 and 8.

2. The plug connector set forth in claim 1 wherein the sequentially numbered contacts further includes an ID contact designated for an ID signal and an accessory power contact designated for a power signal that operates at a lower voltage than a power signal carried by the first power contact.

3. The plug connector set forth in claim 1 further comprising a second contact region formed at the second major surface of the tab, the second contact region including eight sequentially numbered external contacts spaced apart along a second row that mirrors the first row, wherein each individual contact in the second first row is electrically connected to a contact in the second row.

4. The plug connector set forth in claim 3 wherein the first pair of data contacts in the first row is positioned in a mirrored relationship and electrically coupled with a pair of data contacts in the second row and the second pair of data contacts in the first row is positioned in a mirrored relationship and electrically coupled with a pair of data contacts in the second row.

5. The plug connector set forth in claim 4 wherein:
the first power contact in the first row of contacts is electrically coupled to a second power contact in the second row of contacts and the first and second power contacts are positioned in a cater corner relationship with each other across a centerline of the connector; and
the first ground contact is in the first row of contacts is electrically coupled to a second ground contact in the second row of contacts and the first and second ground contacts are positioned in a cater corner relationship with each other across a centerline of the connector.

6. The plug connector set forth in claim 3 further comprising a metal frame that defines a shape of the tab, the metal frame including a first opening at the first surface of the tab in which the first contact region is formed and a second opening at the second surface of the tab in which the second contact region is formed; and wherein dielectric material surrounds each contact in the first and second rows and electrically isolates each contact in the first and second rows from the metal frame.

7. The plug connector set forth in claim 3 further comprising a first recessed region formed in the third side and a second recessed region formed in the fourth side opposite the first recessed region, the first and second recessed regions adapted to engage with retention features on a corresponding receptacle connector.

8. The plug connector set forth in claim 3 further comprising a printed circuit board within the body and tab of the connector, the printed circuit board including electrical traces and vias that electrically connect each contact in the first contact region with a contact in the second contact region.

9. The plug connector set forth in claim 8 wherein the sequentially numbered contacts further includes an ID contact designated for an ID signal and wherein the plug connector further comprises circuitry operatively coupled to send identifier and contact configuration information over the ID contact.

10. A dual orientation plug connector comprising:
a tab adapted to be inserted into a receptacle connector during a mating event in either a first orientation or a second orientation rotated 180 degrees from the first orientation, the tab including first and second opposing surfaces along with third and fourth opposing surfaces that extend between the first and second surfaces;
a first contact region formed at the first surface of the tab, the first contact region including a first set of eight sequentially numbered external contacts spaced apart along a first row, the sequentially numbered contacts including a first data contact at location 2, a second date contact at location 3, a first ID contact designated for an ID signal, and a first ground contact positioned at an end of the first row four contact locations away from the first power contact; and
a second contact region formed at the second surface of the tab, the second contact region including a second set of eight external contacts spaced apart along a second row where each individual contact in the second set of contacts is positioned directly opposite an individual contact in the first set of contacts, the second set of contacts including a third data contact positioned directly opposite from and electrically coupled to the first data contact, a fourth data contact positioned directly opposite from and electrically coupled to the second data contact, a second ID contact electrically coupled to the first ID contact, and a second ground contact electrically coupled to the first ground contact and at an end of the second row in a cater corner relationship across the centerline of the connector with the first ground contact and four contact locations away from the second power contact.

11. The plug connector set forth in claim 10 wherein:
the first set of sequentially numbered contacts further includes: (i) a first power contact positioned between the second data contact and the first ID contact, and (ii) a first accessory power contact designated for a power signal that operates at a lower voltage than a power signal carried by the first power contact; and
the second set of sequentially numbered contacts further includes: (i) a second power contact electrically coupled to the first power contact and positioned in a cater corner relationship across a centerline of the connector with the first power contact and between the fourth data contact and the second ID contact, and (ii) a second accessory power contact electrically coupled to the first accessory power contact.

12. The plug connector set forth in claim 11 wherein the first set of eight sequentially numbered external contacts further includes a fifth of data contact at location 6 and a sixth data contact at location 7; and wherein the second set of eight contacts further includes a seventh data contact positioned directly opposite from and electrically coupled to the fifth data contact and an eighth data contact positioned directly opposite from and electrically coupled to the sixth data contact.

13. The plug connector set forth in claim 12 wherein each contact at locations 1, 4, 5 and 8 in the first row of contacts: (i) is electrically coupled to a single contact at one of locations 1, 4, 5 or 8 in the second row of contacts, and (ii) carries a DC signal and/or one or more signals that operate at a rate that is at least two orders of magnitude slower than that of the data contacts.

14. The plug connector set forth in claim 12 wherein the first and second data contacts operate as a pair of differential data contacts and the fifth and sixth data contacts operate as a pair of serial transmit and receive data contacts.

15. The plug connector set forth in claim 10 further comprising:
a metal frame that defines a shape of the tab, the metal frame including a first opening at the first surface of the tab in which the first contact region is formed and a second opening at the second surface of the tab in which the second contact region is formed;
dielectric material filled-in between the metal frame and each contact in the first and second rows; and
a first retention feature formed in the third side and a second retention feature formed in the fourth side opposite the first recessed region, the first and second retention features adapted to engage with retention features on a corresponding receptacle connector.

16. A reversible plug connector comprising:
a body;

a 180 degree symmetrical connector tab coupled to and extending away from the body, the tab including first and second opposing surfaces along with third and fourth opposing surfaces that extend between the first and second surfaces;

a first contact region formed at the first surface of the tab, the first contact region including a first plurality of external contacts spaced apart along a first row, the first plurality of external contacts including a first pair of data contacts configured to enable communication using a first communication protocol, a first ground contact designated for ground, and a first power contact designated for a first DC power signal;

a second contact region formed at the second surface of the tab, the second contact region including a second plurality of external contacts spaced apart along a second row in contact locations that mirror contact locations in the first row, the second plurality of external contacts including a second pair of data contacts electrically coupled to and positioned directly opposite from the first pair of data contacts, a second ground contact electrically coupled to and positioned in a cater corner relationship across a centerline of the connector with the first ground contact, and a second power contact electrically coupled to and positioned in a cater corner relationship across a centerline of the connector with the first power contact.

17. The reversible plug connector set forth in claim 16 wherein the first plurality of external contacts further includes a third pair of data contacts configured to enable communication using a second communication protocol different than the first protocol, and the second plurality of contacts further includes a fourth pair of data contacts electrically coupled to and positioned directly opposite from the third pair of data contacts.

18. The reversible plug connector set forth in claim 16 wherein:

the first plurality of external contacts further includes: (i) a first ID contact capable of carrying a configuration signal that identifies the communication protocols used by the first and second pairs of data contacts, and (ii) a first accessory power contact designated for a second DC power signal having a lower voltage than that of the first power signal; and the second plurality of contacts further includes: (i) a second ID contact electrically coupled to and positioned in a cater corner relationship across a first quarter line of the connector with the first ID contact, and (ii) a second accessory power contact electrically coupled to and positioned in a cater corner relationship across a second quarter line of the connector with the first accessory power contact first power contact.

19. The plug connector set forth in claim 18 wherein:

each of the first and second pluralities of external contacts consists of eight contacts;

the first pair of data contacts is positioned directly between the first accessory power contact and the first power contact;

the third pair of data contacts is positioned directly between the first ID contact and the first ground contact;

the second pair of data contacts is positioned directly between second first accessory power contact and the second ground contact;

the fourth pair of data contacts is positioned directly between the second ID contact and the second power contact; and the first and second ID contacts designated to carry the configuration signal operate at a rate that is at least two orders of magnitude slower than that of the first and third pairs of data contacts.

20. The plug connector set forth in claim 16 wherein the body is a housing associated with an electronic device.

* * * * *